United States Patent [19]
Collins et al.

[11] Patent Number: 5,781,714
[45] Date of Patent: Jul. 14, 1998

[54] APPARATUS AND METHODS FOR CREATING AND USING PORTABLE FONTS

[75] Inventors: John S. Collins, Boston; Mark H. Goldwater, Norfolk, both of Mass.

[73] Assignee: Bitstream Inc., Cambridge, Mass.

[21] Appl. No.: 527,518

[22] Filed: Sep. 12, 1995

Related U.S. Application Data

[63] Continuation-in-part of Ser. No. 250,372, May 27, 1994, Pat. No. 5,583,978.

[51] Int. Cl.⁶ .................................................. G06T 11/00
[52] U.S. Cl. .................................................. 395/171
[58] Field of Search .................................. 395/167–172, 395/141–143; 382/177–180, 190–194

[56] References Cited

U.S. PATENT DOCUMENTS

| | | | |
|---|---|---|---|
| 4,785,391 | 11/1988 | Apley et al. | 395/169 |
| 5,099,435 | 3/1992 | Collins et al. | 395/169 |
| 5,167,016 | 11/1992 | Bagley et al. | 395/793 |
| 5,309,554 | 5/1994 | Ito | 395/170 |
| 5,355,449 | 10/1994 | Lung et al. | 395/167 |
| 5,473,709 | 12/1995 | Aoki | 382/258 |
| 5,473,743 | 12/1995 | Watanabe | 395/171 |

FOREIGN PATENT DOCUMENTS

| | | |
|---|---|---|
| 0-480-399-A2 | 4/1992 | European Pat. Off. |
| 0-534-622-A2 | 3/1993 | European Pat. Off. |
| 0-583-548-A1 | 2/1994 | European Pat. Off. |

OTHER PUBLICATIONS

*Electronic Documents: A White Paper*, © 1993, by No Hands Software, 1301 Shoreway Road, Suite 220 Belmont, CA 94002.

*The Dawn of Easy Electronic Documents?*, © 1993 by Info World Publishing Company, vol. 9, Issue 14, pp. 4–8.

*Fonts and Output Issues*, The Seybold Report of Desktop Publishing, Apr. 8, 1991, pp. 27–30.

*Tools Review on Common Ground, Adobe Acrobat Exchange and Adobe Acrobat Starter Kit*,Publish magazine, Feb. 1994.

*Portable Documents*, InfoWorld, Jan. 17, 1994, pp. 66–67 and 71–77.

*Adobe ⁊Acrobat⁊Products & Technology, An Overview*, by Adobe Systems Incorporated, 1585 Chareston Road, Mountain View, CA 94039, Nov. 1992.

Fontographer product brochure, from Altsys Corporation, 269 Renner Road, Richardson, TX 75080.

Product review of Fontographer, MacUser magazine, Oct. 1992, p. 56.

(List continued on next page.)

*Primary Examiner*—Almis R. Jankus
*Attorney, Agent, or Firm*—Edward W. Porter

[57] ABSTRACT

A computer system includes a requesting computer which asks a responding computer, such as an Internet server, for one or more portions of text. The responding computer reacts by sending the requested text. The requesting computer can either render the requested text without the text's font shapes, or it can ask the responding computer to send descriptions of such shapes, and then render the text using them. Preferably the font descriptions sent are grouped into sets, or portable font resources ("PFR"); each text sent identifies the one or more PFRs needed to define its font shapes; and the requesting computer asks for PFRs identified in texts it receives. The fonts and characters within fonts represented by each PFR vary as a function of its associated text. For each character to be rendered, the requesting computer finds which PFR associated with the character's text describes its shape, and uses that font description to render that shape. The responding computer can install such new font descriptions into its operating system, so character shapes can be rapidly rendered by standard operating system calls. The responding computer can translate a text's predefined font description into new font descriptions which depend only on character-font shapes. The responding computer can receive a changed body of text and a corresponding old set of PFRs, and derive a new set of one or more PFRs as a function of which character-font shapes occur in the changed text.

51 Claims, 31 Drawing Sheets

OTHER PUBLICATIONS

Product review of FontStudio, MacUser magazine, May 1992, starting at p. 56.

Product review of FontStudio, MacUser magazine, Sep. 1990, pp. 76 and 80.

*Adobe Type 1 Font Format*, published by Adobe Systems Incorporated, 1990.

Affidavit of John Collins concerning Fontographer and FontStudio programs, dated May 24, 1995.

Affidavit of John Collins Concerning Prior Art Programs For De–Compressing And Installing Fonts, dated Dec. 6, 1995.

*Ditital Formats for Typefaces*, by Peter Karow, Published by URW Verlag, Hamburg, Germany, 1987, Title page, Copyright Notice Page, Table of Contents, and pp. 116–117 and pp. 376 and 377.

*Character Generation Under Grid Constraints*, by Roger Hersch, Computer Graphics, vol. 21, No. 4, Jul. 1987, pp. 243–252.

*Microsoft Windows Device Driver Adaptation Guide*, © 1987–1992 by Microsoft Corporation, front cover, title page, copyright page, and pp. 122 and 123.

*Microsoft Windows Printers and Font Kit*, © 1987–1992 by Microsoft Corporation, front cover, title page, copyright page, table of contents, and pp. 86 and 87.

*PostScript Language*, by Adobe Systemes, Incorp. Seventh Printing, Aug. 1987.

*TrueType Font Embedding DLL Specification*, Mar. 29, 1995, Version 0.912, published by Microsoft Corporation.

*Teach Yourself Web Publishing With HTML In A Week*, 1995, by Sams Publishing, Indianapolis, Indiana, pp. 3–21, 137–152, 369–377, and 387–389.

*LaserJet Unlimited, Edition II*, by Nace and Gardner, published by Peachpit Press 1988, pp. 263–268 and 445.

"Adobe Acrobat In Use" by Brailsford from *Desktop Publishing Commentary*, Aug. 1993, UK. vol. 9, No. 4, ISSN 0957–3178, pp. 9–13.

"Elseware technology promise more efficient font portability" by Mark Moore, *PC Week*, vol. 10, No. 17, May 3 1993.

300 —-Search physical font list for a physical font record with the specified fontID 306 — -If the specified string fontID is not found 308 — -create a new physical font record with that fontID and add it to physical font list 310 — -call GetFontInfo() to get information from the font interpreter about the physical font 312 — -call GetCharID(), and then ExecChar(), for each of the characters used for hinting, and derive hinting values for the physical font from them 314 — -Make the matching or newly created physical font the current physical font 316 — -Search the logical font list associated with current physical font for a logical font with attribute values matching those of FontAttributes 320 — -If a complete attribute match is not found, create a new logical font record with a new logical font code having those attributes, and add it to the current physical font's logical font list 322 — -Make the matching or newly created logical font record the currently active logical font 324 — -return its logical font number as the fontCode

FIG. 7

328 — -Search the current physical font's character tree for a character record with matching specified charCode
334 — -If the charCode is found, exit CsrDoChar
336 — -If the charCode is not found
338 — -create a new character record with the charCode and place it in the character tree
340 — -initialize character shape processing
342 — -call ExecChar for that character
344 — -until ExecChar returns
346 — -when the funtion called by ExecChar is CsrMoveTo
348 — -if there is a contour open
352 — -complete and close the contour
354 — -insert the contour into the contour tree
350 — -open a contour, with the start position indicated by the CsrMoveTo
358 — -when the function called by ExecChar is CsrLineTo, CsrCubicTo, or CsrQuadraticTo
360 — -if no contour is open, exit reporting an error
362 — -store points associated with each successive outline segment described by CsrLineTo, CsrQuadraticTo, or CsrCubicTo in Character Shape Array
364 — -for each curve received, if it has any inflection or XY extreme (i.e., horizontial or vertical tangent) points, mark them as such, and if any of those marked points do not occur at an end of the received curve, divide the received curve into sub-curves at the marked point, and replaced the received curve with the two sub-curves in the character shape array
366 — -for each on-outline point received for which two adjacent outline segments have been received, detect if it is a corner or tangent, and if so mark it as such, and update the contourBBox if it is an X or Y max or min, and the actual contour direction if it is an X maximum
368 — -for the outline segment between each pair of successive marked points in the character shape array
420 — -approximate it with a line or cubic bezier curve
422 — -if it is approximated with a curve, calculate curve depth
424 — -put points representing the approxmated segment into the open contour
426 — -if any of the newly approximated segment's corresponding points in the character shape array are not part of a line segment adjacent to an as-yet unapproximated segment, delete them from the character shape array
460 — -save location in open contour as escapement value for character
462 — -flatten the contour tree to two levels to separate glyph elements
464 — -for each glyph element...
466 — -standardize contour direction
468 — -standardize contour start point
470 — -build edge and stroke lists
472 — -generate glyph signature
474 — -search glyph record tree for a glype record with a matching signature
476 — -for each match found
488 — -compare it glyph program strings (GPS) with that of current char
490 — -if they match, mark the match for the current char
478 — -if no GPS match is found for the new glyph record, insert it into the glyph record tree, unless its GPS exactly matches that of a record already in the tree
480 — -write the char's gps in order indicated by the character's contour tree, a using DOCH if it has more than one glyph or if any of its glyphs match a previously recorded GPS
496 — -update font bounding box

FIG. 9

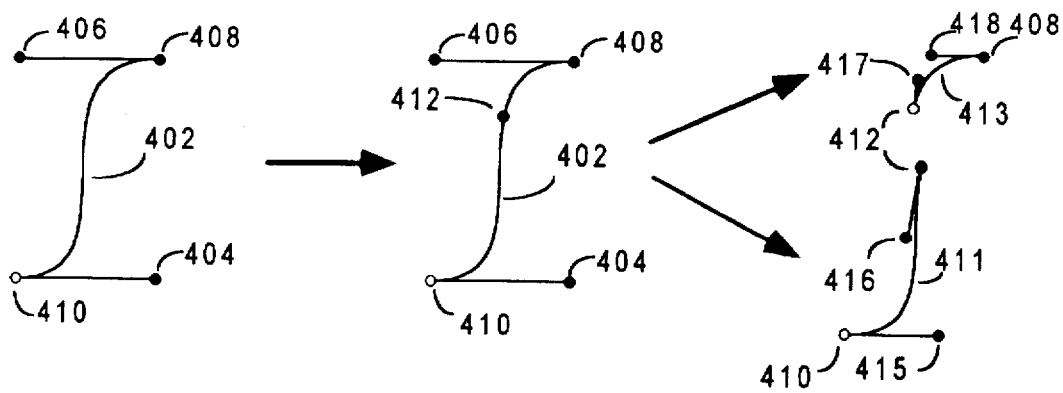

FIG. 11

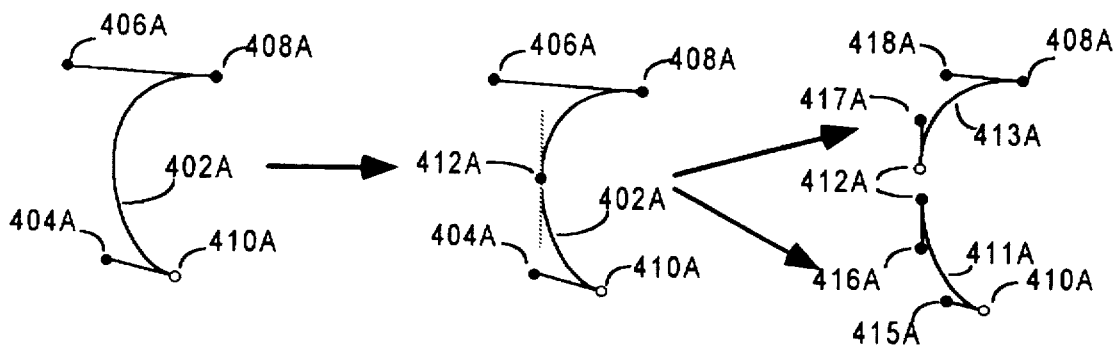

FIG. 12

370 — -find the left-most and right-most vectors (1L and 1R, respectively) from the point preceding the point being tested and a 2 ORU square centered around the point being tested 372 — -find the left-most and right-most vectors (2L and 2R, respectively) from the point being tested to a 2 ORU square centered around the following point 373 — -if both 2L and 2R are left of 1L and 1R, label the tested point as a definite left corner 374 — -else if both 2L and 2R are right of 1L and 1R, label the tested point as a definite right corner 375 — -else if 2L is to the right of 1R and 2R is to the left of 1L, label the tested point as a corner of indeterminate direction 376 — -else label the tested point as not being a corner

FIG. 13

430 — -if the distance from a vector between the entire curve's endpoints to the furthest of its control points is less than 1/2 ORU, return with a MaxDepth of 0

432 — -call the RecursiveSubdivision subroutine for the entire curve with a depth of 1

434 — -if one end of deepestSubCurve is one end of entire curve, call the RecursiveSubdivisioin subroutine for the half of the entire curve which contains the opposite end of that curve with a depth of 2

436 — -return with MaxDepth

FIG. 17

-RecursiveSubdivision (p1stEnd, p1stControlPoint, p2ndControlPoint, p2ndEnd, pdepth)

440 — -if depth > maxDepth, set maxDepth = depth

442 — -divide the curve bounded by 1stEnd and 2ndEnd into two sub-curves at a midPoint 444 — -measure the greatest deviation between the control points of each sub-curve and a vector between the endpoints of that sub-curve 446 — -if the greatest deviation for both sub-curves is less than 1/2 ORU, store 1stEnd and 2ndEnd in deepestSubCurve and return 448 — -otherwise call the RecursiveSubdivision subroutine for the subcurve with the greatest deviation

FIG. 18

126 — -PFR Structure
   500 — -logical font directory
   502 — -first logical font record
          -FontAttributeValues
          -physicalFontOffset
          -physicalFontSize
          -...

502 — -...

504 — -physical font record
          -font resolution and size
          -font hinting information
          -...
          -character record
   510 — -glyphProgramStringOffset
          -glyphProgramStringSize
   510 — -...

504 — -...
506 — -...
506 — -simple glyph program string
508 — -...
508 — -compond glyph program string
      -...

FIG. 20

FIG. 23 http server main()~621

================================================================

-loop until receive message to exit~623

-if receive http message containing a URL from a client, send file indicated in URL to client's network address contained in http message~625

```html
<HTML>
<HEAD><TITLE>TrueDoc's Benefits</TITLE></HEAD>
<BODY>
<H1>TrueDoc's Benefits</H1>
<H2>The Central Benefit: Truely Portable Electronic
Documents</H1>
<P>TrueDoc enables fonted electronic documents to be truely
  portable. It lets the characters of such a document have
  the exact same shape, relative size, and spacing on
  virtually any computer, regardless of differences in
  operating systems, font languages, installed fonts, or
  the applications being run. TrueDoc lets fonted text be
  distributed by diskette, CD ROM, LAN, WAN, Web or net and
  be seen exactly as intended by all their recipients,
  regardless of how numerous or how unusual the document's
  original fonts. All that is required for this magic to
  take place is that the document be recorded by software
  having access to a TrueDoc <A HREF="recorder.html">
  recorder</A> and that the viewing computer have a
  corresponding TrueDoc<A HREF="player.html">
  player</A>.</P>
<H2>TrueDoc's major Benefits</H>
<UL>
<LI><A HREF="platform-ind.html">Platform Independence</A>
<LI><A HREF="font-ind.html">Independent From Installed
  Fonts</A>
<LI><A HREF="app-ind.html">Application Independence</A>
<LI><A HREF="res-ind.html>Resolution Independence</A>
<LI><A HREF="sup-any-font.html">Support For Any Font
  Language</A>
<LI><A HREF="sup-any-charset.html">Support For Any Character
  Set</A>
<LI><A HREF="non-latin.html">Ability To Handle Non-Latin
  Character Sets</A>
<LI><A HREF="non-char-shapes.html">Ability To Handle Non-
  Character Shapes </A>
<LI><A HREF="fidelity.html">Virtually Exact Font
  Fidelity</A>
<LI><A HREF="compression.html">High Font Compression</A>
<LI><A HREF="performance.html">High Performance</A>
<LI><A HREF="copyrights.html">Copies Shapes Without
  Copyright Infringement</A>
<LI><A HREF="implement-ease.html">Ease Of Implimentation</A>
<LI><A HREF="same-money.html">$ave ¥ou Money</A>
</UL>
</BODY>
</HTML>
```

PRIOR ART HTML

FIG. 24

```
<HTML>
<HEAD><TITLE>TrueDoc's Benefits</TITLE></HEAD>
<PFR SRC="../global.pfr">
<PFR SRC="directry.pfr">
<PFR SRC="benefits.pfr">
<STYLE TYPE="H1" FNAME="Helvetica 24">
<STYLE TYPE="H2" FNAME="Helvetica 20">
<STYLE TYPE="P" FNAME="Arial 12" INDENT=".5">
<STYLE TYPE="LI" FNAME="Arial 12" INDENT=".75" BULLETT="Symbol 168">x
<BODY>
<NONCHAR FNAME="Bitstream WWW Shape" CHARCODE="001"><!-
Bitstream Logo->
<NONCHAR FNAME="Bitstream WWW Shape" CHARCODE="002"><!-
TrueDoc Logo->
<H1>< LFONT FNAME="Times New Roman Bold 24">TrueDoc's</ LFONT>
Benefits</H1>
<H2>The Central Benefit: < LFONT FNAME="Times New Roman Bold
20">Truely Portable Electronic Documents</ LFONT></H1>
<P>TrueDoc enables fonted electronic documents to be truely portable. It lets
the characters of such a document have the exact same shape, relative size,
and spacing on virtually any computer, regardless of differences in operating
systems, font languages, installed fonts, or the applications being run. TrueDoc
lets fonted text be distributed by diskette, CD ROM, LAN, WAN, Web or net and
be seen exactly as intended by all their recipients, regardless of how
< LFONT FNAME="Arial 20">n</ LFONT>
< LFONT FNAME="Bellevue 20">u</ LFONT>
< LFONT FNAME="Book Antiqua 20">m</ LFONT>
< LFONT FNAME="Lucida Blackletter">e</ LFONT>
< LFONT FNAME="Lucida Fax">r</ LFONT>
< LFONT FNAME="Script 20">o</ LFONT>
< LFONT FNAME="Poplar 20">u</ LFONT>
< LFONT FNAME="Tekton 20">s</ LFONT>
or how < LFONT FNAME="Stencil 16"> unusual</ LFONT> the document's
original fonts. All that is required for this magic to take place is that the
document be recorded by software having access to a TrueDoc <A
HREF="recorder.html"> recorder</A> and that the viewing computer have a
corresponding TrueDoc<A HREF="player.html"> player</A>.</P>
<H2>< LFONT FNAME="Times New Roman Bold 20">TrueDoc's</ LFONT>
major Benefits</H>
<UL>
<LI><A HREF="platform-ind.html">Platform Independence</A>
<LI><A HREF="font-ind.html">Independent From Installed Fonts</A>
<LI><A HREF="app-ind.html">Application Independence</A>
<LI><A HREF="res-ind.html>Resolution Independence</A>
...
```

MakePfrsForFiles main()~655
==================================================
-prompt for specification of FilesToBeRecorded~668
-prompt for specification of PfrsToBeUnchanged~670
-prompt for whether user wants MultipleNewPfrs~672
-call CsrOpen~673
-for each file in FilesToBeRecorded~674
    -read URLs from all file's PFR tags into CurrentDocsPfrs~676
    -load info from all file's STYLE tags into StyleTable~678
    -until end of file's text,~680
        -if PreNonCharFontName has a name on it, load it into CurrentFontName and clearPreNonCharFontName~682
        -if the current text is a NONCHAR tag~688
            -copy CurrentFontName into PreNonCharFontName~689
            -set CurrentFontName to tag's logical font name~690
            -place tag's charcode in next char buffer~691
        -if the current text is a format tag ~692
            -if text type has corresponding logical font in StyleTable, set CurrentFontName to it~693
            -else clear CurrentFontName~694
        -if the current text is an <LFONT>, save CurrentFontName in PreLFontFontName, and set CurrentFontName equal to LFONT tag's logical font name~696
        -if the current text is an </LFONT>, load PreLFontFontName into CurrentFontName~697
        -if current text is a charCode and CurrentFontName is defined~698
            -call CspOpenAlt1 with all PFRs in PfrsToBeUnchanged~700
            -call CspCreateDynamicFont with pFontId and pFontAttributes indicated by CurrentFontName~702
            -call CspSetFont for fontCode returned by CspCreateDynamicFont~704
            -if call to CspGetCharSpecs for charCode indicates it cannot render the character~705
                -call CspClose~706
                -call CspOpenAlt1 with all PFRs in CurrentDocsPfrs except those in PfrsToBeUnchanged~708
                -call CspCreateDynamicFont with pFontId and pFontAttributes indicated by CurrentFontName~710
                -call CspSetFont for fontCode returned by CspCreateDynamicFont~712
                -if call CspGetCharSpecs for charCode indicates it can render the character call CsrSetFontSpecs for CurrentFontName and pointer indicating CspDoChar is to be the ExecChar callback function for CsrDoChar~714
                -else call CsrSetFontSpecs for CurrentFontName and ExecChar function which calls operating system font interpreter~718
            -call CsrDoChar for charCode and name of current file for addition to char record, if not already on it~720
            -call CspClose~722
    -call CsrWriteResource ~724
-call CsrClose ~726

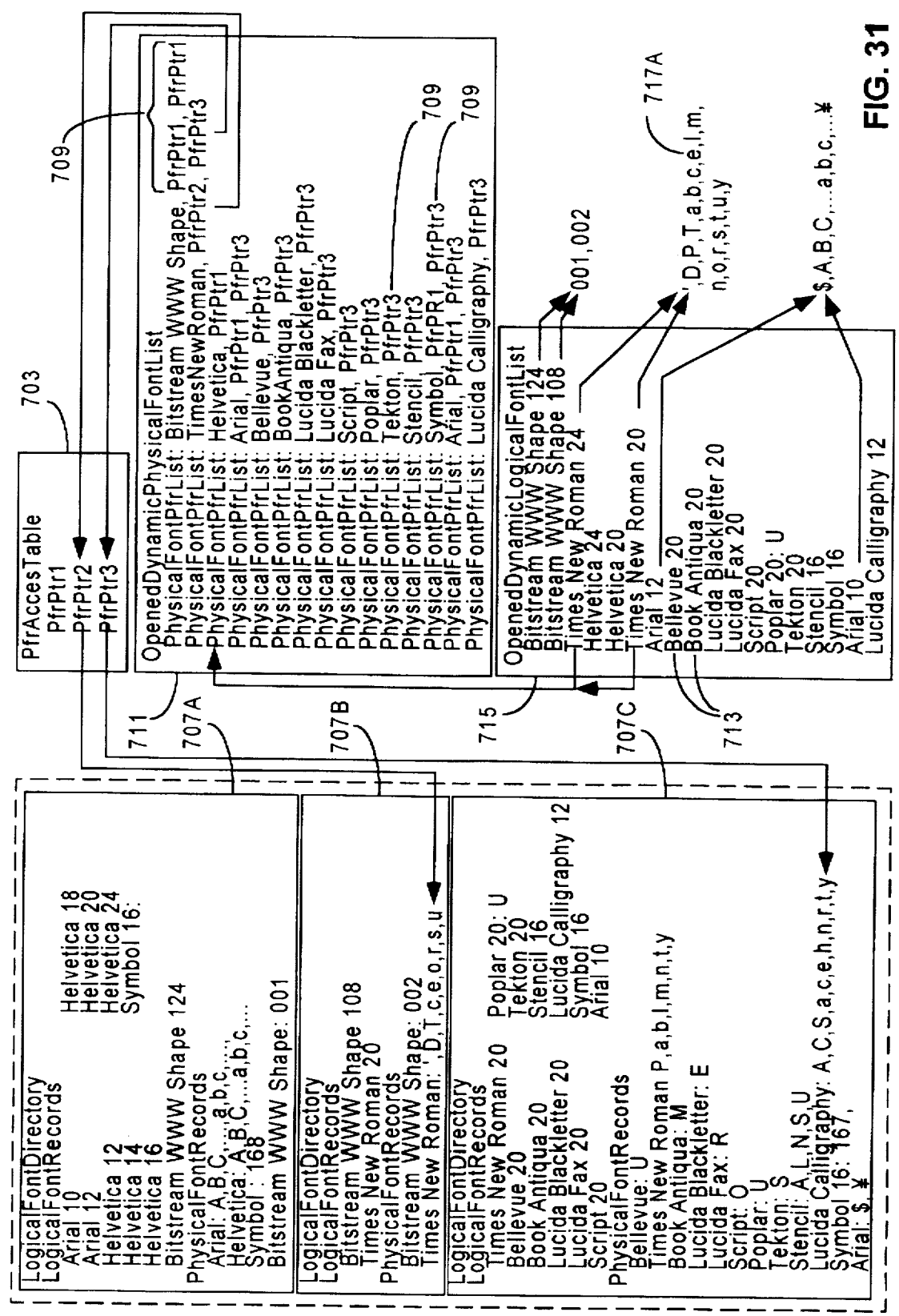

FIG. 32

CsrWriteResource()~730
================================================================
-if user has not selected MultipleNewPfrs~732
    -prompt user for name of PFR file~736
    -create new PFR from all physical font and char records created by calls to CsrSetFontSpecs and CsrDoChar~738
    -call WriteResourceData to write data to actual PFR file~740
    -for each file in FilesToBeRecorded~742
        -delete any PFR tag referencing any file not in PfrsToBeUnchanged~744
        -insert new PFR tag referencing new PFR file in each file~746
-else~734
    -until user selects to exit function~748
        -let user list and group char records by selected criteria, including BaseNewPfrs~750
        -let user select char records for new PFR~752
        -let user list HTML files which contain new PFR's chars records by selected criteria~754
        -let user select files to have new PFR~756
        -let user select path name for new PFR file~758
        -create new PFR for selected char records and their physical font records~760
        -call WriteResourceData to write data to file with selected path name~762
        -add new PFR's path name to NewPfrList~764
        -associate new PFR with all char records copied to new PFR~766
        -for each selected HTML file~768
            -insert PFR tag referencing new PFR~770
            -if all of its char-font shape are defined by it current new PFR tags~772
                -remove all PFR tags from file which do not reference PFRs in PfrsToBeUnchanged or NewPfrList~774
                -mark file as TotallyRerecorded~776

FIG. 33

Browser's Main()~780
========================================================
-initialize and display browser screen~782
-endless loop for user input~784
    -get message from message queue~786
    -if user enters URL~788
        -get or calculate new URL and load into CurrentDocsUrl~790
        -if CurrentDocsURLSameDoc is reset~-800
            -terminate any background processes relating to images or PFRs
            -call AccessNewDoc for CurrentDocsUrl
    -if user moves screen~802
        -calculate new ScreenStart in current HTML file corresonding to users move input
        -call DisplayNewScreen for CurrentDocsUrl and the new ScreenStart
    -if user selects GetIntendedFonts~804
        -set GetIntendedFonts
        -call GetAndDisplayPfrs
    -if user un-selects GetIntendedFonts~806
        -clear GetIntendedFonts and InstallIntendedFonts
        -terminate GetAndDisplayPfrs
    -if user selects InstallIntendedFonts~808
        -set InstallIntendedFonts and GetIntendedFonts
        -call InstallPfrs
    -if user un-selects InstallIntendedFonts~810
        -clear InstallIntendedFonts
        -terminate InstallPfrs
    -if user selects ShowImages~812
        -set ShowImages
        -call GetAndDisplayImages
    -if user un-selects ShowImages~814
        -clear ShowImages
        -terminate GetAndDisplayImages
        -call DisplayNewScreen for prior CurrentDocsUrl and ScreenStart
    -...
    -if user selects to exit browser~816
        -call CspClose
        -uninstall all pfrs
        -close all of browser data structures
        -exit browser

FIG. 34

AccessNewDoc()~818
=================================================================
-call GetUrlFile for DocsUrl~820
-if DocUrl has anchor name~822
    -seach for it in file
    -set ScreenStart to line in which anchor occurs
-if file contains STYLE tag~824
    -copy browser's default StyleTable into DocStyleTable~826
    -copy values for STYLE tag text types into DocStyleTable~828
-unless file has <PFRWAIT> tag, call DisplayNewScreen for current file and ScreenStartl~830
-if file has any PFR tags~832
    -read PFRs listed in PFR tag into CurrentDocsPfrs~834
    -if CurrentDocsPfrs not same as previous CurrentDocsPfrs~836
        -uninstall any fonts in CurrentInstalledPfrFonts
        -clear CurrentInstalledPfrFonts
    -if GetIntendedFonts is set, call GetAndDisplayPfrs~838
    -if InstallIntendedFonts is set, call InstallPfrs~840
-if ShowImages is set, call GetAndDisplayImages~842

FIG. 35

GetUrlFile()~850
=================================================================
-if local file name~852
    -read file into buffer
    -return
-if network address~854
    -open terminable background communication process to execute the URL request and connect its input to buffer
    -if communication process is complete, return

FIG. 36

GetAndDisplayPfrs()~850
=================================================================
-for each PFR listed in CurrentDocsPfrs~852
    -if PFR is in PfrCacheTable, set its LastUsedTime to current time~854
    -else~856
        -send HTTP message to get PFR over net~858
        -if PfrCache is full, deletes one or more PFRs not in CurrentDocsPfrs with oldest LastUsedtTime to make room for new PFR~860
        -load new PFR into PfrCache~862
        -set new PFR's LastUsedTime to current time~864
-call DisplayNewScreen for document and ScreenStart~866

FIG. 37

DisplayNewScreen ()~870
================================================================
-if there are no CurrentInstalledPfrFonts and if the CurrentDocsPfrs are in PfrCache~872
    -call CspOpenAlt1 for any such PFRs~874
    -call CspInitBitmapCache ~876
    -call CspSetOutputSpecs for bitmaps~878
    -determine browser's outputMatrix and outputBBox from location, scale, and rotation of image being created relative to document being displayed~880
-from ScreenStart until end of text being rendered~882
    -if PreNonCharFontName has a name on it, load it into CurrentFontName and clearPreNonCharFontName~884
    -if the current text is a NONCHAR tag~886
        -copy CurrentFontName into PreNonCharFontName
        -set CurrentFontName to tag's logical font name
        -place tag's charCode in next char buffer
    -if current text is a format tag, look up in DocsStyleTable to find current text type's font name, and make it the CurrentFontName~888
    -if the current text is an <LFONT>, save CurrentFontName in PreLFontFontName, and set CurrentFontName equal to LFONT tag's logical font name~890
    -if the current text is an </LFONT>, load PreLFontFontName into CurrentFontName~892
    -if the current text is an image tag~894
        -if ShowImages is set and if have file named in image tag, render it at tag's location on screen~896
        -else show ALT text, if any~898
    -if the current text is a charCode~900
        -if CurrentInstalledPfrFonts is not empty, call OS's font interpreter for char's image, output it, and update doc and device XYs~902
        -else~904
            -if call to os indicates font interpreter can render charCode in CurrentFontName, call font interpreter for char's image, output it, and update doc and device XYs~906
            -else~908
                -call CspCreateDynamicFont for CurrentFontName~910
                -call CspSetFont for fontCode returned by CspCreateDynamicFont~912
                -call CspDoChar for char and cur. device XY and wait for call to SetBitMap to output char~914
    -call CspClose~916

FIG. 38

InstallPfrs()~920
====================================================
-uninstall any fonts listed in CurrentInstalledPfrFonts~922
-clear CurrentInstalledFonts and DynamicFontCodeList~924
-call CspOpenAlt1 for all of PFRs in CurrentDocsPfrs~926
-for each physical font corresponding to a STYLE, LFONT, or NONCHAR tag in the current HTML file which is not yet in CurrentInstalledPfrFonts~928
    -if the physical font is not installed in OS~930
        -add physical font name to CurrentInstalledPfrFonts~932
        -call CspCreateDynamicFont for a corresponding logical font's pFontId and pFontAttributes and save returned fontCode in DynamicFontCodeList~934
-call TTInit with pointer to WriteData function to be used and 0 in bPcl to indicate fonts are to be installed~936
-for each fontCode in DynamicFontCodeList~938
    -call TTSetFont for fontCode, and when TTSetFont calls WriteData, which writes installable TrueType fonts to buffer and then install them in the OS~942
-call CspClose~944

FIG. 39

TTSetFont()~950

==================================================

-if a PhysicalFontRecord for fontCode's physical font is already open~952
    -if bPcl is 1~954
        -generate printer command to switch to named physical font
        -call WriteData with command
        -return
    -if bPcl is 0, return~956
-create a PhysicalFontRecord for fontCode's physical font~958
-call CspSetFont for fontCode~960
-call CspGetFontSpecs to get hinting information from pFontInfo, translates it into TrueType format, and then copies it into the current PhysicalFontRecord~962
-call CspSetOutputSpecs to set CSP to outline mode~964
-call CspListChars~966
    -for each callback to ListCharFn with each charCode of the current physical font (not in-line)~968
        -clear CharRecord~970
        -call CspDoChar for the charCode returned by ListCharFn~972
            -for each call back from CspDoChar (not in-line)~973
                -if MoveTo, LineTo, or CurveTo is called-back, add corresponding points to the CharRecord's point array~974
                -if Vstem or Hstem is called-back, add hinting points to CharRecord~976
                -if ClosePath is called back, indicate last point in point array was an end of contour~978
        -create TrueType font description from CharRecord, including~980
            -read out each contour in reverse order, approximating cubic beziers segments quadratic ones~982
            -translate hinting information~984
-if bPcl is 1, Translate physical font and character information into PCL/eTTo format~988
-if bPcl is 0, translate physical font and character records into installable TrueType fonts~990
-call WriteData indicated in TTInit with output~992

APPARATUS AND METHODS FOR CREATING AND USING PORTABLE FONTS

REFERENCE TO PRIOR APPLICATION

The present application is a continuation-in-part application of U.S. patent application Ser. No. 08/250,372, filed by the inventors of this application, John S. Collins and Mark H. Goldwater, on May 27, 1994 now U.S. Pat. No. 5,583,978.

FIELD OF THE INVENTION

The present invention relates to computer font technology, that is, the computer technology of representing and generating the shapes of alphanumeric characters and other images used with text.

BACKGROUND OF THE INVENTION

Since the beginning of the written word, creators of documents have been concerned not only with how their words would sound to the ear if spoken, but also with how they appear to the eye when read. Before the advent of print, calligraphy was a major art form. With print, the art of creating and using fonts has superseded calligraphy in importance.

A font is a set of shapes representing each character in an alphanumeric character set. Usually the shapes of different characters in each font share certain characteristics, such as horizontal and vertical position of certain shape features, the general width of their vertical and horizontal strokes, and whether or not they are serifed, bold, or italic, so that the characters of a given font look appropriate together.

Commonly a font is identified by a basic font name, such as "Courier", "Arial", "Helvetica", or "Times New Roman" which identifies the general shapes of its characters, independent of size. These basic font names are often trademarks owned by the designers of the font. The basic font name is often followed by a point size designation which specifies the size of that font. Sometimes other words are inserted between the basic font name and the point size, such as "bold", which means its strokes are to be thicker; "narrow", which means its entire characters are to be made more narrow; "italic", which means its characters are to be slanted; or "oblique", which is used for sans serifed characters and means its characters are to be slanted.

The ability to vary fonts has many advantages. It lets a user vary the size of his letters to pack text more densely when necessary and to allow text to be more easily read. Using different fonts also has the ability to visually distinguish different parts of the text. This makes texts easier to scan and use. In addition, some texts are more visually pleasing than others, whereas some are easier to read. Different fonts appeal to different aesthetic senses. Some appear traditional, some modern, some art nouveau, some art deco, some hand written, some humorous, and some shocking. The ability to select from a wide variety of fonts greatly increases the ability to tune the aesthetic message of a document.

When the computer age started, most computers only represented text in one font. In the last decade or so, however, an increasing percentage of computer systems have the ability to display and print text in several different fonts. Most such computers have font resources which contain pre-defined font descriptions for the shape of each character of each of the fonts it can handle. The pre-defined font descriptions describe character shapes in a specified form or language.

Some font languages represent shapes as bitmap images which can be translated directly to the pixels on a video display or a laser printer. This has the advantage of being fast, but it has the disadvantage of requiring a different set of font descriptions for each different size.

More recently there has been a trend to scalable font languages. These languages define character shapes in terms of the one or more outlines which define its shape. Each such outline is defined by a move to a starting location and then a sequence of outline segments, each of which is either a line or a curve, such as a Quadratic or Cubic Bezier curve or a circular arc, followed by a move to the standard position for starting the next letter. A Bezier curve is a well-known type of curve defined by its two on-curve endpoints and one or two off-curve control points located between them. Quadratic Bezier curves only have one off-curve control point, with the curve at each endpoint being tangent to a line from that endpoint to the control point and with the angle of the curve reflecting the angle formed by those tangent lines. Cubic Bezier curves have two off-curve control points, with the curve at each endpoint being tangent to the line to its closest control point and with the curve's extent in the general direction of each such tangent near an endpoint being a function of the length from that endpoint to the tangent's associated control point. The lines and segments are usually defined in a resolution of either 1000×1000 or 2048×2048 units, called outline resolution units, or ORUs. Since these font descriptions define a shape in terms of lines and curves and since that definition is made with a high resolution, they can be used to generate font images of virtually any desired size.

In scalable font technology the set of font descriptions defining the outline shapes of each character in a character set can be considered a base, or physical, font. The variously sized fonts generated from such a physical font are considered logical fonts, because they do not have separate shape descriptions associated with their characters, but rather generate such shapes at the specified size from the scalable physical font description. Using such nomenclature, there would be, for example, physical font associated with the base font name "Arial", and that physical font would have associated with it any logical font which had the name "Arial" followed by a point size specification, such as "Arial 12" or "Arial 24". Normally a separate physical font is provided for font names which include "Bold", "Italic", or "Narrow", but fonts with the word "Oblique" in their name are often generated by slanting the shapes of the corresponding physical font, and the same could be done, if necessary for "Italic" if no corresponding italic physical or base font is provided.

There are currently several major scalable font languages. They include PostScript, developed by Adobe Systems Incorporated, of 1585 Charleston Road, Mountain View, Calif. 94039, TrueType, developed by Apple Computer, Inc., 20525 Mariani Avenue, Cupertino, Calif. 95014; Speedo, developed by Bitstream Inc., the assignee of this application; and Intellifont, developed by the AGFA division of Miles Inc, 90 Industrial Way, Wilmington, Mass. 01887. Each of these languages uses a different code or format to describe shapes and represents shapes in different ways. For example, TrueType uses quadratic Bezier curves to define the shape of curve segments, whereas PostScript and Speedo use Cubic Bezier curves, and Intellifont use circular arcs.

For a computer to render a font named in a given document, it requires not only a bitmapped or scalable font description of that font's characters, but also software, called a font interpreter, that knows how to interpret the particular code in which each font language's font descriptions are written and convert them into a bitmap pattern or a sequence of moves and outline segments.

Unfortunately, not all computers have the same font descriptions or the ability to interpret the same font languages. This creates a problem if an electronic document is created on a first computer using one or more given fonts and is then transferred to second computer which does not have those fonts or which cannot interpret them. In such a case, when the document is shown or printed on the second computer it has different fonts than intended. This can cause the document to have a very different, and often undesired appearance, and can disrupt its spacing and pagination. In highly formatted text, such a text with columns, this can make the text almost unreadable. In addition, some fonts have special characters not found in other fonts, or use different character codes than are commonly used in other fonts so that such a font mismatch can not only disrupt the appearance and organization of a document, but can also cause information to be lost or be garbled.

One solution to the problem of making fonted text portable is to send a copy of all fonts and font interpreters needed to properly render the characters of a document along with it. Unfortunately this has many problems. First, finding out what fonts and interpreters need to be sent with each such document and installing them on the viewing machine would be labor intensive. Furthermore, it would present legal problems because, even though the actual shape of fonts have long been held not to be copyrightable, both the code and sequence of outline segments contained in font descriptions have been considered by many to be copyrightable, and thus cannot be installed in a new machine without legal permission.

There have been multiple prior attempts to deal with this problem.

A first prior approach is to use software that enables the computer playing back a document to attempt to approximate a font called for in the document with a font which is similar, if it has one. Such systems attempt to replace one serifed font with another, one italic with another, and so on. Unfortunately, this approach still requires that the computer playing back a document have fonts which approximate those it is to replace, and the approximations are often disappointing.

Another prior technique amplifies this first approach by using software that sends information along with documents explaining the size of each character in each of the fonts used. This enables corresponding software in the playing computer to stretch or compress whatever font it is using to approximate a missing font to produce a font which has the same spacing. This provides the valuable advantage of preventing the formatting of documents from being upset due to spacing differences, but is still is only an approximation.

Another prior approach has been to embed, or include, font descriptions with the document so the party at the other end can use them. The makers of such embeddable fonts have designed them so they can only be used in the document in which they have been included and thus have granted a license for such a copy of their font descriptions to be made without requiring express permission. Unfortunately, all such systems of which we are aware only work with fonts of one language and assume that the computer on which their documents are to be played has interpreters for that language. Thus the documents produced cannot be properly reproduced if the machine playing them back does not have the proper font interpreter and it even if does, it can only provide insured portability for fonts written in that interpreters one language.

Another prior approach is to have a document recorder application which records bitmap images of all character-font shapes included in a document from the font interpreter of the computer creating the document and embeds them in a copy of the document. The resulting portable document is designed to be viewed or printed from a player application on another computer. The player renders the shape of each character in the document from its associated embedded font. The program has the ability to, in effect, creates bitmapped physical and logical fonts. That is, if the user decides he or she does not want to have to store separate bitmap images for the same shape font in different sizes, the system will store it in one size and on playback attempt to generate bitmap patterns at different sizes from it.

This approach appears to avoid copyright problems, because it has long been held that the shape of fonts is not copyrightable and the bitmap patterns copied are determined largely by the shape of the font's original pre-defined font descriptions rather than from the actual code or sequence of moves and outline segments used in that description. It also has that advantage of being able to play back any font handled by the computer creating the document. It has the disadvantages of requiring a large amount of memory to produce a large variety of fonts accurately.

The issue of being able to see fonted documents on machines other than those on which they have been created is being made even more important by the ever increasing use of computer networking. Such networking is constantly increasing the amount of time people spend viewing text created on other machines, and the number of different machines from which they are receiving such text. Because the communication rates of many network links is rather limited, the amount of time it requires to communicate the fonts associated with a document can become a major consideration. For example, just one TrueType outline font can commonly be as big as sixty-five thousand bytes. If a document included ten fonts, it would require six hundred and fifty thousand bytes to send the fonts necessary to render it. At a 14.4Kbit communication bandwidth common for many business and home connections to electronic networks, it would take over seven minutes to receive, render, and see such a documents, a length of time which would be unacceptable in many applications.

But there is a strong impetus to be able to freely use fonts on electronic networks. Fonts make text more appealing, more interesting, and more capable of highlighting different types of information. For example, the rate of usage of the World Wide Web (the "Web") has recently been growing exponentially. One of the many benefits of the Web is that it allows users to hop from one data base to another any where in the world with the click of a mouse. This lets users "surf" the Web in the same was as the television remote control lets users "surf", or change between channels. In such an environment it is important for Web sites to be able to quickly provides users with distinctive and attractive screens so as to better catch and please the user's eye in cyberspace's intense competition for attention.

Text on the Web is written in HTML, a text mark-up language. An HTML text contains a sequence of ASCII charcters which include tags, sequences of characters which an HTML browser, a program for displaying HTML text in a formatted manner, reads and understands. Most tags are used to indicate the text type of an adjacent portion of the HTML files displayable text. Currently, most bowsers let their individual users select which logical fonts are to be used to display each of the different text types recognized by the Browser in response to such format tags. This can often create problems because the person creating the HTML document has no way of knowing what font is going to be used to show what text. As a result those who prepare HTML documents have little control over how they will appear to most users.

On-line services often have more control over over how their screens appear to users than people who develop Web sites. This is because their users usually run software provided by the on-line service which can be programmed to render screens in a desired manner. Currently many such programs come with a CD ROM which allows the user's computer to store many of the images and fonts necessary to renders screens without the need to have them sent over the network. This works well for many purposes, but has the drawback that it makes it virtually impossible for the on-line service to use any fonts which are not on the CD ROM.

SUMMARY OF THE INVENTION

It is an object of the present invention to provide an apparatus and method for creating and playing back portable documents, that is documents in which text with a variety of different fonts can be accurately played back by a machine which does not previously have font descriptions and font interpreters for all of that document's fonts.

It is yet another object of the present invention to provide such an apparatus and method which creates such portable documents and/or their associated font descriptions automatically.

It is still another object of the present invention to provide such an apparatus and method which creates such documents and/or their associated font descriptions quickly.

It is yet another object of the present invention to provide such an apparatus and method which creates portable font descriptions which do not require much storage space.

It is still another object of the present invention to provide an apparatus and method for automatically creating new font descriptions of character shapes defined in old font descriptions while avoiding copying certain features in such old font descriptions which are not required to describe those shapes.

It is yet another object of the invention to provide an apparatus and method for enabling fonted electronic documents to be rapidly transmitted over electronic networks.

It is still another object of the invention to provide an apparatus and method for enabling fonted electronic documents to be rapidly viewed over electronic networks.

It is still another object of the invention to facilitate the mantenance of font descriptions for a body of text as that body is changed.

It is still another object of the invention to facilitate the use of fonted text on the World Wide Web.

According to one aspect of the invention a computerized system translates predefined font descriptions into new font descriptions and then installs those new descriptions into a computer's operating system so those descriptions' shapes can be rendered by standard operating system calls for the rendering of character shapes. Preferably the new font shape descriptions depend only on the shapes defined by the predefined font descriptions, and not the manner in which those shapes have been defined. Preferably the new font descriptions are created on one computer system and then transfered to, and installed on, a second computer system, often one that does not have all of the original pre-defined font descriptions used to create the new font descriptions. Usually the new font descriptions translated are specific to a particular body of text. These new font descriptions are often translated into one font description language and then transfered to one or more computers in conjunction with the transfer of all or a portion of the body of text. The computer which receives the new font descriptions translates them into a language its operating system's font functions supports, installs them, and then uses them to render the portion of text received.

BRIEF DESCRIPTION OF THE DRAWINGS

These and other aspects of the present invention will become more evident upon reading the following description of the preferred embodiment in conjunction with the accompanying drawings, in which:

FIG. 7 is a more detailed flow chart of the functional steps performed by the CsrSetFontSpecs function shown in the character shape recorder in FIGS. 4 and 6;

FIG. 9 is a more detailed flow chart of the functional steps performed by the CsrDoChar function which is part of the character shape recorder in FIGS. 4 and 6;

FIGS. 11 and 12 are a diagramatic representations of how step 364 of FIG. 9 divides curve segments received by the character shape array at inflection and X extreme points, respectively;

FIG. 13 is a more detailed description of the corner detection functionality described in step 366 of FIG. 9;

FIGS. 17 and 18 are more detailed flow charts of the steps used to perform the curve depth analysis of step 422 of FIG. 9;

FIG. 20 is a schematic representation of the data element contained in the portable font resource shown in FIGS. 1, 6, and 21;

FIG. 23 is a highly simplified flow chart of the functional steps performed by the HTTP server of a World Wide Web site in the embodiment of the invention shown in FIG. 22;

FIG. 24 shows the text of an HTML file, benefits.html, shown in FIG. 22 without any of the extensions to the HTML language used with FIG. 22's embodiment of the invention;

FIG. 27 shows the same HTML file as in FIG. 24 after tags defined by FIG. 22's embodiment of the invention have been added to it to enable it to specify the fonts to be associated with various portions of its text and to identify portable font resource files containing the font descriptions necessary to render them;

FIG. 29 is a highly simplified flow chart of the functional steps performed by the main function of a program, MakePfrsForFiles, which is used to create one or more portable font resource ("PFR") files for set of HTML files which have their fonts defined by fonts installed in the operating system, by other PFR files, or by both;

FIG. 31 illustrates data structures, including a PFR cache and PfrAccessTable, which are used to create a dynamic font, that is a font which contains font descriptions from multiple PFRs;

FIG. 32 is a highly simplified flow chart of the functional steps performed by the function CsrWriteResource called by MakePfrsForFiles program of FIG. 29 to create one or more PFR files from the font descriptions created by MakePfrsForFiles;

FIG. 33 is a highly simplified flow chart of the functional steps performed by the main function of the Web browser program, browser.exe, shown in FIG. 22;

FIG. 34 is a highly simplified flow chart of the functional steps performed by the AccessNewDoc function used by the Web browser of FIG. 22 to access an HTML file over the Web and to display it on a computer screen;

FIG. 35 is a highly simplified flow chart of the functional steps performed by the GetUrlFile used by the Web browser of FIG. 22 to access files over the net identified by Uniform Resource Locator, or URL;

FIG. 36 is a highly simplified flow chart of the functional steps performed by the GetAndDisplayPfrs function used by the Web browser of FIG. 22 to obtain over the net, and cache, any of an HTML file's associated PFR files which the browser does not already have cached, and to display the HTML file once all its PFR files have been cached;

FIG. 37 is a highly simplified flow chart of the functional steps performed by the DisplayNewScreen function used by the Web browser of FIG. 22 to display a screen of an HTML file;

FIG. 38 is a highly simplified flow chart of the functional steps performed by the InstallPfrs function used by the Web browser of FIG. 22 to convert all of the fonts contained in an HTML file's PFR files into fonts compatible with the font manager of the operating system of the browser's computer and to install those converted fonts into the operating system so they can be rendered by calls to the font manager;

FIG. 39 is a highly simplified flow chart of the functional steps performed by the TTSetFont function used by the InstallPfrs function of FIG. 38 to perform the actual conversion from PFR font descriptions into installable fonts.

DETAILED DESCRIPTION OF PREFERRED EMBODIMENTS

Figure 1:
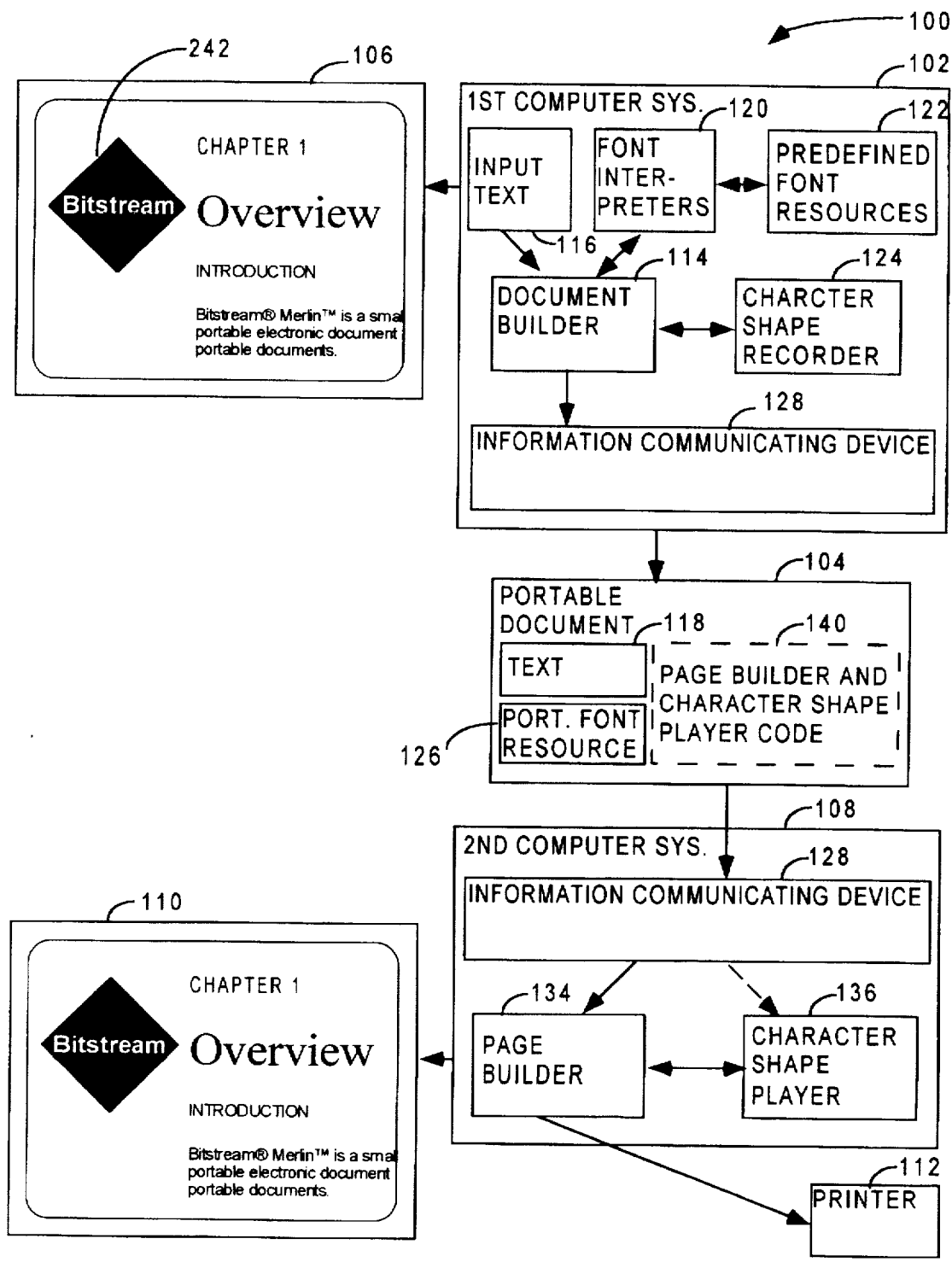
FIG. 1 is a high level block diagram of one embodiment of the invention in which a first computer converts an input text written using a plurality of pre-defined font descriptions into a portable document having new font descriptions and in which a second computer receives the portable document and renders an image of it using the new font descriptions it contains.

FIG. 1 provides an overview of a system 100 for creating and playing back portable fonted documents. This system includes a first computer 102 in which the portable document 104 can be created, and its accompanying video monitor 106. It also includes a second computer system 108 in which the portable document can be played back, and its accompanying video monitor 110 and printer 112.

The computers 102 and 108 are preferably computers, such as personal computers or computer workstations, which include memory devices for storing program instructions and data structures and one or more processing element for executing such instructions and manipulating such data structures. As the computer's one or more processors execute such instructions, it forms the functional element described for each of these computers.

The first computer 102 includes a document builder 114. This document builder has means for receiving a fonted input text 116. Such a text can be received from an external source, such as a disk or data network, or it can be created in a program running on the first computer, such as a word processor or desktop publishing program. The input text is comprised of a sequence of font names, text characters, and positioning codes. Normally each text character is associated with the first font name to precede it in the sequence, and each such font name has associated with it a set of coded pre-defined font descriptions in the computer's font resource 122 describing the shape of each character in that font.

The document builder places codes corresponding to each of the input text's successive font names, text characters, and position codes into the text 118 of the portable document 104. In addition, for each unique combination of a character and font name in the input text, the document builder creates a new font description for the shape described in its corresponding pre-defined font description.

It does this by causing the first computer's font interpreter 120 to interpret the character-font shape's pre-defined font description in the computer's font resource 122. The font interpreter translates the coded pre-defined font description into a sequence of moves, lines, and curves which define the outline of the character-font shape. It provides these to the document builder. The document builder, in turn, supplies this interpreted shape description to the first computer's character shape recorder ("CSR") 124. The CSR includes the capability to model the shape contained in the interpreted description, and to produce a new font description which is virtually independent of any aspects of the interpreted font description which are not required by the shape it represents. The CSR returns this new font description to the document builder, which then places it in the portable documents portable font resource 126, indexed by the codes used to represent its associated font and character in the portable document's text 118.

Figure 2:
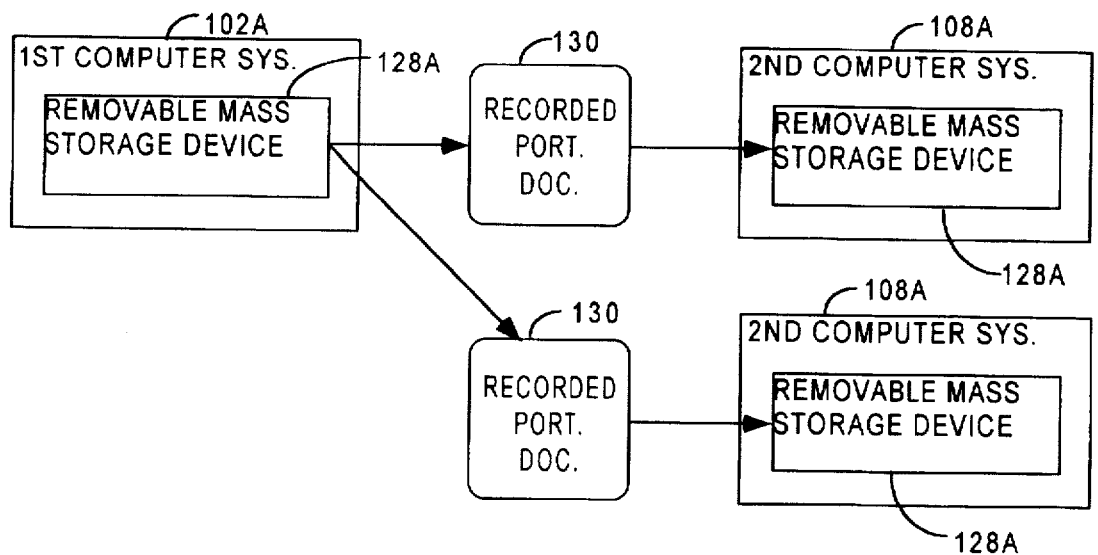
FIG. 2 is a high level block diagram of a version of the embodiment show in FIG. I in which the portable document is communicated between first and second computers on a removable mass storage medium.
Figure 3:
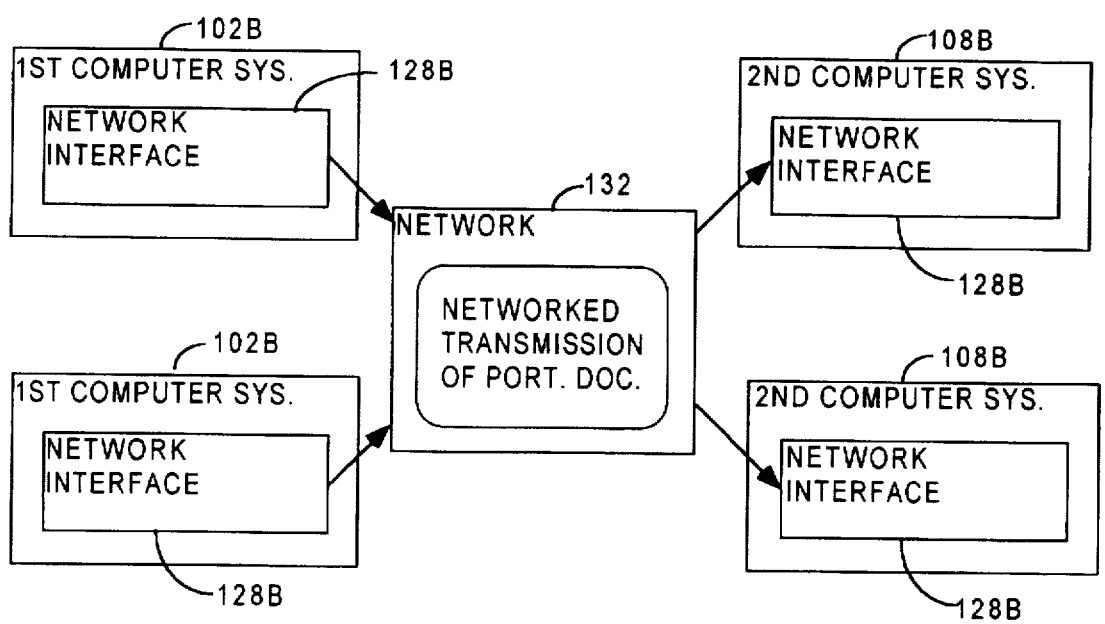
FIG. 3 is a high level block diagram of a version of the embodiment shown in FIG. 1 in which the portable document is communicated between first and second computers over an electronic data network.

Both the first computer 102 and the second computer 108 include a device for communicating information between them. As is indicated in FIG. 2, this device can be a device 128A for communicating the portable font resource from the first to the second computer on a removable mass storage medium 130, such as a magnetic or optical disk, CD, or tape. The removable medium 130 can include singly produced copies, or mass produced copies. As is indicated in FIG. 3 it can also be a network interface 128B which can communicate the portable document over a network 132. The network 132 can include LANs, WANs, telecom connections, on-line services, the internet, and, in the future, the so-called information highway.

The second computer 108 also includes a page builder 134 and a character shape player ("CSP") 136. The page builder creates a rendered image, such as a page image or a screen image from the portable document. It reads the successive font, character, and position codes from the text 118 of the portable document 104. It uses the font codes to determine the font associated with each character. It uses the position codes to position the characters in the rendered image. In response to each character code, it asks the CSP to generate the shape for that character given its associated font code. The CSP generates this shape from the new font description indexed under that character and font in the Portable Font Resource 126. It delivers this shape to the page builder which places it at the proper location in the rendered image, and which then sends that rendered image either to an output device, such as the video monitor 110 or the printer 112.

Thus, it can be seen that the embodiment of the invention shown in FIG. 1 allows a fonted document created with the font interpreters and pre-defined font resources of the first computer, such as that shown in the first computer's display 106, to be communicated to, and visually rendered with virtually the exact same appearance by a second computer which does not have those font interpreters and font resources. And it does so without copying the copyrightable shape-independent aspects of the first computer's pre-defined font descriptions.

Since the character shape recorder 124 of the first computer can create a new font description for any shape described to it as a sequence of moves, lines, and quadratic and cubic Bezier curves, it can create new font descriptions from any font description language which the first computer's font interpreter can interpret into such a sequence of move, lines, and curves. Since all the major font description languages have associated font interpreters which can provide such output, or output which can be easily converted into such a form, this means the invention can be used with all such font description languages, even if they occur in the same document.

In some alternate embodiments of the invention the document builder includes means for placing representations of bitmap fonts in the portable font resource 126. This includes means for recording the bitmap pattern received from the font interpreter 120 for small fonts directly as the font descriptions for such images in the portable font resource. The document builder in such embodiments also includes means, used when larger bitmaps are received, for performing edge detection on the bitmap pattern, creating a move instruction to a first point on each edge in the pattern, and a line corresponding to the distance between each successive point on that edge, and supplying that sequence of moves and line segment to the character shape recording process described above. With these features, it can be seen that the invention enables virtually any document created with virtually any font to be accurately reproduced on another computer which does not contain the original font descriptions from which it was created.

The basic concept disclosed in FIG. 1 has many applications. In some, the document builder 114 and character shape recorder 124 are built directly into a user application, such as a word processor, draw program, or desktop publisher. In others, it is built into the operating system. In others still it is placed in a driver module which is interfaced to as a printer driver, so that it can interface to virtually any major application designed to run on its associated computer platform.

Similarly, in some applications the page builder 134 and character shape player 136 are built into a much larger user application. In others, it is part of special portable document viewer application. And in others still, it is built into the operating system.

The nature of the portable document varies with use of the document builder 114, recorder 124, page builder 134, and character shape player 136. For example, in many systems in which these modules are all built into a much larger user application, the portable document is a normal file for that application. In systems in which the document builder and recorder are in a print driver module and the page builder and player are part of a document viewer program, the portable font document cannot normally be read by the application which originally created its fonted text. In systems in which the document builder, recorder, page builder, and player are incorporated into the operating system, any file produced by any application compatible with that operating system can be a portable document 104.

In some embodiments, a single computer includes both the document builder and recorder, as well as the page builder and player, so that computer can both send and receive portable documents.

In some embodiments the portable document includes the page builder and player code so a computer reading the portable document can view the portable documents text and fonts without having to previously have a copy of the page builder and recorder.

Figure 4:
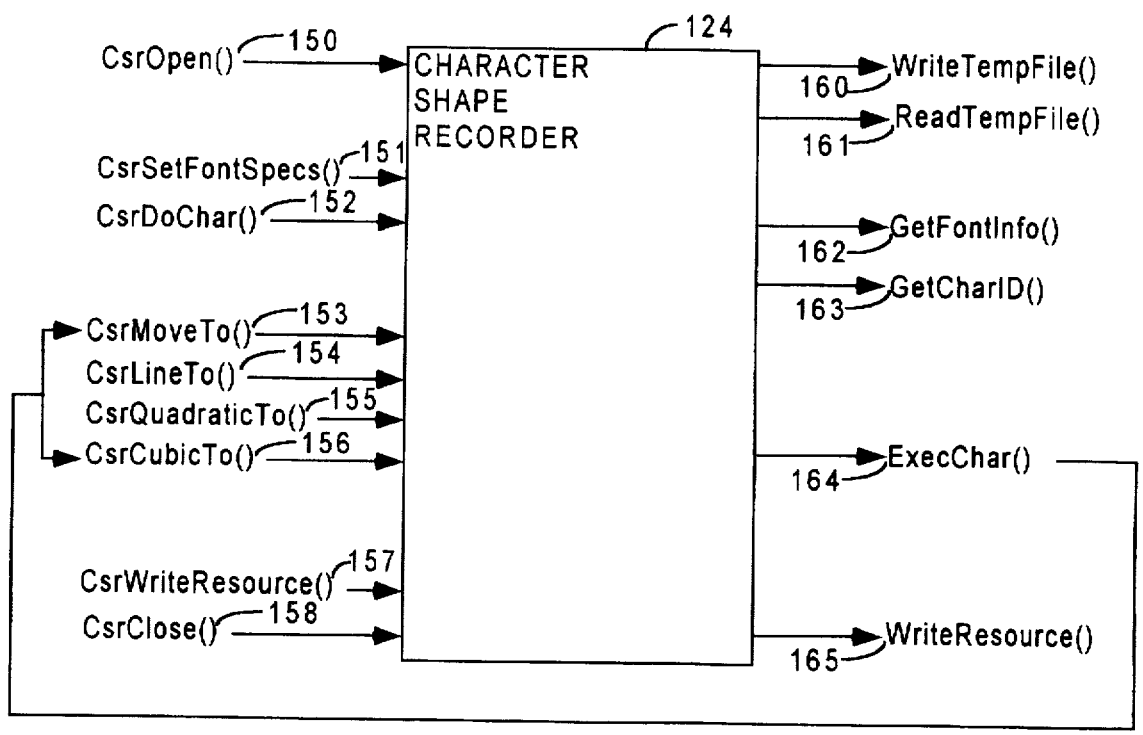
FIG. 4 is a diagram of the functional interface of a character shape recorder software module designed according to the present invention for a plurality of uses, including use as the character shape recorder of the first computer in FIG. 1.
Figure 5:
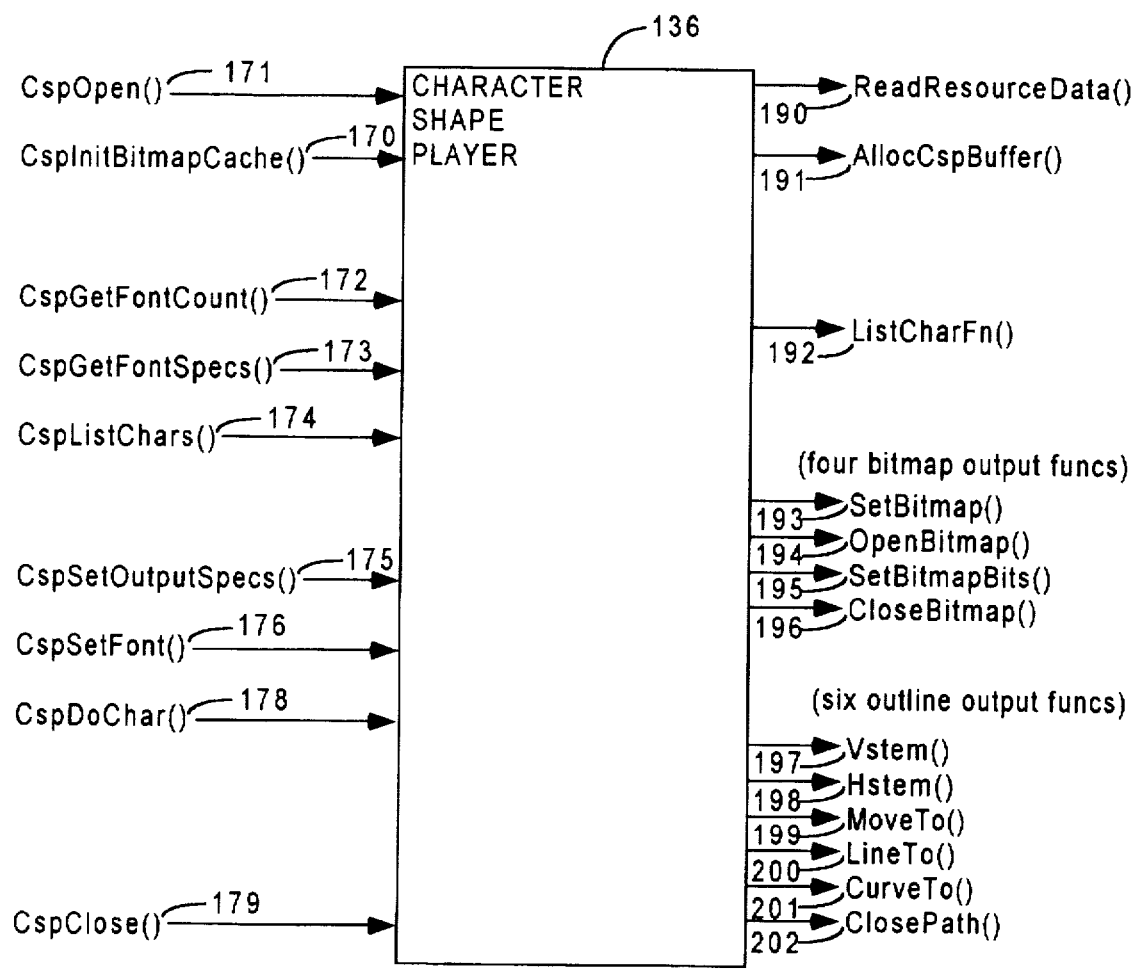
FIG. 5 is a diagram of the functional interface of a character shape player software module designed according to the present invention for a plurality of uses, including use as the character shape player of the second computer shown in FIG. 1.

FIGS. 4 and 5 show a preferred embodiment of the character shape recorder 124 and character shape player 136, respectively. In this embodiment, both the recorder and player 136 have been designed as discrete software modules. They have been modularized so their code can be used in a plurality of different software applications, different computers, and different operating systems. They have been written in the commonly used C programming language which is supported on almost all major computer systems. They do not include any functions which are operating system dependent. And they do not include much functionality that is likely to vary from application to application.

In some embodiments, for example, the recorder and the player are part of a software application that run on Unix, IBM PC compatible, and Apple Macintosh computers. In each machine dependent version of this application they are surrounded with code which interfaces with the operating system, performs the functions of the document and page builders, and creates portable documents which can be read by the corresponding versions of the application on the other types of computers. This enables fonted portable documents created on one type of computer to be played back with virtually the exact same appearance on another types of computer.

The modularization of the recorder's and the player's functionality also allows them to be used for purposes different than that described in FIG. 1. For example, in one embodiment of the invention the recorder is used as part of a program which creates sets of new font descriptions from sets of pre-defined font descriptions, independently of any input text. Once created, such new fonts can then be used with any application containing a player module.

In FIGS. 4 and 5 the function calls which can be made by host software using each module are shown on the left. These are the functions 150–158 in FIG. 4 and 170–178 in FIG. 5. In these figures, the function calls made by the module back to its host software are shown on the right. These so-called "callback" functions are numbered 160–165 in FIG. 4 and 190–202 in FIG. 5. The code of the functions on the left in each figure is part the recorder or player module. The code of the callback functions on the right is included in the host software which uses such modules.

In FIG. 4, the functions CsrMoveTo, CsrLineTo, CsrQuadraticTo, and CsrCubicTo, are pointed to by a line from the callback function ExecChar because these functions are called by ExecChar to deliver the moves, lines, and curves which define a character's shape to the recorder.

Figure 6:
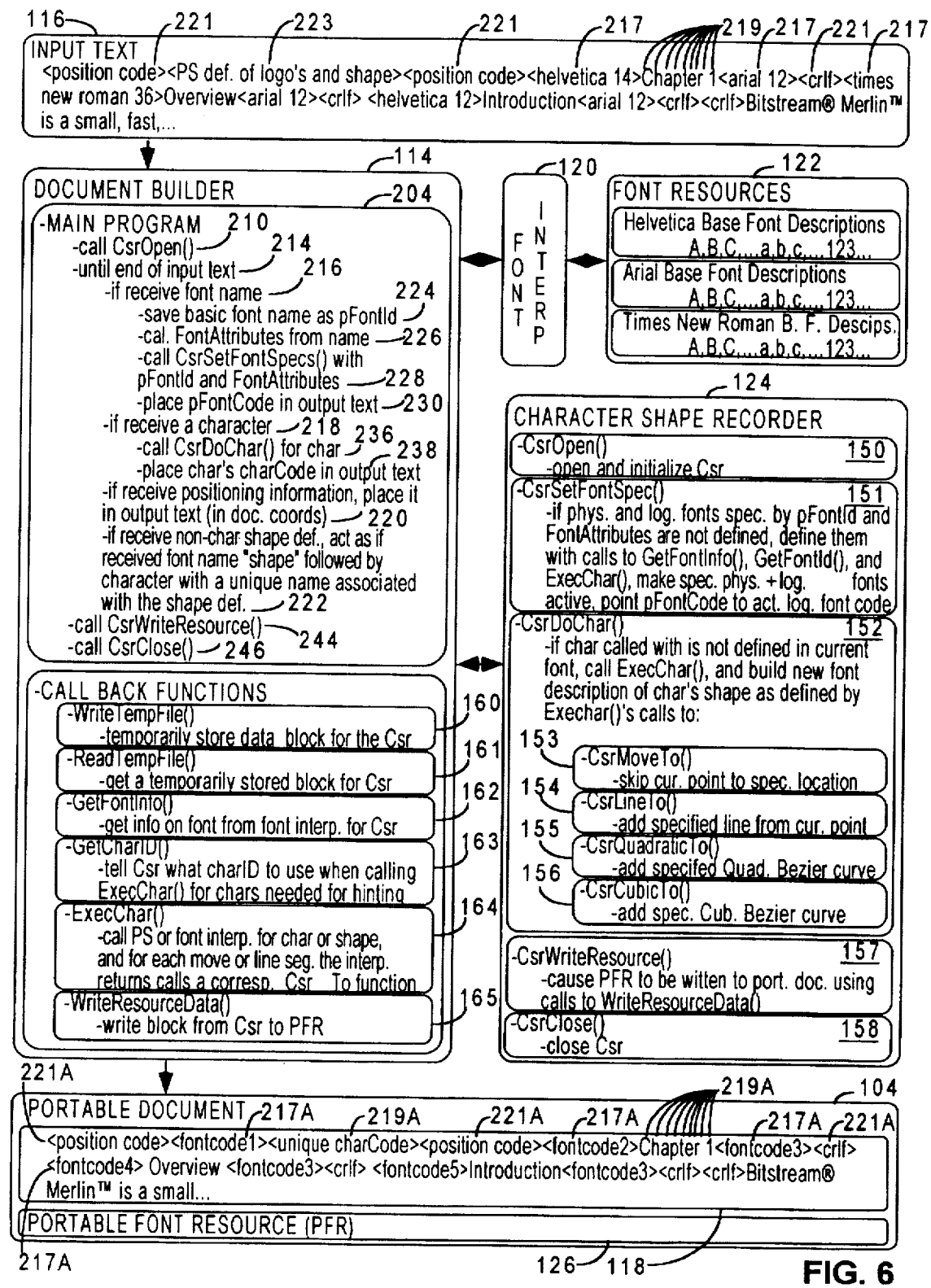
FIG. 6 is a more detailed schematic diagram of the functional elements of the first computer shown in FIG. 1, in which the character shape recorder of FIG. 4 is used, including the major functional steps performed by the document builder and character shape player.

FIG. 6 provides a more detailed schematic view of the functional elements shown in the first computer 102 in FIG. 1. It shows how the document builder 114 interacts as the host program for the modular character shape recorder 124 to convert the input text 116, which uses pre-defined font descriptions, into the portable document 14.

The document builder includes a main program 204 and the callback functions 160–165 shown on the right-hand side of FIG. 4.

The first step shown for the document builder's main program is step 210. This calls the CSR's CsrOpen function 150. In step 212, CsrOpen opens and initializes the player software module 124, giving it the memory buffer and temporary files it needs to work and setting up its initial data structures.

Once this function returns, the document builder's next step 214 performs a loop until it has processed all the codes in the input text 116. For each successive code received from the input text this loop performs the steps 216, 218, 220, and 222 shown indented under it.

Step 216 tests to see if the received code is a font name, such as the codes 217 shown in the input text. If so, its substeps 224, 226, 228, and 230 are performed. Step 224 saves the basic font name portion from the full font name received and points pFontId to it. Step 226 calculates the fonts attributes, such as its size, whether or not it is obliqued, and whether it is a solid or outlined font, from the full font name received and stores it in a data structure called FontAttributes. Then step 228 calls the CSR function CsrSetFontSpecs 151 with pFontId and FontAttributes.

FIG. 7 provides a more detailed description of CsrSetFontSpecs operation. In step 300, it searches the linked list of physical font records 302 shown at the top of FIG. 8, known as the physical font list, for a physical font record with a pFontID value 304 pointing to the same physical font name as the pFontID with which CsrSetFontSpecs has been called. If such a match is not fond, meaning the CSR has no record for the specified physical font, step 306 creates such a physical font record by performing steps 308, 310, and 312. Step 308 actually creates a new physical font record data structure 302, having the specified pFontID value, and places it at the end of the physical font list. Step 310 calls the host document builder's GetFontinfo callback function 162 shown in FIG. 6, to get information from the font interpreter about the physical font and it places this information in the new physical font record. This includes the ORU resolution in which the font interpreter defines the moves, lines, and curves of that physical font's shapes. It also includes the name of the physical font. Step 312 calls the document builder's GetCharID and ExecChar functions for each of a small sub-set of alphanumeric characters used in a process known as "hinting". For each such character, first it calls GetCharID, which returns the character code used to identify that character in the first computer's font interpreter, and then it calls ExecChar with the character code GetCharID returns for that character, to get the character's shape.

This is done to get a measure of the standard horizontal and vertical positions, and standard thickness associated with certain character features in the physical font. These hinting value are recorded in the physical font record, and are ultimately stored with the physical font in the portable document. This is done so they can be used by the character shape player to shift the position of important edges of a character's outlines when the character is rendered, so as to produce more attractive images, given the granularity of the pixel pattern used. Hinting is well known in computer font technologies. The important thing here is to note is that the hinting information recorded in the portable document 104 is derived not from hinting information contained in the pre-defined font descriptions in the first computer's font resources, but rather from the actual positions and sizes of character features in the font.

ExecChar 164 is an important callback function used by both CsrSetFontSpecs and CsrDoChar. It is called by CSR functions with the name the font interpreter uses for a given character, which is normally the code for that character in the input text. It responds by calling the first computer's font interpreter 120 for that character in the current font indicated by pFontID and FontAttributes. If the font is a scalable font, ExecChar responds to each move, line, quadratic Bezier curve, or cubic Bezier curve received from the font interpreter, respectively by calling CsrMoveTo, CsrLineTo, CsrQuadraticTo, or CsrCubicTo to deliver the definition of that move or outline segment to the CSR. In some document builders, if the font interpreter returns a bitmap pattern, ExecChar responds by performing edge detection on the bitmap, and then describes each edge detected to the CSR with an initial move to one of its points, followed by the sequence of lines between each successive point on that edge.

Whether or not the physical font record matching the specified pFontID previously existed or was just created by steps 308, 310, and 312, step 314 makes that physical font records the currently active physical font.

Then step 316 searches the linked list of logical font records 318 associated with the currently active physical font record 302 for a logical font record having FontAttribute values 319 matching those with which CsrSetFontSpecs was called. These values include the fontMatrix, which defines how the physical font is to be scaled and slanted (if at all) to produce a character shape defined in document coordinates. It also includes information about whether or not the character shape is to be rendered in solid or outline form, and if in outline form, how thick the outlines should be and how they should join at angles. If such a prior logical font record having the specified FontAttributes is not found, step 320 creates a new logical font records at the end of the logical font list hanging from the current physical font record and records the specified FontAttribute values 319 in it. Then step 322 makes the previously existing or newly created logical font with matching FontAttributes the CSR's currently active logical font, and step 324 returns to the document builder with a code which uniquely identifies the currently active logical font pointed to by pFontCode.

After CsrSetFontSpecs returns to the document builder, step 230 places the FontCode 217A pointed to by pFontCode into the sequence of codes in the text 118 of the portable document. Once this is done the program advances to the top of loop 214 to process the next code received from the input text.

If the code received from the input text is a code 219 representing a character, the test in step 218 will be met and steps 236 and 238 will be performed.

Step 236 calls the CSR's CsrDoChar function 152 for the character. This function, which is shown in more detail in FIG. 9, is one of the most important parts of the CSR, because it actually performs the character-font shape recording process. Its first step, step 328, searches the binary tree of character records 330, shown in FIG. 8, which is hung off the currently active physical font record 302 for a character record having a charCode 332 matching that for which CsrDoChar has been called. The tree is a binary tree, a well known type of data structure, because each of its character record can point to two child character records, one through a pNextUp pointer 340 and one through a pNextDown pointer 342. Records are added to the tree such that all records descending from a given record which have a charCode less than that of the given record descend from the given record's pNextDown pointer and all records descending from it which have a higher charCode descend from pNextUp. This enables the tree to be rapidly searched, by following pNextDown or pNextUp, respectively, at each record if the specified charCode is less or greater than the charCode at that record. This process is followed until either a record which matches the specified charCode is found or a pNextDown or pNextUp with a zero pointer is found, meaning such a matching character record does not exist in the tree. If such a matching charCode is found in one of the current physical font's associated character records, a previous call to CsrDoChar has already recorded the shape of the current character in the current font, and thus CsrDoChar has nothing further to do. In this case step 334 returns to the document builder. If such a match is not found, step 336 causes the rest of the steps shown in FIG. 9 to perform character shape recording.

The first step in the character shape recording, step 338, creates a new character record data structure 330 and inserts it into the binary tree at the appropriate location, given its charCode. If pRootCharacter has a zero value, the tree is empty indicating this is the first character being processed for the current physical font. In this case the new character record is inserted as the root of the tree and pRootCharacter is pointed to it. If the tree isn't empty, the new character record is inserted at the point at which the above described search of the tree encountered a zero pNextDown or pNextUp pointer, and that pointer is pointed to the new record. The system checks to see if the tree is unbalanced, with many more records depending from one side of some of its records than from the other. If so it is rearranged to balance it so that the tree has as few levels as possible, and thus can be searched most rapidly.

Figure 10:
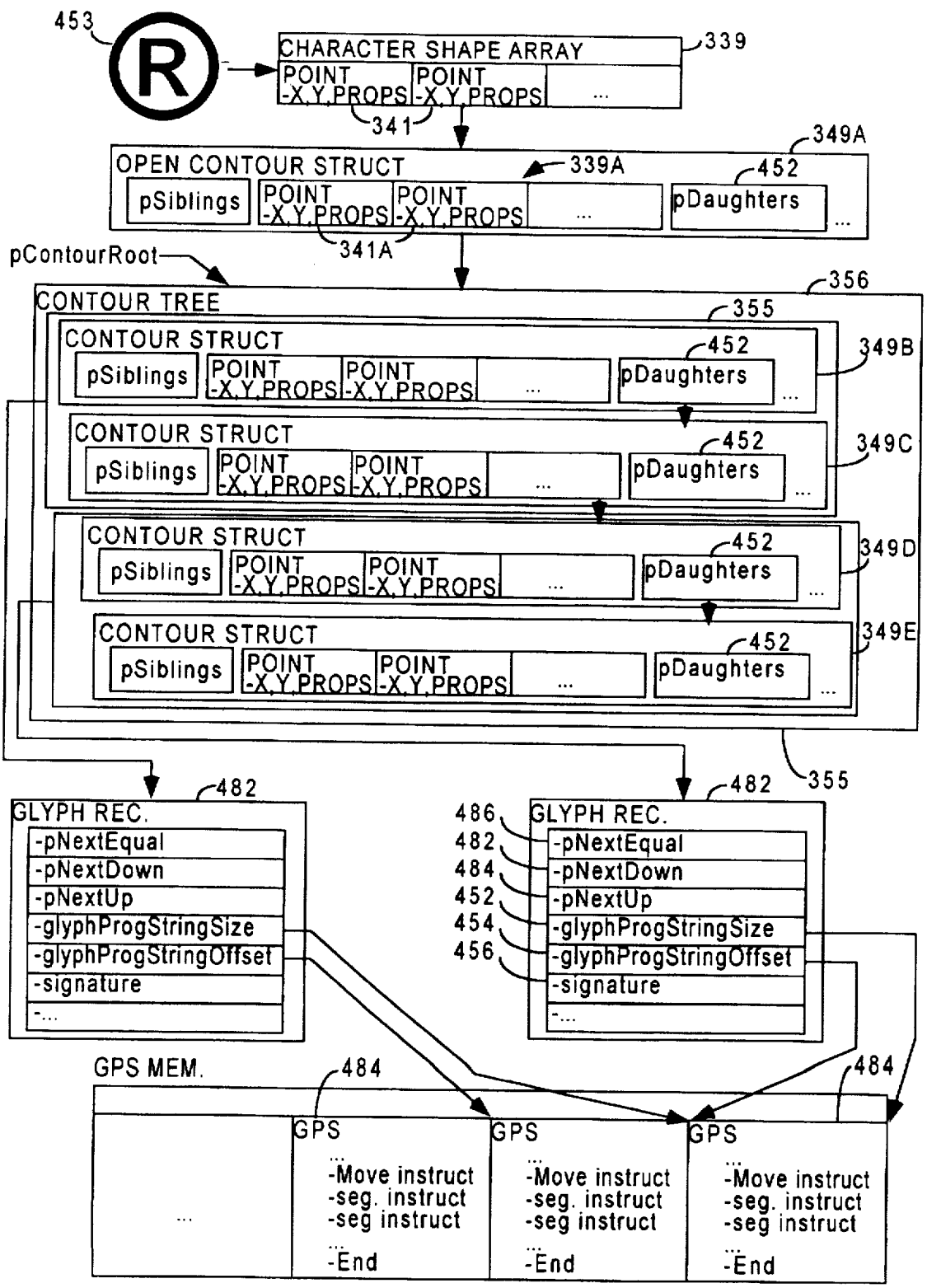
FIG. 10 is a schematic diagram of the following data structures created by the character shape recorder of FIGS. 4 and 6: the character shape array, the open contour structure, the hierarchical contour tree into which contour are placed once closed, the division of that tree's contour structures into glyph elements, the glyph records created in association with each such glyph element, and the glyph program strings ("GPSs") which contain new shape descriptions derived from the contours of each such glyph element.

Once step 338 has inserted the character record for the character being processed into the character tree, step 340 initializes character shape processing by setting up its associated initial data structures, including the beginning of the character shape array 339 shown in FIG. 10. The character array 339 stores, in a succession of point structs 341, the points which describe the outline segments received from the document builder's ExecChar function 164. Then step 342 calls the document builder's ExecChar function 164 for the character, which responds by calling the CSR's CsrMoveTo, CsrLineTo, CsrQuadraticTo, and CsrCubicTo functions 153, 154, 155, and 156 shown in FIG. 6, for each move, line, quadratic Bezier curve, and cubic Bezier curve, respectively, supplied to ExecChar from the first computer's font interpreter. Once ExecChar has been called, CsrDoChar waits for ExecChar to return, and during this wait the CSR performs initial character shape recording through the operation of the Csr_To functions 153–156 which ExecChar calls. For simplicity, in FIG. 9 and the description of it that follows that wait and the steps performed by the Csr_To functions will be represented by the until loop 344 and the steps indented under it, as if they were part of the CsrDoChar function.

When the function called by ExecChar is CsrMoveTo, step 346 causes steps 348 and 350 to be performed. Step 348 tests to see if there is already an open contour structure 349A, as shown in FIG. 9, and if so it performs steps 352 and 354. The open contour structure 349A is used to receive information, including outline segments, derived from the shape of the current outline being processed in the current character-font combination for which CsrDoChar has been called. If there is such a previously open contour, the CsrMoveTo call indicates a move away from the outline it represents to the start of a new outline. In this case, step 352 finalizes the information in the previously open contour 349A and closes it. Then step 352 places that closed contour 349 into the contour tree 356, a hierarchical tree of such closed contour structures also shown in FIG. 10. Whether or not there was a previously open contour when the call to CsrMoveTo was made, by the time step 350 is reached there is not, and that step opens a new contour with its first point being that determined by the displacement indicated by CsrMoveTo.

When ExecChar calls CsrLineTo, CsrQuadraticTo, or CsrCubicTo, step 358 causes the steps 360, 362, 364, 366, and 368 indented under it in FIG. 9 to be executed.

Step 360 exits with an error if no contour is open, because CsrLineTo, CsrQuadraticTo, and CsrCubicTo all defined a line segment relative to a previously defined point in the current contour, and if there is no such contour open, the system would not know how to interpret them.

Step 362 stores the points associated with each successive outline segment by a Csr_To function. Each call by ExecChar to CsrLineTo adds one point to the array, the on-outline endpoint of a line from the previous point in the array. Each call to CsrQuadraticTo adds two points to the array, first an off-outline control point of a quadratic Bezier curve which starts with the previous point in the array, followed by the on-outline endpoint of that curve. And each call to CsrCubicTo adds three points to the array, the two off-outline control points of a cubic Bezier curve which starts with the previous point in the array, followed by the on-outline endpoint of that curve.

Step 364 differentiates each curved segment received by a call to CsrQuadraticTo or CsrCubicTo to see if that curve contains an inflection point or an XY extreme point (actually a point having a horizontal or vertical tangent). If it finds any such points it marks them as such in the character shape array, or if such points are other than on an endpoint already in the character shape array, it subdivides the curve at such a marked point, and replaces the set of points representing the undivided curve with a set of points representing each of the curves resulting from the subdivisioin.

FIG. 11 shows a cubic Bezier curve 402 having an inflection point in its middle. This curve is originally represented by three points received from CsrCubicTo, first control point 404, a second control point 406, and an endpoint 408. The curve is also defined by the previous point 410 in the character shape array. Step 364 would detect that this curve has an inflection point 412. Since this point is not one of the curve's two endpoints 408 or 410, it subdivides the curves at the inflection point 412 into two new curves 411 and 413, each with two control points 415 and 416, and 417 and 418, respectively. The curve 411 has the inflection point 412 as its endpoint. The curve 413 has the endpoint 408 of the original curve as its endpoint. The points 415, 416, 412, 417, and 418 are inserted into the character shape array in place of the original curve's two control points 404 and 406. FIG. 12 shows a cubic Bezier curve 402A which is likewise split into two new curves at a horizontal tangent point.

Step 366 checks to see if there are any on-outline points in the character shape array which have line or curve segments defined on both sides of them in the array, and, if so, for each such point it checks to see if that point should be marked as a corner or tangent. Tangents are selected simply by picking points which are not labeled as a corner and which are between a curve segment and a line segment, where the line segment is of sufficient length that it is unlikely a single cubic Bezier curve could approximate the shape of both of them. Each such point is also compared with the maximum and minimum values for both the X and Y coordinates stored in the contours ContourBBox, and if it has a coordinate greater or lesser than any such maximum or minimum respectively, that maximum or minimum is updated to equal the coordinate. If the point is an X maximum, the direction of the angle formed at it, either clockwise or counterclockwise, as determined by the process of FIG. 13, is recorded as the contours actual direction.

FIG. 13 illustrates the process used to pick points which should be marked as corners and to associate a direction with such corners, if possible. This process is performed to insure that apparent corners which could have resulted from the outline resolution unit ("ORU") quantization in shape descriptions received by the CSR are not labeled as corner points. It comprises the steps 370–376.

Figure 14A:
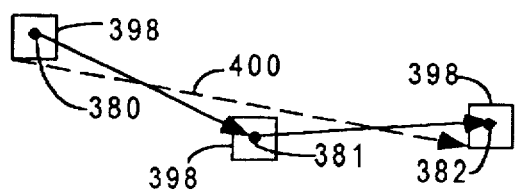
FIGS. 14A-D, 15A-C, and 16A-C are diagrams used to illustrate the corner detection steps of FIG. 13.
Figure 14B:
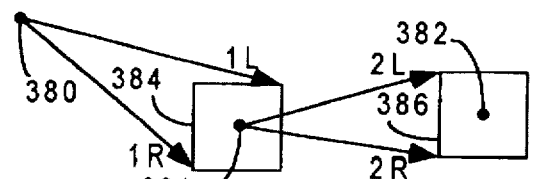
Figure 14C:
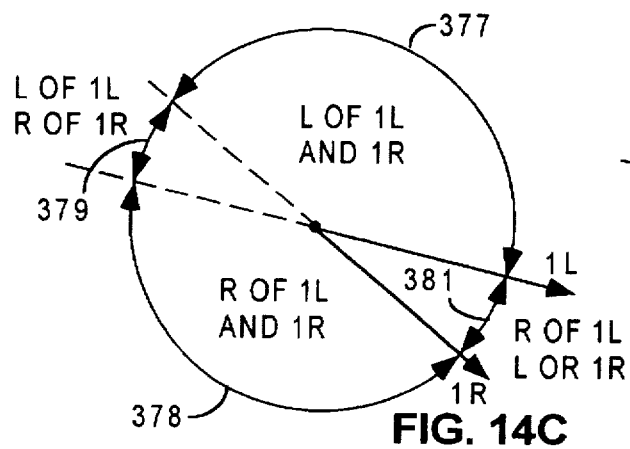

Step 370 finds the left-most and the right-most vectors 1L and 1R, respectively, shown in FIG. 14B from the point 380 preceding the point 381 being tested in the character shape array to a square 384. This square is two outline resolution units (ORUs) on a side, and it is centered around the tested point 381. "Left" and "right" are defined relative to the direction in which outline segments have been received in the character shape array. Step 372 finds the left-most and right-most vectors 2L and 2R, respectively, from the point 381 being tested to a similar two ORU square 386 centered around the point 382 which follows the tested point in the character shape array.

The vectors 1L and 1R represent the range of possible directions for the vector from point 380 to point 381, given the possible quantization error in the location of each such point. Similarly, the vectors 2L and 2R represent the range of possible directions for the vector from point 381 to point 382, given the possible error in those points.

Where the segment before or after the tested point 381 is a curve, the point 380 or 382, respectively, will be an off-curve control point. This is not a problem, however, since the line from the endpoint of a quadratic or cubic Bezier curve to its nearest control point is the tangent of that curve at its endpoint, and, thus a line from the endpoint to that control point reflects the angle made with the adjacent outline segment at that endpoint.

Once steps 370 and 372 have calculated the vectors 1L, 1R, 2L, and 2R, steps 373, 374, 375, and 376 perform a series of tests to see how the tested point 381 should be labeled. Step 373 tests to see if the vectors 2L and 2R each form left angles greater than zero and less than one hundred and eighty degrees with both 1L and 1R. In the example of FIGS. 14, this means it tests to see if both vectors 2L and 2R fall within the angular range 377 shown in FIG. 14C. If this test is met, it means all possible vectors between points 381 and 382, given the possible quantization error, form a left angle with all possible vectors between points 380 and 381, given that possible error, and, thus, step 373 labels the tested point 381 as a definite left corner.

If the test of step 373 is not met, step 374 tests to see if the vectors 2L and 2R each form right angles greater than zero and less than one hundred and eighty degrees with both 1L and 1R. In the example of FIGS. 14, this means it tests to see if both vectors 2L and 2R fall within the angular range 378 shown in FIG. 14C. If the test of step 374 is met, it means that all possible vectors between points 381 and 382, given the possible quantization error, form a right angle with all possible vectors between points 380 and 381, given that possible error, and thus, it labels the tested point as a definite right angle.

If neither the tests in step 373 and 374 are met, step 375 tests to see if 2L forms a right angle which is greater than zero degrees and no greater than one hundred and eighty degree with 1R and it tests to see if 2R forms a left angle greater than zero degrees and no greater than one hundred and eighty degrees with 1L. In the example of FIGS. 14, this means it tests to see that no portion of the range of possible directions between 2L and 2R falls within the range of possible directions 381, shown in FIG. 14C, between 1L and 1R. If the conditions of step 375 are met, it means that none of the possible vectors between point 381 and 382, could form a straight line with any of the possible vectors between points 380 and 382, given that possible quantization error, and so step 375 labels the point as a definite corner. But it marks the point as a corner of either left or right angle, because neither the tests of steps 373 and 374 have been met.

If none of the tests in steps 373, 374, and 375 have been met, step 376 marks the point as not being a corner.

Figure 14D:
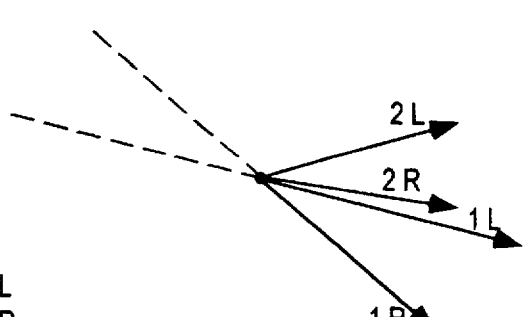

The application of these tests to the set of points shown in FIGS. 14A and 14B is shown in FIG. 14D. In this figure it can be seen that range of possible vectors between 2L and 2R falls into the portion 377 of the arc which is clearly to the left of the range of possible vectors between 1L and 2R. Thus, the test of step 373 is met and the tested point is labeled as a definite left turn, one which has too sharp an angle to have resulted from ORU quantization. This is indicated in FIG. 14A, because even if the X and Y value of each point 380, 381, and 382 were allowed to vary in either direction by the maximum ORU rounding error of one half ORU, as indicated by the one ORU squares 398 centered around those points, it would be impossible to draw a straight line 400, shown as a dotted line in the figures, through those points.

Figure 15A:
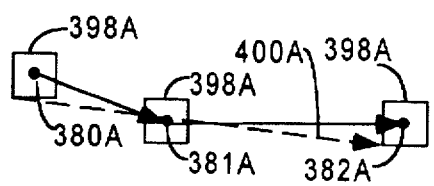
Figure 15B:
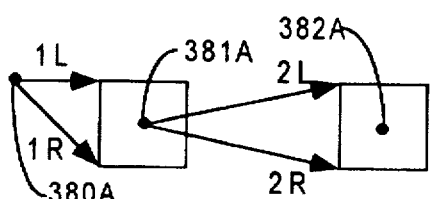
Figure 15C:
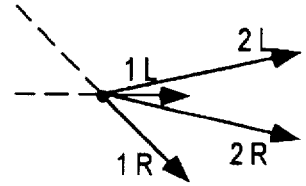

In the case shown in FIG. 1A–C, the apparent left angle between the points 380A, 381A, and 382A is sufficiently slight, given the distance between them, that a line 400A could be drawn which touches all three squares 398A, indicating that the apparent angle between the points could have been created by ORU rounding errors. As is indicated in FIGS. 15C, none of the tests of steps 373, 374, and 375 will be met because the range of possible vector directions between 2L and 2R does not lie entirely to the left, entirely to the right, or entirely out of the range of possible vector directions between 1L and 1R. This being the case, step 376 labels the tested point as a non-corner.

Figure 16A:
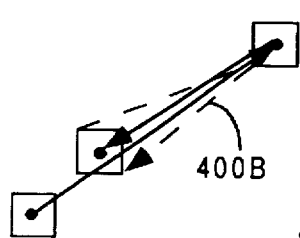
Figure 16B:
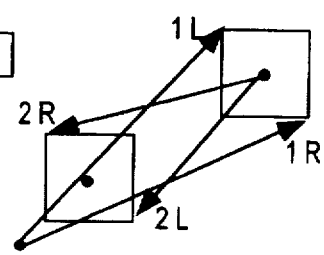
Figure 16C:
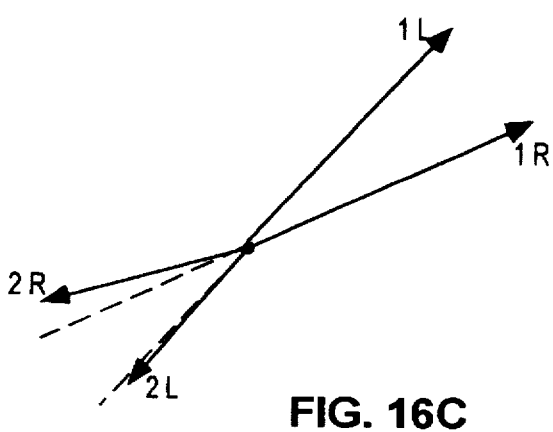

In the case shown in FIG. 16A–C, the apparent left angle is sufficiently sharp that it is clearly a corner, but the quantization error is large enough that it could actually be a right turn, as indicated by the dotted angled line 400A, rather than a left turn. In this case, as is indiated in FIG. 16C, the range of possible vector directions between 2L and 2R is neither entirely to the left of, or entirely to the right of, the range of possible directions indicated by 1L and 1R, and thus the tests of steps 373 and 374 will not be met. But that range of possible directions indicated by 2L and 2R is entirely outside of the range of possible directions indicated by 1L and 1R, and, thus, the test of step 375 is met and the tested point is labeled as a corner of either left or right direction. This being the case, the character shape recorder will use the point as a marked point for segmentation purposes in step 368 of FIG. 9, but it will not use the corner for a calculations of contour direction in step 366 of that figure if that corner is an X maximum. Instead it will leave the last definate direction, if any, associated with a corner which was at the time of its processing an X maximum as the actual direction of the contour.

Once steps 364 and 366 have been performed, step 368 performs steps 420, 422, 424, and 426 for the portion of the outline segment in the character shape array located between successive pairs of points which have been marked as inflections, XY extremes, corners, or tangents by steps 364 and 366.

Step 420 approximates any such portion of the outline, which may cover one or more segments in the character shape array, with a line or cubic Bezier curve. If the outline portion between the two marked points is a simple line or cubic Bezier curve, then that line or Bezier curve is used as the approximation. Otherwise, line or curve fitting techniques are used to find the approximation.

If the outline portion is approximated with a curve, step 422 calculates the "depth" of the approximating curve. That is, it calculates the number of times the curve has to be recursively sub-divided in two, before the worst error between such a subdivision and the vector between its endpoints would be less than one half ORU. This value is used by the character shape player when it reads the character shape from the portable font resource so it knows how finely it has to subdivide each curve to accurately render it with vector approximations.

FIG. 17 shows the steps of the main program which performs this depth analysis, and FIG. 18 shows the steps of the recursive subroutine which actually performs the recursive subdivision. The main program has four major steps 430, 432, 434, and 436.

Step 430 checks if the distance between the vector spanning the curve's endpoints and each of the curve's control points is less than one half ORU. If so, it returns with a depth of 0, since the curve does not need to be subdivided at all to be approximated within the limits of the rounding error by a vector between its endpoints. The distance between the vector and the curve's control points is used because, by the nature of cubic Bezier curves, such a vector can never have a greater distance to any point on its associated cubic Bezier curve than its greatest distance to one of that curve's control points, and because it is mathematically much simpler to find the maximum distance from the vector to the two control points than it is to find the maximum distance from the vector to the curve.

If the test of step 430 is not met, step 432 calls the RecursiveSubdivision subroutine of FIG. 18. As shown in FIG. 18, this subroutine is called with pointers to the 1stEnd, 1stControlPoint, 2ndControlPoint, and 2ndEnd of the cubic Bezier curve it is to subdivide. It is also called with the depth of is recursion. The subroutine comprises steps 440, 442, 444, 446, and 448.

Step 440 tests to see if the value of depth with which the subroutine is called is greater than the current value of maxDepth, the maximum depth reached so far by any recursion performed on the entire curve. If so it sets the value of maxDepth equal to the recursion's depth. Then step 442 finds the midpoint of the Bezier curve with which the recursion has been called and divides that curve into two new two Bezier curves at that midpoint. Then step 444 finds which of the new sub-curves has the greatest distance from a vector between its endpoints and one of its two control points. Once this has been done, step 446 tests to see if this greatest distance is less than one half ORU. If so, step 446 stores 1stEnd and 2ndEnd in a structure called deepestSubCurve, so the routine shown in FIG. 17 will be able to tell where the curve with the deepest recursion ended, and it returns to that routine. If not, step 448 calls the RecursiveSubdivision subroutine for the newly formed sub-curve with the greatest distance between a vector spanning its endpoints and one of its two control points.

As those skilled in computer programming will appreciate, this RecursiveSubroutine will keep dividing a given Bezier curve in half, picking the worst fitted half, and then dividing that half in half, until the worst fitted half is fitted to within one half ORU. At that point maxDepth will hold the level of the deepest recursion and deepestSubCurve will hold the endpoints of the deepest sub-curve. Then the deepest recursion will return to the recursion that called it, and that recursion will return to the recursion that called it, and so on, until the initial calls to RecursiveSubroutine returns to step 432 of FIG. 17.

At this point step 434 tests to see if one of the endpoints of the deepest sub-curve stored in deepestSubCurve is one of the end points of the entire curve for which the depth calculation is being made. If so, it calls the RecursiveSubdivision subroutine again, this time for the half of the entire curve which contains the opposite end of the entire curve from that containing the deepest sub-curve found by the prior recursion. This is done because the deviation between the subdivisions of a given cubic Bezier curve and vector approximations to those subdivision will either have one local maximum, which is the global maximum for the entire curve, somewhere between the curve's two endpoints, or two local maximum located at each of the curve's two endpoints, one of which might require deeper recursion than the other. In the first case, the recursion of the first call to the RecursiveSubroutine in step 432 are guaranteed to catch the maximum deviation for the entire curve. But in the second case, the half of the entire curve which has the greatest deviation at the first level of recursion might not be the one having the end with the deepest local maximum, and, thus, the recursions of step 432 might not find the curves true maximum depth. Step 434 causes the recursion to be performed for the other half of the entire curve in this second case to ensure that the depth of both ends of the entire curve will be found, so that maxDepth will contain that deepest depth.

The depth finding algorithm shown in FIGS. 17 and 18 significantly speeds the operation of the character shape recording because it only pursues recursion on the half of each sub-curve which is worst fitted by a vector, thus preventing the amount of computation required for the depth analysis from going up exponentially with the depth of the curve.

Returning now to FIG. 9, after step 422 has been completed, step 424 inserts the approximated segment calculated by step 420 into the point array 339A of the open contour struct 349A shown in FIG. 10. It can be seen that the segmentation of the outline segments represented by points on curve and control points in the contour's point array are dependent on the horizontal and vertical tangents, inflection points, filtered corners, and boundaries between curves and significant lines found in the shape defined by the outline segments received from ExecChar calls to the CSR, rather than by the actual segmentation of those received outline segments.

Once newly approximated outline segments have been placed into the open contour 349A, step 426 deletes from the character shape array all points which are not part of a segment which has not yet been approximated or which are not needed to process such an unapproximated segement. It does this to conserve memory, since such points have no further use.

Either step 346 or 358 and its respective sub-steps are repeated for each of ExecChar's calls to the CSR during the processing of a given character-font shape.

Each subsequent time a call to CsrMoveTo is received from ExecChar, it indicates the end of the description of one contour, or outline, in the shape being described by ExecChar and either the beginning of another such contour or, if there are no more such contours, the move to the starting position for the next character which marks the completion of that shape's description by ExecChar. In either case, when such a subsequent call to CsrMoveTo is received, step 352 completes and closes the open contour 349A and step 354 places in its proper place into the contour tree.

Step 354 places it into the hierarchical contour tree 356 as follows:

If the contour tree is empty, it points a global variable pContourRoot to the new contour. If the contour tree is not empty, scan the list of contours at the top level. For each scanned contour, if the new one encloses it, remove the scanned contour from the list and add it to the new contour's daughter list, pointed to by pDaugther 452. If the new contour is enclosed by the scanned contour, restart the scanning process with the scanned contour's daughters. When the end of the list being scanned is reached, add the new contour to the list. The actual contour insertion process maintains a consistent order for sibling lists to ensure that the glyph matching, described below, is reliable. The order is based on the value of xmin in the contour's bounding box, ContourBBox. In the event of a tie, the order ymin, xmax, or ymax is used until a difference is found. There should be no case of distinct sibling contours that have identical bounding boxes.

In the example shown in FIG. 10, the contour 349B associated with the outside outline of the circle in the registered trademark symbol 453, will ultimately be placed at the first, or highest, level of the contour tree because it enclose all that symbol's other contours. The contour 349C, associated with inside outline of that circle, will be a 2nd level contour. The contour 349D, associated with the outside outline of the "R" in the registered trademark symbol, will be a 3rd level contour. And the contour 349E, associated with the inside outline of the "R" will be a fourth level contour. It should be understood that some characters will have multiple contours at one level. For example, the shape "%2" will have three contours all at the first level, whereas the shape "B" will have one contour at the first level and two depending from it at that second.

Once ExecChar returns to CsrDoChar at step 460 shown in FIG. 9, each outline of the character-font shape should be recorded in a closed contour structure 349, and each of those structures should be organized into a hierarchy indicating which encloses which. At this point an open contour exists which was created by step 350 by the last CsrMoveTo called by ExecChar, that associated with the character-font shape's escapement. Step 460 saves the location of the initial point in this open contour to calculate the escapement value for the shape being recorded and closes the open contour.

Then step 462 splits the contour tree 356 into two level sub-trees. That is, it groups each odd level contour and its zero or more daughter contours into a sub-tree 355. For example, in FIG. 10, the first level contour 349B, which represents the outside outline of the circle of the "®" symbol, and the contour 349C, which represent inside contour of that circle will be grouped into one sub-tree, and the contour 349D and 349E which represent the outer and inner outlines of that symbols "R" are grouped into another subtree. It turns out that each of these two level subtrees corresponds to a glyph element, that is, to an unconnected solid shape.

Once the contour tree has been separated into sub-trees corresponding to glyph elements, step 464 performs steps 466, 468, 470, 472, 474, 476, and 478 for each such glyph element.

Step for 466 standardizes the direction of the contour. That is, it checks to see if the sequence of outline segments in the top level, or outer, contour in each glyph element has a counter-clockwise direction, and if not it reverses the order of those segments to have such a counterclockwise direction. Similarly, it check to see if the segments of the second level, or inner, contours of the glyph have a clockwise direction, and if not it orders them to have that direction. This has the advantage of having the inner and outer contours of all glyph elements have the same direction, respectively, regardless of the direction in which those contours were delivered to the CSR.

Step 468 picks a standard start point for each contour. Because each contour is closed, the start point is arbitrary. However, in order to facilitate glyph matching and to optimize playback performance, the start point for each contour is picked based on a few simple rules. For outer contours, the start point is chosen to be the lowest point in the contour. If there are several equally lowest points, the rightmost one is chosen. For inner contours, the start point is chosen to be the highest point in the contour. If there are several equally highest points, the rightmost one is chosen. The indexes of both possible start points is already set in the contour data structure during character shape processing.

Picking the appropriate point is therefore simply a case of picking one of two indexes based on the desired direction of the contour.

Step 470 builds edge and stroke lists. Edge lists are lists of all horizontal and vertical edges of any significance, including horizontal and vertical tangents, in the shape. Strokes are pairs of such edges which represent the opposing sides of a given horizontal or vertical feature in the shape. These values are used in hinting.

Step 472 generates a glyph record 482 and glyph program string ("GPS") 484, as shown in FIG. 10, for the glyph element. The glyph program string represents the sequence of outline segments in each of the glyph element's associated contours after those sequences have been standardized in steps 466 and 468 in the order in of those contours in the glyph element's associated sub-tree 355. It can be seen that the shape description is independent of any aspects of sequence of outline segments received from ExecChar for the glyph's shape which are not mandated by that shape itself. This GPS is added to the end of a sequence of GPSs in the GPS memory. Its location and size in this memory is indicated by glyphProgramStringOffset 454 and glyph-ProgStringSize 452, respectively, in the Glyph record. The glyph record also calculates a glyph signature 456. The signature is a compact byte string that has a high probability of uniquely identifying a glyph. This identification is independent of position and scale factor. It includes the glyph's number of contours, the number horizontal and vertical edges calculated in step 470, the relative size of the right most stroke calculated, the relative position of the left edge of rightmost stroke, the relative size of the topmost stoke, the relative position of lower edge of topmost stroke, the number of outside corners in outside contour, the number of inside corners in outside contour, the number of outside corners in inside contours, and the number of inside corners in inside contours. In this signature the positions and sizes are all relative to the glyph's bounding box, so that glyphs of the same shape, but different size, will have the same signature.

Figure 19:
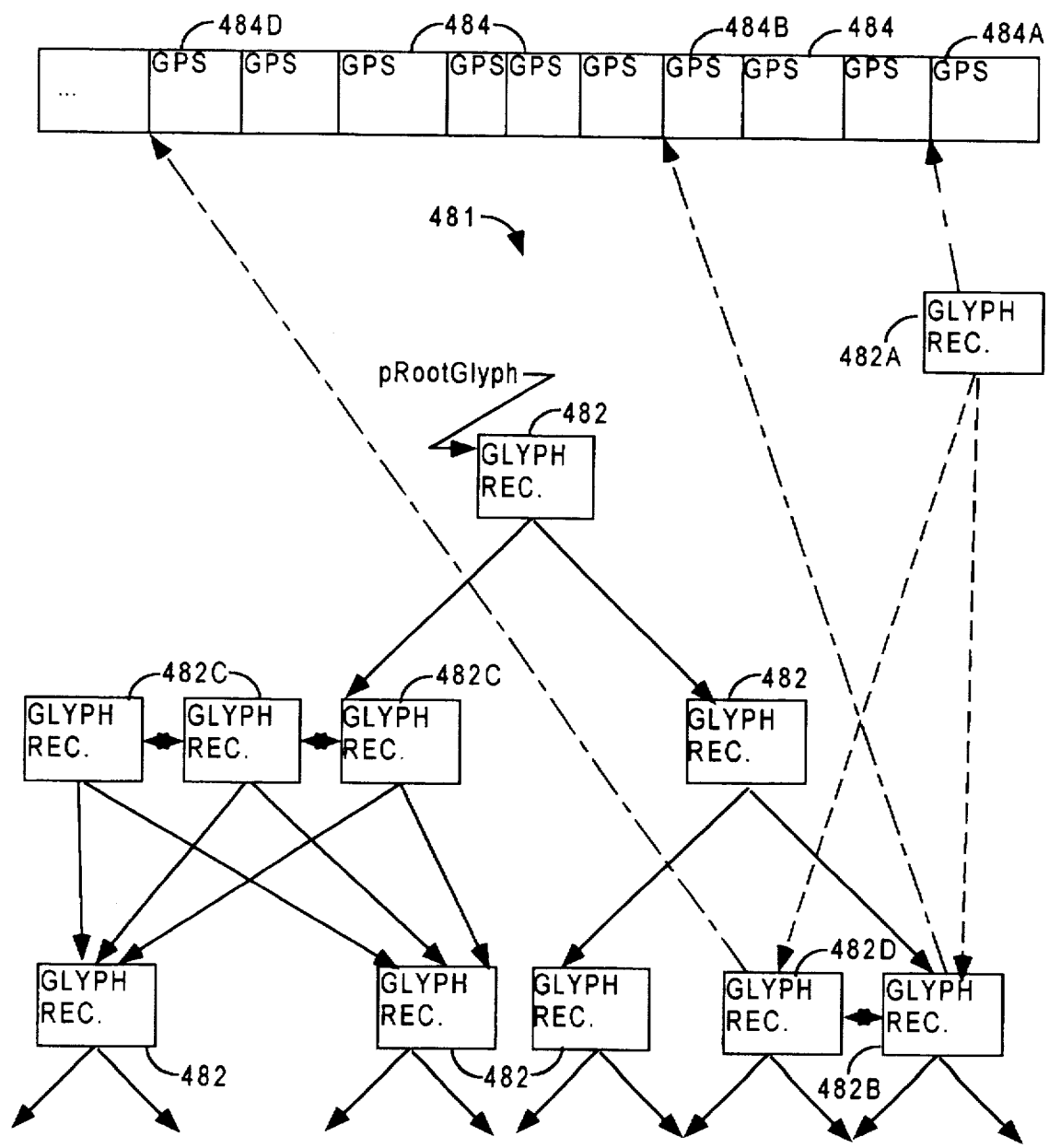
FIG. 19 is a schematic diagram of the binary tree of glyph records, of the type shown in FIG. 10, produced by the character shape recorder of FIGS. 4 and 6, and of the matching which is performed by that recorder for each new glyph records to see if the shape represented by its associated glyph program string ("GPS") matches that of the glyph programming string associated with any glyph record already in the tree.

Once a new glyph record 482 and its associated new GPS 484A have been created, step 474 searches a binary tree 481, shown in FIG. 19, of all the glyph records 482 made for previously recorded glyph shapes. It searches this tree for a glyph record having the same signature. This tree is organized into a binary tree by the numerical value comprised of the collective bytes in each glyph record's signature. This is done to facilitate rapid searching for matching glyph shapes. In each glyph record in the tree, the pointer pNextDown 482 points to the descending branch of the tree whose glyph records have signatures with a lower value. The pointer pNextUp 484 to the descending branch whose corresponding glyph values have higher signature values. And the pointer pNextEqual 486 points to the glyph records, if any, which have the same signature value. A group of glyph records 482C, having equal signature values is shown in FIG. 19.

If the search finds a glyph record 482B, as shown in FIG. 19, having the same signature as a new glyph record 482A, step 476 performs steps 488 and 490. Step 488 compares the sequence of points in the GPS 484B pointed to by the glyph record 482B having the same signature as the new glyph record 482A with the points in the new glyph record's associated GPS 484A. Before this match is done the bounding boxes of the two glyph shapes are normalized to the same size, so the match will be scale independent. This enables the shape of the "R" in "®" to match that in "R", and the shape of the "1" in "½" to match that in "1". In the example shown, is it assumed the points in the GPS 484B associated with glyph record 482B do not match those of the new glyph record's GPS 484A.

If there are a group of sibling glyph records in the glyph tree whose signature matches that of the new glyph record 482A, then the new glyph record's associated GPS 484A is compared against the GPS's of each of those sibling glyph records. In the example of FIG. 19, this means GPS 484A is also compared against the GPS 484D, associated with the glyph record 482D. In the example, it is assumed these two GPSs match.

The ability to make such a match rapidly is greatly facilitated by the fact that the order of contours, the direction of contours, and the start point of contours in each GPS are standardized, and independent of the particular manner in which the shape of that glyph was delivered to the CSP by ExecChar. This means that glyphs with the same shape, whether received from different characters, different fonts, or even different font description languages will almost always have the exact same GPS, allowing for scaling and rounding errors, and thus can be rapidly matched.

If an exact match, allowing for rounding error, is found, as in the case of GPSs 484A and 484D in FIG. 19, step 490 normally deletes the new glyph record's GPS 484A, and points the glyphProgramStringOffset and glyphProgramStringSize values in the new glyph record 482A to the matching GPSs 484D. If the new glyph record's GPS has a different size than the previously recorded matching GPS, scaling information to convert the glyph described in the previously recorded matching GPS to the proper size is associated with the new glyph record. If the size described in the new GPS 484A is enough larger than that described in the previously recorded matching GPS 484D, they will be treated as not matching to prevent an undesirably low resolution description of the glyph's shape from being used for the new glyph record.

Once the test for matching glyph shapes has been completed, step 478 inserts the new glyph record 482A into the glyph record binary tree 481 at the appropriate location, if the glyph's GPS does not match any previously in the tree.

Figure 8:
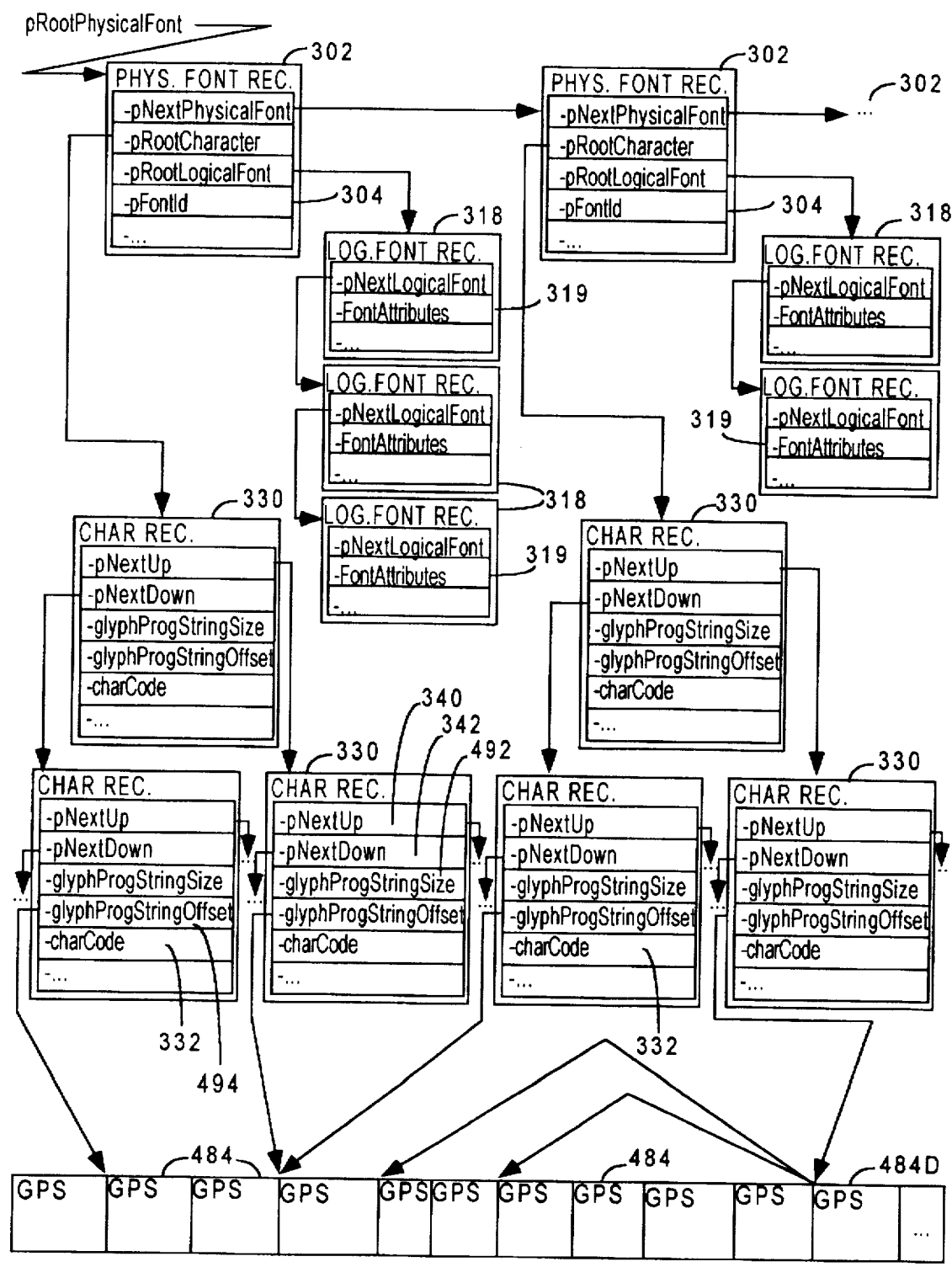
FIG. 8 is a schematic diagram of the list of physical font records created by the character shape recorder of FIG. 4 and 6, of the list of logical font records and the binary tree of character records the recorder can associated with each such physical font record, and of the links which it makes between such character records and the glyph program strings ("GPSs") which contain new descriptions of the shapes of such characters.

After the glyph record tree has been searched for all the glyphs of the characterfont shape currently being processed to find if any of those shape can be defined by reference to a common GPS, step 480 points the glyphProgramStringOffset 490 and glyphProgramStringSize 492, shown in FIG. 8, of the character record 330 for the character-font shape being processed to the characters GPS. If the character record's associated shape is formed by scaling, translating, or combining glyphs defined by one or more other GPSs, the GPS pointed to by the character record will be a compound GPS, such as the GPS 484D shown in FIG. 8. Each such compound GPS is contains one or more pointers to such other GPSs, along with any necessary scaling and translating information necessary to define the size and location of each such other GPS's associated glyph in the character record's associated shape.

Once this is done, step 496 updates the x or y maximum or minimum of the current physical font's bounding box if the x or y maximum or minimum of the bounding box of the character-font shape being processed is more extreme than any such x or y maximum or minimum of any character-font shape previously processed by the font.

At this point the processing of the character-font shape for which CsrDoChar has currently been called is complete, and CsrDoChar returns.

Returning now to FIG. 6, when the call to CsrDoChar 153 in step 236 is complete, step 238 places a code 21 9A for the character in the text 118 of the portable document, and the program advances to the top of loop 214 to process the next code received from the input text. If the code received from the input text is a position code 221, the test in step 220 is met, and that step places a corresponding positioning code 221A in the output text, and the program advances to the top of the loop 214.

The input text can include descripions, or codes, 223 representing the shape of non-character shapes, such as the logo 242 shown on the video display 106 in FIG. 1. In the embodiment shown in FIG. 6 these descriptions are coded in the PostScript page description language, a language which not only describes fonts but also page layout, and non-character shapes.

When a non-character shape code 223 is received in the input text, the test in step 222 is met, and that step acts as if a font code has been received for a font "shape" and it assignes a unique character code for the non-character shape described by that code 223. Step 222 point pfontID to "shape", places standard values in FontAttributes, calls CsrSetFontSpecs, places the returned FontCode for the "shape" font in the text of the portable document 104. Then step 222 calls CsrDoChar for the shape's unique charCode to build a font description of its shape, and places the shape's unique charCode 219A in the portable document's text.

During the operation of step 222 when pFontID points to "shape", GetFontinfo supplies CsrSetFontSpecs with the outline resolution in which the shape will be described to the CSR. GetCharID returns nulls, indicating that the characters used for hinting are not available in the "shape" font, causing CsrSetFontSpecs not to call ExecChar, and when CsrDoChar calls ExecChar, it returns moves, lines, and curves defined by the PostScript shape description.

Once the loop 214 has processed all of the codes in the input text 116, step 244 calls the CSR's CsrWriteResource function 157. CsrWriteResource calls WriteResourceData to actually write this data because such a write depends on the operating system being used. CsrWriteResource causes the data contained in the physical font records, and their associated logical font and character records, and in the glyph program strings to be compressed and recorded into the portable font resource ("PFR") 126, the major elements of which are shown in FIG. 20. As can be seen from this figure, the PFR includes a logical font directory 500, one or more logical font records 502, one or more physical font records 504, one or more simple glyph program strings, and zero or more compound glyph programs strings 508, that is GPS's such as the GPS 484D shown in FIG. 8 which is defined by reference to one or more other GPSs. The logical font directory 500, includes a look-up table which translates the fontCodes 217A placed in the portable document to be converted into the address and size of that fontCode's corresponding logical font record 502 in the PFR. Each logical font record includes, among other things the FontAttribute values of the logical font and the address and size of its associated phyical font record 504 in the PFR. Each such physical font record includes one or more character records 510, each of which includes the address and size of the simple or compound glyph programming string 506 or 508 which actually describes its shape as a sequence of moves, lines, and curves.

Once the call to CsrWriteResource has written the PFR, step 246 calls CsrClose to close the CSR, and the execution of the routine 204 is complete.

The drawing of the input text 116 shown in FIG. 6 is a schematic representation of the initial portion of the fonted text shown on the video monitor 106 in FIG. 1. The drawing of the portable document 104 shown in FIG. 6 is a schematic representation of text 118 representing that same fonted text. As can be seen by comparing these two texts, each font name 217, each character code 219, and each position code 221 in the input text has a corresponding fontCode 217A, charCode 219A, or position code 221A in the portable document, respectively. Furthermore, each non-character shape 223 coded into the input text has a fontcode 217A and a charCode 219A in the portable document.

Figure 21:
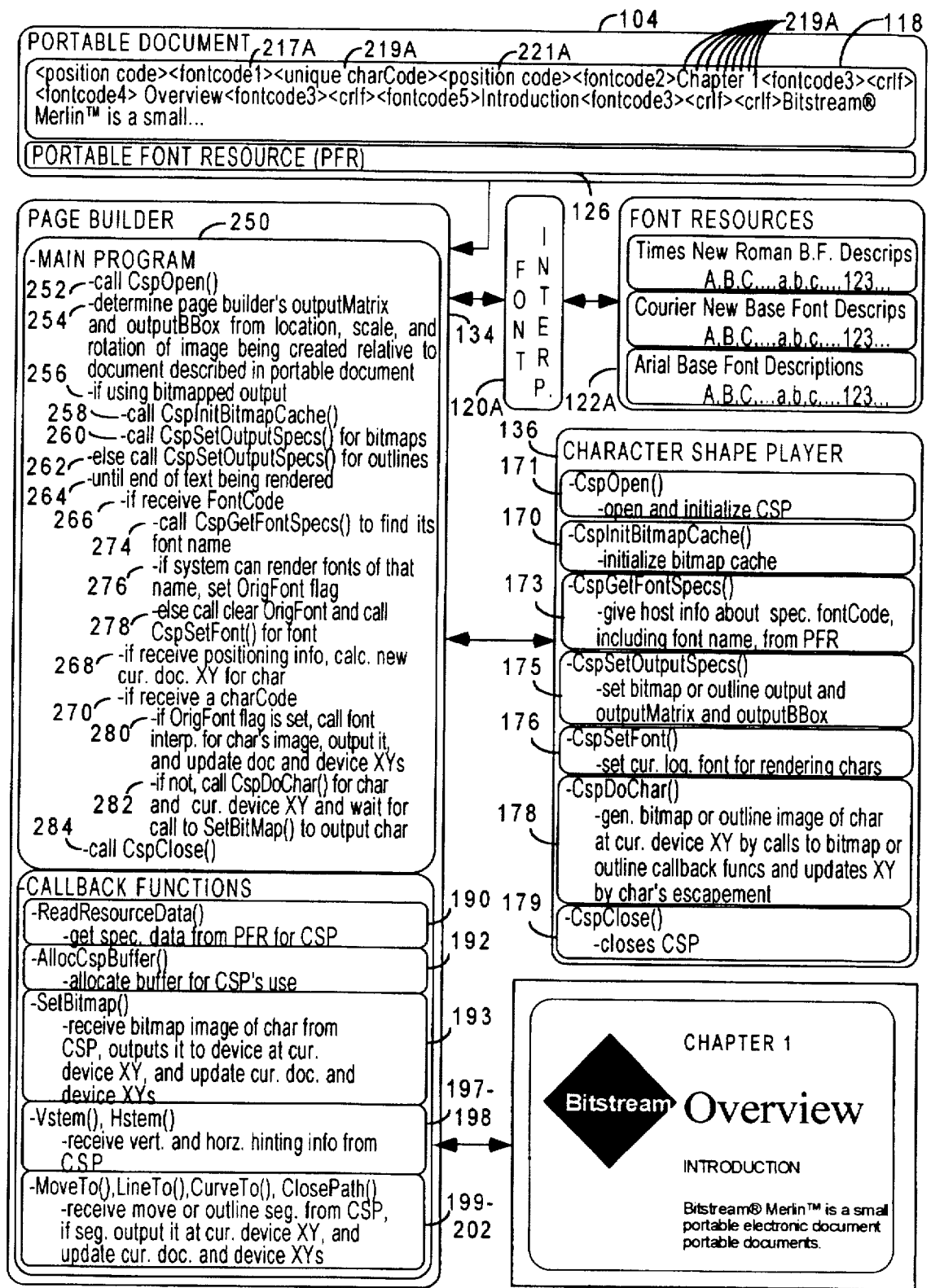
FIG. 21 is a more detailed schematic diagram of the functional elements of the second computer shown in FIG. 1, in which the character shape player of FIG. 5 is used, including the major functional steps performed by the page builder and character shape recorder.

FIG. 21 provides a somewhat more detailed schematic view of the functional elements shown in the second computer 108 in FIG. 1. It shows how the page builder 134 and the modular character shape player 136 interact to render a visual image of the fonted text contained in the portable document 104. It shows an embodiment, in which the second computer includes a font interpreter 120A and font resources 122A, similar in function the font interpreter 120 and font resources 122 described above with regard the first computer.

The page builder includes a main program 250 and the callback functions 190–202 shown in FIG. 5, several of those call back functions which are not necessary are not shown in FIG. 21.

The first step shown for the page builder's main program is step 252. The calls the character shape players, or CSP's, CspOpen function 171. This opens and initializes the CSP data structures.

Once the call to CspOpen returns, step 254 determines the relationship of the image to be created to the portable document, including the location of the image relative to the document and it size, scale, and rotation relative to the document. It uses these to calculate the outputMatrix and outputBBox for the image. The outputMatrix describes how document coordinates calculated from the portable document are offset, scaled, or slanted relative to the coordinates of the image to be created. The outputBBox defines what locations in document coordinates will not fit into that image, and thus do not need to be generated by the CSP.

Step 256 tests to see if bitmapped or outline output is desired. Bitmapped output is uses for most video displays and laser printers. It represent character shapes with an image comprised of an array of pixels. Outline output is used with plotters and it can be used to generate fonts. It represents images as a sequence of moves, lines, or curves.

If step 256 determines that bitmapped output is desired, steps 258 and 260 are performed. Step 258 calls the CSP's CspinitBitmapCache function 170. This initializes the bitmap cache which stores a copy of the as many of the character-font shape which have been generated by calls to CspDoChar as possible, so that when repeated calls are made to CspDoChar for a given character-font combination, the actual bitmap of that shape will normally only have to be generated for the first of those calls, and upon subsequent calls the bitmap can merely be retrieved from the bitmap cache. After the call to CspinitBitmapCache returns, step 260 calls the CSP's CspSetOutputSpecs function 175 to set the CSP to render bitmapped images. If step 256 determines that outline output is to be used, step 262 calls CspSetOutputSpecs to set the CSP to generate outlines.

In either case the call the CspSetOutputSpecs also sets the CSP's outputMatrix and outputBBox data structures to reflect those of the page builder. The CSP's outputMatrix determines how the coordinates of the shapes produced by the CSP should be scaled and rotated relative to those contained in the new font descriptions for those shapes. The CSP's outputBBox will cause the CSP to not render shape information which is clearly outside the image being generated.

Once the call to CspSetOutputSpecs in either step 260 or 262 returns, step 264 performs a loop which sequences though the codes in the text 118 in the portable document, until all of those codes which correspond to information in the image being generated have been processed. This loop is comprised of steps 266, 268, and 270.

If the current code being processed from the text 118 is a fontCode 217A, step 266 causes steps 274, 276 and 278 to be performed.

Step 274 calls the CSP's CspGetFontSpecs function 173 to get the font name of the font represented by the current fontCode. Once this has been done step 276 checks to see if the second computer's font interpreter 120A and font resources 122A can render images of characters in that font. This requires both that the font interpreter 102A be able to interpret the font description language used for that named font and that a set of predefined font descriptions for that named font reside in the font resources 122A. If this test is met, and the font can be rendered by the font interpreter, step 276 sets the OrigFont flag to indicate that the named font's pre-defined, or original, fonts can be used. If the font interpreter cannot render the named font, step 278 clears the OrigFont flag and calls the CSP's CspSetFont function 176 for the fontCode. This sets the fontCode as the CSP's currently active logical font, and, thus, its associated physical font as the CSP's currently active physical font.

If the current code being processed from the text 118 is a position code 221A, step 268 calculates a new current document position to indicate where the next shape rendered should be placed relative to the current document being imaged.

If the current code being processed from the text 118 is a charCode 219A, step 270 causes substeps 280 and 282 to be performed. Substep 280 tests to see if the OrigFont flag is set, and if so, it calls the computer's font interpreter to get the shape of the current charCode, and it outputs that text at the current device, or image, coordinate, and then it updates the current document and image coordinate to reflect the escapement (normally width) associated with that character's image. If the OrigFont flag is not set, however, the test of substep 282 is met and that step calls the CSP's CspDoChar function 178 for the character code and current device coordinates. CspDoChar generates a bitmapped image or outline description of the character at the current device position and updates the page builder's current device position by the escapement of that character. If bitmap output is set, it generates this image by calling the page builder's SetBitmap callback function 193. CspDoChar calls this function with pointers to the bitmapped pattern of the character, the size of that pattern, and the current device coordinates. SetBitmap gets that pattern and actually inserts it in the image buffer. If outline output is set, CspDoChar calls the page builder's outline-output callback functions. These includes the Vstem and Hstem functions 197 and 198, which receive hinting information about the standard vertical and horizontal stroke width of the current font. They also include the Moveto, LineTo, CurveTo, and ClosePath functions 199–202 which receive instructions for move, lines, curves, and commands to draw a line to the first point in an outline from CspDoChar and which actually use those instruction to draw shapes in the image buffer.

Once the loop 264 has processed all the codes in the text 118 which are associated with the image to be created, it will have created that image. At this point it can exit the page builder program or subroutine by calling the CSP's Csp-Close function 178, as shown in step 284. This will close all the player's data and memory structures. However, in embodiments in which the page builder is being used to interactively view a document, the program could loop back up to step 254, wait for a new command which changes the location, size, scale, or rotation of the image to be shown, and create a new image as soon as input is received from the user indicating a change in any of those parameters.

Figure 22:
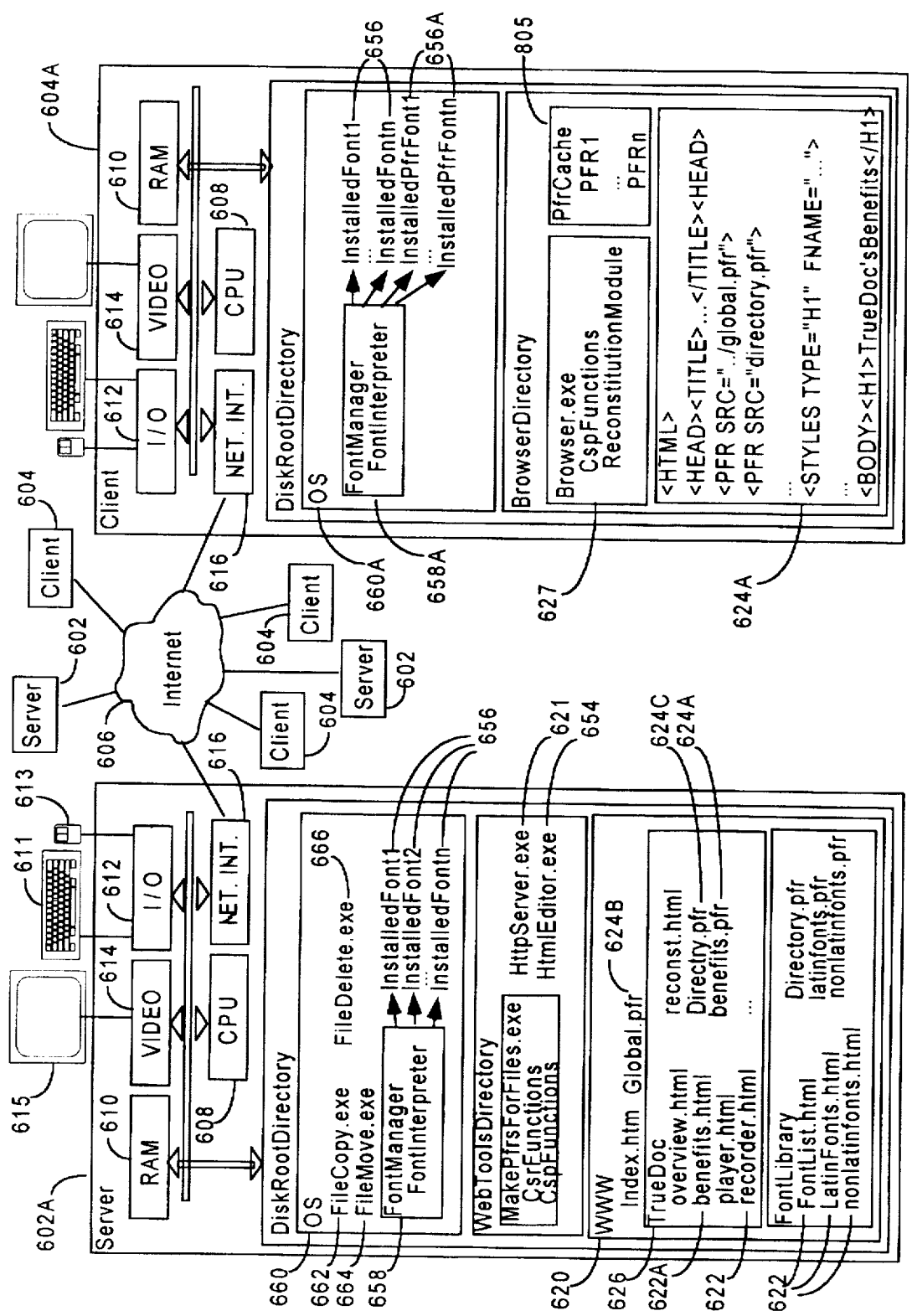
FIG. 22 is a high level block diagram of a version of an embodiment of the invention in which portable font resource ("PFR") files are created for HTML files of a World Wide Web site and communicated across the internet in conjunction with their associated HTML files to allow those files to be view by Web browsers with their intended fonts.

Referring now to FIG. 22, an embodiment of the invention will be described which is designed to be used as part of the Internet's World Wide Web (the "Web"). The preferred system comprises a plurality of Web server computers 602 and a plurality of Web client computers 604 which are connected to each other over the internet network 606. Clients 604 address and send requests for information to specific servers 602 over the network, and the individual servers each address and send the requested information back over the net to the client that requested it. Some computers act as both clients and servers. In FIG. 22 one server computers 602A and one client computers 604A are shown in more detail.

In a typical embodiment, each of the computers 602A and 604A include the following: one or more CPUs 608 for executing computer instructions and reading and writing data; a random access memory (or "RAM") 610 for storing instructions execution by the CPU and data read or written by the CPU; an I/O interface 612 which communicates with devices such as the keyboard 611 and the mouse 613; a video interface 614 which generates signal to draw desired images on a video monitor 615; a network interface 616 for receiving and sending messages over the network 606; and a mass storage device, such as a hard disk 618, for storing more information than will fit in RAM 610 at one time and for permanently storing information when the computer is shut off.

In FIG. 22 the hard disk of server computer 602A includes a directory www 620 which holds files for a hypothetical Web site which might be used by the assignee of the present invention. This data includes HTML files 622, having the file extension name ".html", and PFR files 624, having the file extension name ".pfr". Prior art HTML files are ASCII text files containing text to be displayed and non-displayable tag which can identify the formatting of the text, the names of file images to be displayed in the text, and links to other parts of the same HTML file or to other HTML files.

In the embodiment of the invention shown in FIG. 22, the HTML language has been extended to include tags which specify the fonts which are intended to be used in the display of HTML text. In this embodiment, PFR files contain portable font resource which describe the shapes of the intended fonted characters.

The www directory contains the "home page" HTML file of the Web site, index.html. The home page is designed to be the first screen seen by users of a Web site and to provide a jumping off point to the major uses of the site. The www directory includes a plurality of sub-directories, including the truedoc directory, which includes HTML files about the product TrueDoc, the commercial embodiment of much of the present invention, and a fontlibraries directory which contains HTML files about various fonts sold by the assignee of the present invention.

The server computer contains a server program 621 whose main function is to send HTML and PFR files to client machines which request them. As shown in FIG. 23, the main function of this program is to continuously perform a loop 623, which repeatedly waits for the receipt of an HTTP message from over the internet requesting that a given file from the Web site be sent to a given client machine.

HTTP stand for Hypertext Transfer Protocol, a messaging protocol used to transfer information on the Web. Each HTTP request messages contains a URL, or Uniform Resource Locator, identifying the requested file by the internet address of its server and its full path name on that server. The HTTP request also includes the internet address of the client requesting the file.

When step 625 detects the arrival of such a message, it accesses the file identified by the message's URL and sends it back on the net to the return address in the HTTP message.

The client computer 604A contains a browser program 627 which sends HTTP requests for HTML files and then displays them on the screen 615A of its computer for a user to see. The user can navigate through the Web by using his mouse to click on portions of the documents which contain links to other documents or to other parts of the same document. If the user clicks on a links containing a URL of another document, the browser sends an HTTP request for that other document over the net addressed to the server having the host name specified in the URL. When the addressed server receives the HTTP message, it sends the requested file to the browser. When browser receives the requested file, it then displays it on its screen. This ability to navigate through screens from all over the world by merely clicking on highlighted or underlined links, is one of the great powers of the Web.

FIG. 24 show a version of the file benefits.html written in HTML Level 2, a standard prior art HTML language. A complete specification of this language can, as of this writing, be obtained from http://www.hal.com/users/connolly/html.spec/index.html. As can be seen from FIG. 24, HTML tags start and end, respectively, with the "<" and ">" characters. FIG. 24 shows some of HTML's formatting tags, including "<Hn>" and "</Hn>", for marking the start and ends, respectively, of nth level headings; "<P>" and "</P>" for marking the start and end of normal paragraphs; "<UL>" and "</UL>" for marking the start and end of an unnumbered list; and "<LI>" for marking the start of each item in a list.

HTML Level 2 includes link tags of the form

<A HREF="LinkReference">text</A> where the LinkReference referred to in the HREF attribute is a URL specification and text is the portion of displayable text to be displayed differently, to indicate that if a user clicks on it, the browser will access and display the document defined by the URL.

In FIG. 24 some of the link tags are indicated by the numeral 630. In this figure all of the URL specifications in these link tags are relative references, which identify the files referred to by their address relative to the HTML file in which such references are contained. Relative addresses can be used to refer to any file descending from the same root directory as the HTML file in which they occurs. A path name occurring by itself in a relative address identifies a file whose full path name is that of the directory in which relative address's HTML file occurs with the relative address's path name appended to it. If the relative address's path name is preceded by n occurrences of ". . l", the relative address's path name is appended to the path of the HTML file n levels above the HTML file's current directory.

Not all file references in HTML text are by relative address. If an HTML file refers to a file on an other machines it must usually do so by including a complete URL, rather than just a relative address. A complete URL has three parts: a protocol part, a host name part, and a full path file name part. For example, the full URL for accessing the HTML file benefits.html 622A shown in FIG. 22 would be http://bitstream.com/www/truedoc/benefits.html In this example, the host name protocol, "http://", specifies that the URL is to be sent and received according to the Hypertext Transfer Protocol, the major protocol used for accessing of files on the Web. The hostname part, "bitstream.com", is the internet protocol, or IP, address of the server computer 602A on the internet. Finally the full file name part, "www/truedoc/benefits.html" identifies the specific file "benefits.html" by its path name, that is, its file name preceded by a hierarchical list of the directories it which it is included. In the examples, these directories are "www" 620 and "truedoc" 626.

When a URL specification containing a relative reference is read by a browser on a computer other than that containing the HTML file in which the reference occurs, the browser has to convert the relative reference to a complete URL before it can access the referenced file. This is done by defining the reference relative to the URL which the browser used to get the HTML text file in which the reference occurs. For example, if a browser on another machine has obtained the HTML file benefits.html by using the URL http://bitstream.com/www/truedoc/benefits.html the HREF attribute "recorder.html" contained in tag 630A of FIG. 24 would identify a file named recorder.html in the same directory as benefits.html. Thus, if the user clicked on the text "recorder" 632 associated with recorder.html's link, the browser would access recorder.html by generating the URL http://bitstream.com/www/truedoc/recorder.html In this specification and the claims that follow, we refer to a relative address as a URL specification, because a relative address, when read by a machine other than that on which it its HTML file is located, specifies a complete URL.

When a browser displays an HTML Level 2 file on screen, it determines the text types of the successive displayable portions of the document from the formatting tags contained in the file, looks up the corresponding text style, including a logical font, associated with that text type in a style table, and renders that text using that logical font. Since the author of an HTML Level 2 file has no knowledge of what the style table settings will be in each of the millions of browsers which may be displaying that file, the author has little control over what his document will look like to different users.

Figure 25:
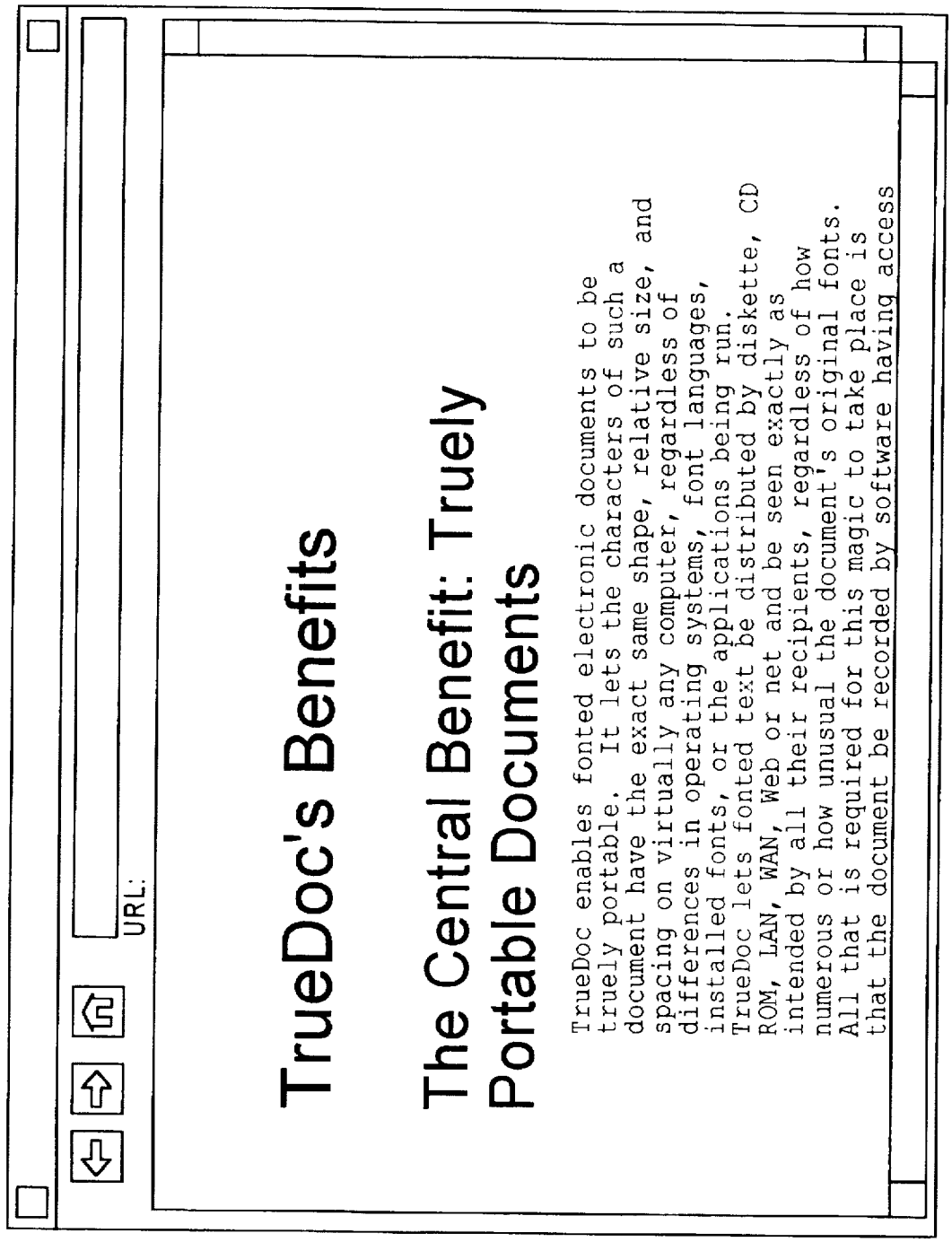
FIGS. 25 and 26 shows how differently the HTML file shown in FIG. 24 can appear on the screens of different Web Browers because of prior HTML files's inability to control the fonts with which such an HTML is displayed.
Figure 26:
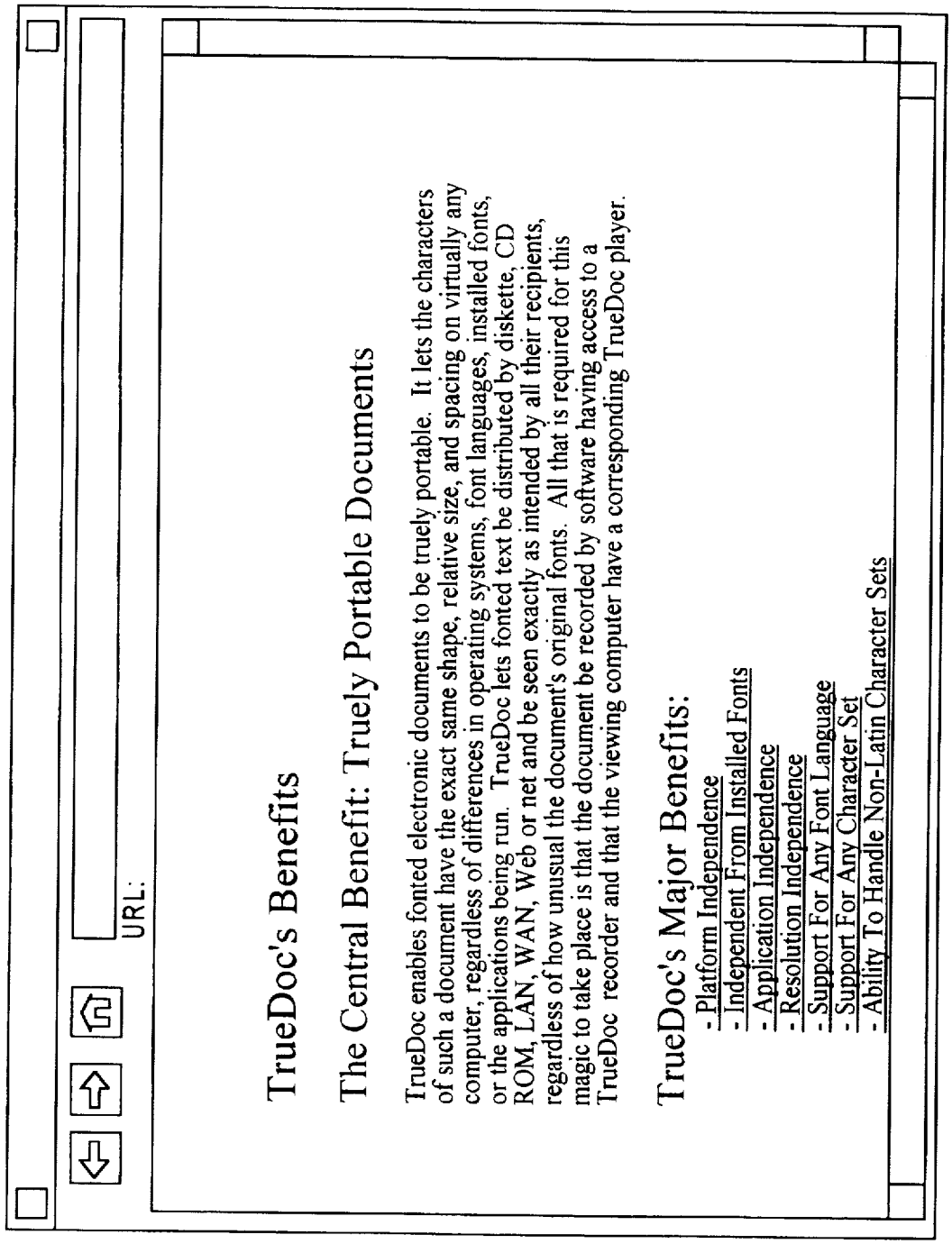

For example, FIGS. 25 and 26 show how the first screen of the HTML Level 2 document shown in FIG. 24 might appear on to different clients. The styles table of the client browser generating FIG. 25 associates Helvetica 32 with <H1> text, Helvetica 28 with <H2> text, and courier 12 with <P> text. The styles table of the browser generating FIG. 26 associates Times 20 with <H1>, Times 18 with <H2> and Times 12 with <P>. The appearance, and the amount shown on, screen varies tremendously between these two figures.

Figure 28:
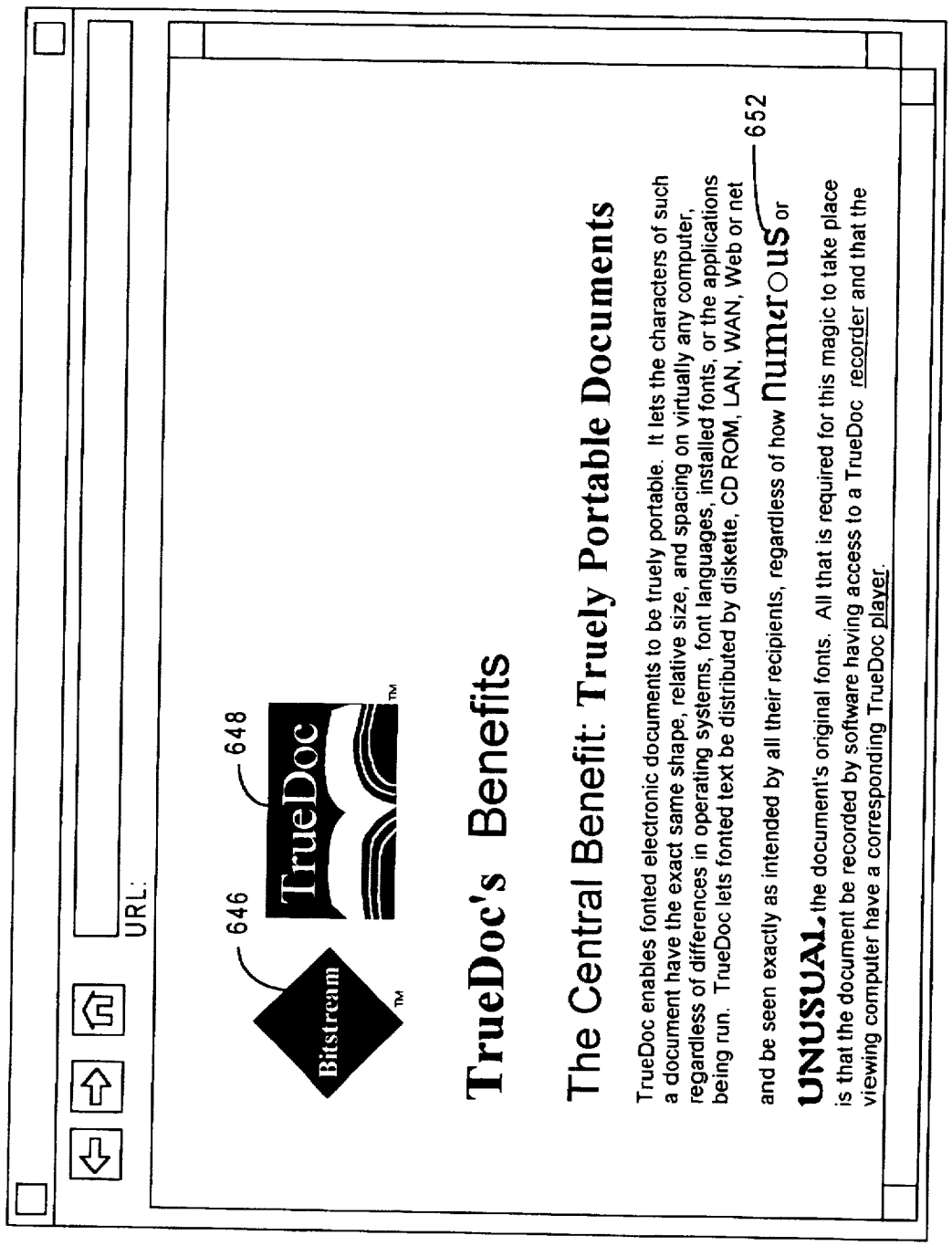
FIG. 28 shows how the HTML file of FIG. 27 appears when rendered by a Web browser using FIG. 22's embodiment of the invention.

The embodiment of the invention shown in FIG. 22 contains HTML files, tools, and browsers which allow the author of HTML files to use fonts freely, to exercise almost total control over how such files are shown across the net, and to enable the display of such fonts across the net with minimal increase in communication time. FIG. 27 shows the HTML text of benefits.html, the text contained in FIG. 24 after it has been modified by extensions to the HTML language contained in FIG. 22's embodiment of the invention. FIG. 28 shows how the first screen of this file will appear on a HTML browser 627 which has been modified to work with FIG. 22's embodiment of the invention.

The HTML text of FIG. 27 is identical to that of FIG. 24 except that text of FIG. 27 uses PFR, STYLE, NONCHAR, and LFONT tags.

PFR tags 640 have the form

<PFR SRC="FileReference"> where FileReference is a URL specification identifying a PFR file containing font descriptions necessary for the display of fonts contained in the document. Note that PFR tags do not enclose any text since they apply to a whole file. A file can contain multiple PFR tags, because one of the innovative aspects of FIG. 22's embodiment of the invention is that it allows a document's fonts to be rendered from more than one PFR file.

STYLE tags 642 have the form

<STYLES TYPE="TextType" FNAME="LogicalFontName" INDENT="Indent" ...> where TextType specifies a type of formatted text identified by HTML's format tags, such as <H1>, <H2>, or <P>. LogicalFontName specifies the logical font to be associated with the tag's TextType. Indent specifies the amount by which the TextType is to be indented. In addition to FNAME and INDENT, other formatting attributes also can be included. A separate STYLES tag is used to change the format of each text type. The HTML author need not include STYLE tags for each text type, nor all formatting attributes for each STYLE tag. This is because browsers designed to read STYLE tags will use the values in the browser's standard styles table for all text types and text type formatting attributes which are not defined by a given document's STYLE tags. STYLE tags do not enclose any text since they apply to a whole file.

NONCHAR tags 644 have the form

<NONCHAR FNAME="LogicalFontName" CHARCODE="charCode"> where LogicalFontName specifies the logical font of a font containing a non-character shape, such the shapes 646 and 648 shown in FIG. 28. charCode is the charCode in the identified logical font of the desired outline image.

As described above with regard to step 222 of FIG. 6, the present invention makes it possible to translate virtually any shape described in terms of outlines into PFR font description which can be rendered as if they were text characters. All that is required is for the software using the CSR to respond to such an outline shape descriptions by calling CsrDocChar for the shape and then responding to the resulting call to ExecChar by feeding the shape's outlines to the CSR through calls to CsrMoveTo, CsrLineTo, CsrQuadraticTo, and CsrCubicTo shown in FIGS. 4 and 6. Once such as shape has been formed into a font description recorded by the CSR into a PFR file, the NONCHAR tags let users have outline based graphics displayed on Web pages. This is normally a great advantage because such outline based graphics are normally much more compact, and thus can be transferred much more rapidly than the bitmapped images commonly used to display graphics on web pages. NONCHAR tags do not enclose text between matching opening and closing tags, as do most formatting tags. This is so the character corresponding to charCode will not be rendered if the browser displaying the HTML file does not have the capability of rendering NONCHARs.

LFONT tags 650 have the form

<LFONT FNAME="LogicalFontName"> text </LFONT> where LogicalFontName specifies the logical font of the font to be applied to text between the opening and closing LFONT tags. This tag is used to enable HTML authors to specify fonts on other than the basis of standard HTML text types. For example, the LFONT tags 650A in FIG. 27 enable the user to specify a separate font for each letter of the word "numerous" shown at 652 in FIG. 28, which occur in the middle of a portion of HTML paragraph text.

In FIG. 22's embodiment of the invention, the HTML author can create all of an HTML text except the PFR tags using a standard text editor or HTML text editor. Preferably, however, the author has access to an editor, such as htmleditor.exe 654, which functions like a normal HTML editor except that it contain a browser, which, like the browser 627 of the client 604A, is responsive to PFR, STYLE, NONCHAR, and LFONT tags. It should be understood that HTML text need not be created on the same computer as the server which distributes it.

The PFR tags are inserted in HTML files by a program MakePfrsForFiles.exe 655. This is a very flexible program for initially creating, and for maintaining, the PFR files to be associated with a given body of text. It can create PFR files for one HTML file, for all the PFR files in a directory, or for all the PFR files in an entire web site. It can handle HTML files for which PFR files have already been created, as well as those for fonts which are still defined only by reference to pre-defined named fonts 656 installed the font manager 658 of its computer's operating system 660.

MakePfrsForFiles can make just one PFR for a selected body of text, or it can make a plurality of them. For example it can associate one PFR file with the basic fonts associated with most of the text in an entire Web site, such as global.pfr 624B in FIG. 22, one with any fonts not in global.pfr which are commonly used in a given Web directory, such as directory.pfr 624C in the truedoc directory of FIG. 22, and one pfr, such as benefits.pfr 624A in FIG. 22 for the fonts of an individual file which do not occur in the global.pfr or any of the file's ancestor directory.pfrs. This feature of breaking the PFR for a large body of text up into multiple PFRs, such as hierarchy of global.pfr, directory.pfr, and benefits.pfr just described, can reduce transmission time when the browser of a client has a PFR caching scheme which saves PFRs as it moves to a new HTML file. Under this scheme the browser only requests the transmission of a PFR listed in the PFR tags of a new HTML file if it does not already have that PFR cached.

MakePfrsForFiles also aides the process of developing layered PFRs by enable the user to record new PFRs for a portion of text which only includes character-font shapes not already defined in a specified set of base PFRs. For example, if extensive changes were made to the truedoc directory 626 of the Web site of server 602A, the global.pfr 624B could be held fixed, and MakePfrsForFiles could be used to create new versions of the truedoc directory's directory.pfr, and, if desired, for any file or sub-directory PFRs associated with that directory.

For maximum font efficiency MakePfrsForFiles should be called for all the files in a Web site after a large number of changes have been made to that site, either by inserting or deleting entire new documents by use of the FileCopy, FileMove, or FileDelete functions 662, 664, or 666, respectively, or by editing individual files by use of the HtmlEditor 654. This is because re-recording the PFRs of an entire body of text removes from the set of output PFRs all font descriptions of characters which are not used in the body, and it performs glyph matching on all shapes within the entire text base, making it possible to save on the storage of any character-font shapes from the entire Web site which have identical shape or have sub-components with identical shapes.

FIG. 29 shows the important steps of the MakePfrsFor-Files program. This program creates one or more PFR in a manner somewhat analogous to that in which the Main program 204 shown in FIG. 6 creates a PFR. The major differences are that MakePfrsForFiles 1) does not create an output text, but rather merely edits its HTML input files to contain appropriate PFR tags; 2) does not embed a PFR in an output document, but rather creates separate PFR files referred to by such PFR tags; 3) operates on HTML text in which fonts are specified by format tags, STYLE tags, and LFONT tags; 4) can create multiple PFRs instead of just one; and 5) can create PFRs which exclude character-font shapes included in one or more base PFRs.

The first step of FIG. 29, step 668 prompts the user for, and receives, FilesToBeRecorded, a specification of which files the program is to be run on. The specification can include an individual file, all the .html files in a given directory, or all the .html files in or under given directory. Step 670 prompts for and obtains a list of all the .pfr files, if any, which are to be used as unchanged base files in the re-recording process. This will cause the one or more PFR files created by MakePfrsForFiles to only include character-font shapes not included in any of the listed base pfr files.

Then step 672 sets a variable MultipleNewPfrs to indicate if the user wants MakePfrsForFiles to produce just one PFR or multiple separate ones.

Once the user has had a chance to specify how he wants MakePfrsForFiles to operate, a step 673 calls CsrOpen to open the Character Shape Recorder ("CSR"). Then step 674 causes a loop comprised of steps 676–722 to be performed for each HTML file specified by the user in FilesToBeRecorded. For each such file, Step 676 reads all of its file's PFR tags, if any, and loads all of the URLs indicated by the URL specifications contained in those tags into a list called CurrentDocsPfrs. Then step 678 loads all of the information from the file's STYLE tags, if any, into a StyleTable. This StyleTable only records the logical fonts specified by such STYLE tags, and it only has entries for text types specified in the file's STYLE tags. Then step 682 performs a loop comprised of steps 682–722 for each successive position of a current text pointer at an HTML tag or at a non-tag character, from the start of the current HTML file until its end.

For each pass of loop 680, the first step 682 tests to see if PreNonCharFontName stores a font name. If so, it copies that font name into CurrentFontName and clears PreNonCharFontName. This enables the loop to continue processing displayable text characters with the CurrentFontName which existed before a NONCHAR tag was processed.

After step 682, step 688 tests to see if the current text position points to a NONCHAR tag. If so, steps 689 saves the CurrentFontName in PreNonCharFontName, step 690 sets CurrentFontName to the logical font identified in the NONCHAR tag, and step 691 places the charCode in the NONCHAR tag into a buffer that will cause it to be treated as if it is the next displayable character in the HTML text file. This allows the charCode in the NONCHAR tag to be rendered by step 698 and its substeps as if it were a displayable character.

If the current text position is an HTML format tag, such as an <Hn>, </Hn>, <P>, or <IP>, which indicates a change in text type, step 692 cause step 693 to test if the new text type has a logical font name defined for it in MakePfrsForFiles' StyleTable. If so, step 693 sets CurrentFontName to the text type's logical font name. If not, step 694 clears CurrentFontName, indicating that the current HTML file has not defined any logical font for the current text type.

If the current text position is an opening LFONT tag, step 695 saves the CurrentFontName in PreLFontFontName and set CurrentFontName equal to the logical font specified in the opening LFONT tag.

If the current text is a closing LFONT tag, step 697 loads PreLFontFontName into CurrentFontName.

If the current text is a charCode and CurrentFontName is defined, step 698 causes steps 700–722 to be performed to determine if a font description needs to be made for the current character, and if so it makes it. If the CurrentFontName is undefined, steps 700–722 are not performed because the HTML file has not specified any particular font for the current character.

If CurrentFontName indicates a font has been specified for the current characters, steps 700, 702, 704 and 705 determine if the character-font combination defined by the current character and CurrentFontName can be rendered from one of the base PFRs specified in PfrsToBeUnchanged, and only if it cannot will step 705 cause steps 706–722 to attempt to create a new font description for the character-font combination.

Step 700 calls a CspOpenAlt1 function with a list of all the base PFRs which the user has specified in PfrsToBeUnchanged.

Figure 30:
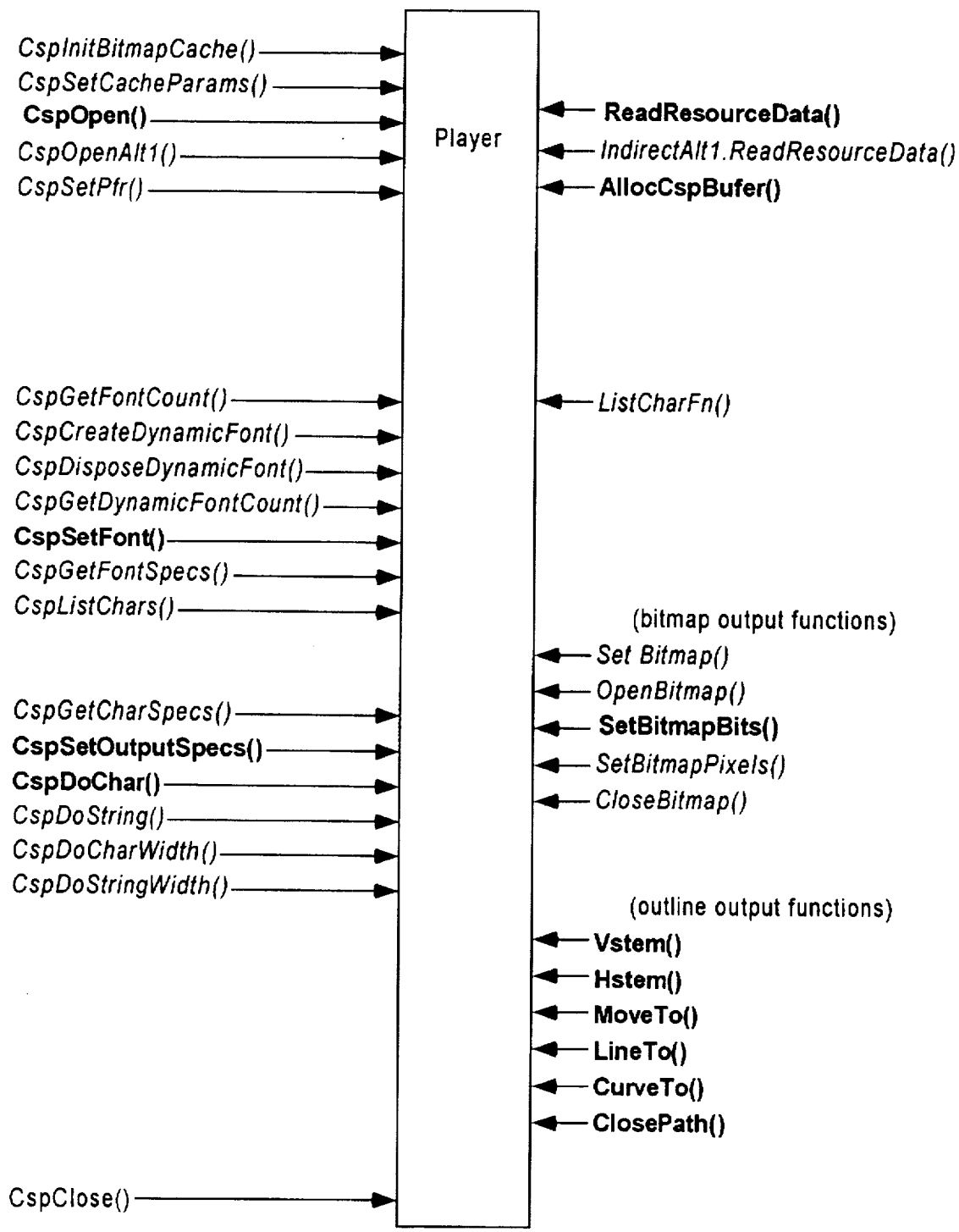
FIG. 30 is a diagram of the functional interface of a character shape player ("CSP") software module which is very similar to that shown in FIG. 5, except that it includes several new functions, such as CspOpenAlt1, and CspCreateDynamicFont which are important for understanding FIG. 22's embodiment of the invention.

CspOpenAlt1 699, shown in FIG. 30, is a function provided on a more flexible version of the Character Shape Player, or CSP, modules 701 which is used with FIG. 22's embodiment of the invention. CspOpenAlt1 is like the CspOpen functions described with regard to the Player module of FIG. 5, except that it enables the calling function to call it with a PfrAccessTable 703, of the type shown in FIG. 31, which points to a list of PFRs, such as the PFRs 707A–C.

Once CspOpenAlt1 has been called with such a list of PFRs, the function CspCreateDynamicFont of the CSP module 701 can be called to create a dynamic logical font having a desired logical font name. Unless a logical font corresponding to the same physical font is currently open, CspCreateDynamicFont scans all of the PFRs pointed to by the PfrAccessTable, and makes a list, such as the list 709, shown FIG. 31, of all PFRs, if any, which contain any characters of the same physical font as the logical font for which CspCreatedDynamicFont has been called. If any of the PFRs do contain such font descriptions of such characters, a dynamic font can be created, and a PhysicalFontPfrList is placed in the OpenedDynamicPhysicalFontList 711, a dynamic logical font 713 is created for the logical font in the OpenedDynamicLogicalFontList 715, and CspCreateDynamicFont returns with a fontCode which can be used to identify that dynamic font in future calls to the CSP.

Once a dynamic font has been created, CspSetFont can be called to set the CSP's current logical font to the dynamic font. Then CspDoChar can be called with a charCode to attempt to render the CharCode's associated character from the Dynamic font. When such a call is made, CspDoChar scans all the PFRs contained in the PhysicalFontPfrList 709 of the logical font's corresponding physical font entry in the OpenedDynamicPhysicalFontList 711 for the first PFR containing a font description of the charCode for the corresponding Physical font. This scanning scans PFRs in the reverse of the order in which they are located in the PfrAccessTable. The PfrAccessTable is loaded with PFRs in the same order in which they occur in an HTML table's PFR tags. Normally the PFR tags list PFRs with the most local PFRs last, so that if a more local PFR has a localized version of a character, that more localized version will be rendered by a call to CspDoChar.

FIG. 31 shows a situation in which CspOpenAlt1 has been called with all of the PFRs listed in the file benefits.html shown in FIG. 27, that is with global.pfr 707A, the truedoc directory.pfr 707B, and benefits.pfr 707C. This results in a dynamic font 717A for any logical font based on the Times New Roman physical font which includes the following characters ',D,P,T,a,b,c,e,l,m,n,o,r,s,t, u and y This is because directory.pfr contained Times New Roman font descriptions for ',D,T,c,e,o,r,s, and u and the benefits.pfr contained Times New Roman font descriptions for P,a,b,l,m,n,t, and y Returning now to FIG. 29, once step 700 has called CspOpenAlt1 with all the PFRs in PfrsToBeUnchanged, step 702 calls CspCreateDynamicFont for the logical font identified in CurrentFontName. Then step 704 calls CspSetFont with the fontCode returned by the CspCreateDynamicFont and step 705 calls CspGetCharSpecs for the current charCode in the HTML text file being processes. CspGetCharSpecs is similar to CspDoChar, in that it scans all of the PFRs listed in the current logical font's corresponding PhysicalFontPfrList 709 for a PFR containing a font description of the charCode with which it has been called. If it finds such a font description it returns with its specifications. If not it returns with an indication that the character could not be found in the current font.

If step 705 cannot find any specifications on the current charCode with the currently active PFRs, it means that none of the base PFRs listed in PfrsToBeUnchanged contain a font description of the current character in the physical font corresponding to the CurrentFontName, and thus step 705 causes steps 706–720 to attempt to create a font description for that character-font combination for use in a new PFR to be created by MakePfrsForFiles.

Step 706, calls CspClose because the CSP has to be closed and reopened each times the CSP is to be used with a new set of one or more PFRs. Then step 708 calls CspOpenAlt1 with all of the PFRs in CurrentDocsPfrs which are not contained in PfrsToBeUnchanged. This opens the CSP with all of the PFRs listed in the current HTML file's PFR tags which have not been specified as base PFRs. Step 710 call CspCreateDynamicFont for the CurrentFontName, step 712 call CspSetFont for fontCode returned by CspCreateDynamicFont, and step 714 calls CspGetCharSpecs for the current charCode.

If this call to CspGetCharSpecs returns with a specification of the current character, it indicates that a PFR associated with the current document other than a base PFR contains a description of the current character-font shape, and that the CSP can be used to provide a description of that shape to the Character Shape recorder ("CSR"). If this is true, step 714 calls the Character Shape Recorder ("CSR") function CsrSetFontSpecs for CurrentFontName with a pointer indicating that the CSP CspDoChar function is to function as the ExecChar callback function for CSR's CsrDoChar. This will cause the next call to CsrDoChar to have CspDoChar calls CsrMoveTo, CsrLineTo, and CsrCubicTo to feed the CSR descriptions of the outlines of the character-font shape. If step 714's call to CspGetCharSpecs indicates none of the currently active PFRs have a description of the current character-font shape, step 718 calls CsrSetFontSpecs with an ExecChar function which will call the operating system's font interpreter to feed the CSR the outlines of the character-font shape to be recorded. Then step 720 calls the CSR's CsrDoChar function for the current charCode and with the complete path name of the current HTML file.

The CsrDoChar function shown in FIG. 30 which is used by FIG. 22's embodiment of the invention is virtually identical to the CsrDoChar function described above with regard to FIGS. 6–20, except that it can be called with a complete file path name, and each time it is called with a new file path name in conjunction with a given character-font combination, it records that path name in conjunction with that corresponding character record 330 (of the type shown in FIG. 8) associated with the corresponding physical font record 302. This is done for each call to CsrDoChar having a file path name, even if a character record for that character font combination has already been completed. This enables the recorder to keep track of all the HTML files in which a given character font shape is used. This information is helpful when deciding whether and how to split the PFR up into multiple PFRs.

Steps 714 and 718 attempt to have the player's CspDoChar function feed the current character-font shape to the recorder's CspDoChar function, if possible. This is because shape descriptions from the CSP are derived from PFR font descriptions which have already been segmented according to the CSPs description-independent, totally shape-dependent segmentation scheme. This saves tremendous time since splitting and combining outline segments which have not been split according to the CSR's shape-dependent segmentation scheme is normally one of the more time consuming tasks performed by CsrDoChar. When re-recording prior PFR font descriptions this task is totally avoided. This is not the case if CsrDoChar has to calls to the operating system's font interpreter for the shape to be recorded, because such calls normally provide CsrDoChar outline segment sequences derived from commercial pre-defined font descriptions whose segmentation is not based on the CSP's description-independent, totally shape-dependent segmentation scheme.

Once the call to CsrDoChar in step 720 is complete, step 722 calls CspClose to close the CSP for the set of active PFRs with which it was last opened.

After step 722 is done, the entire loop of step 680 for the current character of the current HTML file is complete, and the loop of step 680 is repeated for the net text position in the current HTML file. Once this loop has been performed for every displayable character and tag in the current HTML file, the loop of step 674 is complete for the current HTML file. Once this is done, the complete loop of step 674 is repeated for the next HTML file, if any, specified in FilesToBeRecorded. This process is repeated until all the files in FilesToBeRecorded have been processed by the loop 674. Once this has been done step 724 calls CsrWriteResource to create one or more PFRs from all of the physical font records 302, logical font records 318, and individual character records 330 of the type shown in FIG. 8 which have been created for the character-font shapes recorded by all of the calls to CspDoChar in step 720. Once this is done, step 726 calls CsrClose to close the recorder and end the execution of the MakePfrsForFiles program.

CsrWriteResource, which is called in step 724 of MakePfrsForFiles is shown in FIG. 32. Its first step, step 732 tests to see if the user had selected MultipleNewPfrs in step 672 of MakePfrsForFiles. If not, step 732 causes steps 732–746 to make one PFR from all of the physical font, logical font, and character records which MakePfrsForFiles has created. If so, step 734 causes steps 748–776 to enable the user to make multiple PFRs from such records.

If the user selected to have only one PFR made, step 736 prompts for, and obtains from the user, the path file name of the file the user wants the PFR written to. Once this is done step 738 creates a new PFR from all of the physical font, logical font, and character records created by calls to CsrSetFontSpecs and CsrDoChar in MakePfrsForFiles. Then step 740 calls a function WriteResourceData to actually write the PFR to the desires directory with the desired file name. After the PFR file has been written step 742 performs steps 744 and 746 for each file in FilesToBeRecorded. For each of these files, step 744 deletes any of its PFR tags which refer to any PFRs which are not in PfrsToBeUnchanged and step 746 inserts a new PFR tag referencing the new PFR just written in step 740. Once this is done the new PFR has been created and all of the HTML files for which it has been created will have had its PFR tags updated, and thus CsrWriteResource will return to MakePfrsForFiles.

If the user selected to have multiple PFRs made, step 748 performs a loop, comprised of steps 750–776, which is repeated until the user selects to leave the program or until all of the HTML files in FilesToBeRecorded are marked as TotallyRerecorded.

Step 750 lets the user list and group the character records 330 created by MakePfrsForFiles. It prompts the user for, and obtains, one or more selection criteria which will be used to list the character records of character-font shapes which have been recorded by MakePfrsForFiles. The criteria can include 1) a target group of HTML files for which the next PFR file is to be tailored, 2) a group of BaseNewPfrs, that is, the group of PFRs which have been created by former passes through loop 748 in the current run of MakePfrsForFiles which are included in all of the target files, 3) the number of target files in which a given character record occurs, 4) the number of target files in which the character record occurs times the frequency of use of each such file, if the server computer has kept statistics of such use, 5) distribution of occurrence of the character record shape in a specified sub-directory of the target file specification, and 6) other information which can help the operator of MakePfrsForFiles divide character records up into PFRs so that, when used with browsers on client machines having PFR caching, the time required to transmit the PFRs necessary for viewing the HTML files in the target file group will be optimized.

Step 752 lets the user select a group of listed character records for use in a proposed new PFR, based on the information provided by step 750.

Step 754 lets the user list HTML files which contain character records in the proposed new PFR according to selected criteria. For example it would let the user list files in terms of the number of character records in the proposed PFR that each file actually uses. Step 756 then lets the user select which files are to actually use the new PFR. For example, the user might select to include all files which use more than 40% of the PFRs character records. The system automatically excludes files which have been marked as TotallyRerecorded.

Step 758 then lets the user select the path name for new PFR file, step 760 creates a new PFR for the selected character records and their associated physical font records, and step 762 calls WriteResourceData to write the PFR data to a file with the selected path name. Once this is done step 764 adds the new PFR's path name to NewPfrList, and step 766 associates the new PFRs path name with all character records which have been copied to the new PFR. Then step 768 performs a loop comprised of steps 770–776 for each of the HTML files which has been selected in step 756. Step 770 inserts a PFR tag referencing the new PFR in each such file, step 772 test to see if each character-font shape in the HTML file is defined by one of the file's current new PFR tags. If so, step 774 removes all the PFR tags from the file which do not reference PFRs in PfrsToBeUnchanged or NewPfrList, and step 776 marks the file as TotallyRerecorded.

It can be seen that the loop 748 provides a flexible means for producing multi-leveled PFRs for a group of files. For example, on a first pass through the loop 748 by a user making PFRs for the Web site on server 602A might use steps 750 and 752 to list and select character records in order of their degree of distribution across the entire Web site and then place the font descriptions of those character-font shapes in www/global.pfr 624B. Then a successive pass through the loop can select remaining character records which are widely distributed throughout the directory truedoc, and record them in www/truedoc/directory.pfr 624C. Then a third pass through the loop can be used to place all the character-font shapes in the file benefits.html which do not occur either in www/global.pfr or www/truedoc/directory.pfr into a new PFR, www/truedoc/ benefits.pfr 624A. A user could also create only one or two PFRs in a given pass through CsrWriteResource and then use those PFRs as base PFRs listed in PfrsToBeUnchanged on a subsequent pass through MakePfrsForFiles.

Referring now to FIGS. 33–41 the operation of the Web browser program. browser.exe. 627 on client computer 604A will be described. Many of the functions of this browser can also be performed by the htmleditor.exe program 654 located on the server 602A, so as to enable one editing HTML hypertext containing PFR. STYLE. LFONT and NONCHAR tags to see it as intended.

FIG. 33 is the main function of the Web browser 627. The browser programs first step 782 initializes the browser's data structures and displays the empty browser screen 783 shown in FIG. 40. Then step 784 repeatedly loops for and responds to messages from the user until the user elects to exit the browser program.

Step 786, the first step of this message loop, waits for and then gets any message which the operating system has put on the message queue, as it will do if the user types characters on the keyboard 611A or clicks on a mouse 613A.

If the message indicates the user has entered a URL specification, step 788 causes steps 790–800 to be performed. The program receives a URL if the user types one in the URL window 791 of the browser screen, shown in FIG. 40, or if the user clicks on a link, that is, on a text or image which has an associated link tag containing a URL specification. When such a URL specification is received, step 790 gets the new URL specification and loads it into CurrentDocsUrl. If the URL specification includes a relative address that has to be converted into a URL, step 790 performs such a conversion, in the manner described above.

If the CurrentDocsUrl is new, step 800 terminates any processing relating to the display of previous URL's document and calls AccessNewDoc for the CurrentDocsUrl. This causes the browser to get and display the new URL's HTML file, as indicated by the representation of the text of the file benefits.html 624A in the BrowserDirectory of the client 604A in FIG. 22.

Figure 40:
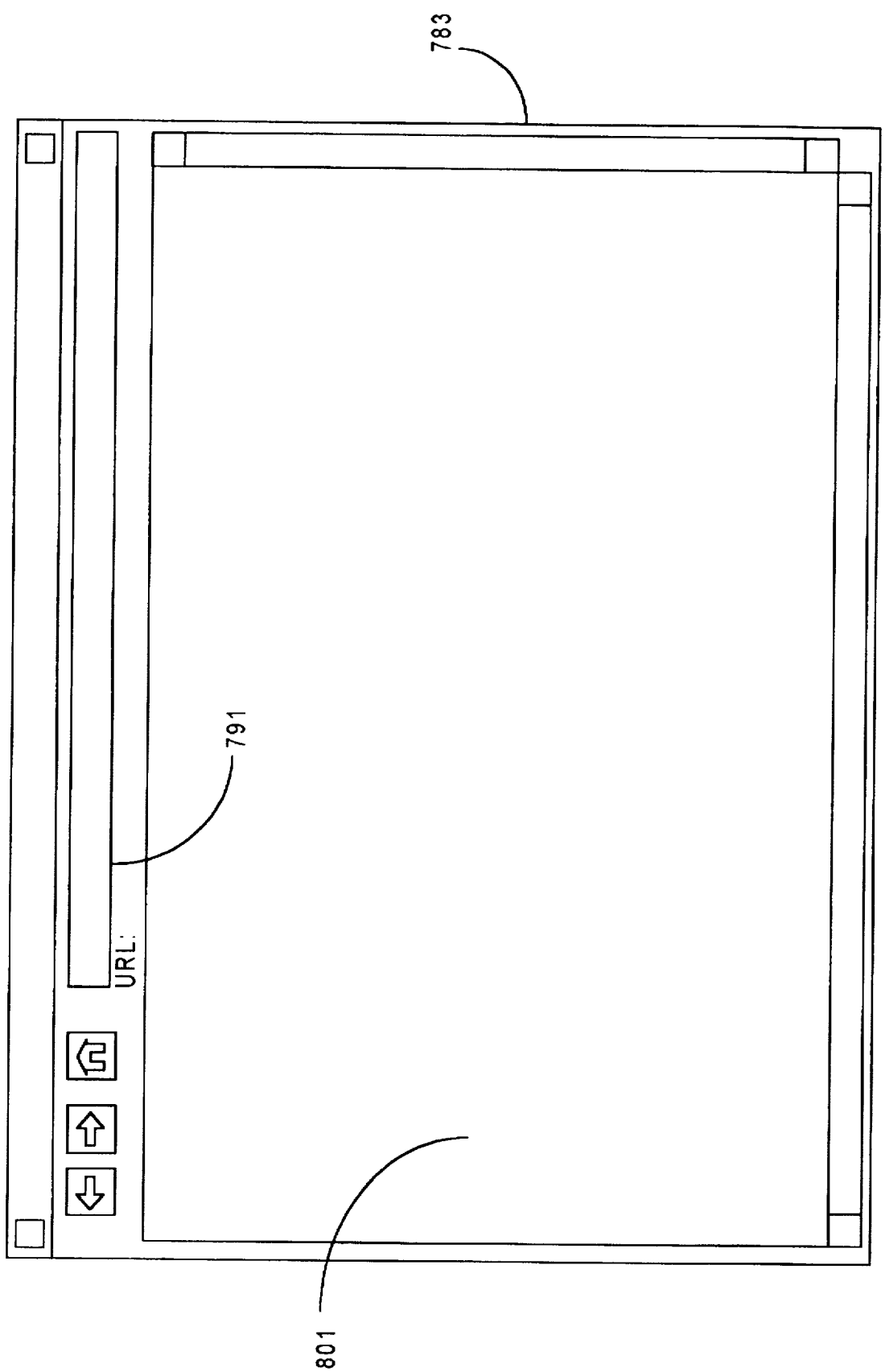
FIG. 40 shows an empty screen of the Web browsers shown in FIG. 22.

If the user input a command to move the position of the current document within the browser's document window, 801 shown in FIG. 40, step 802 calculates a new ScreenStart in the current HTML file corresponding to the user's move command, and then calls DisplayNewScreen for CurrentDocsUrl and the new ScreenStart.

If the user changes the browser's viewing preferences by selecting GetIntendedFonts, step 804 set a variable GetIntendedFonts and calls GetAndDisplayPfrs. GetAndDisplayPfrs requests transmission over the net of all of PFRs listed in the current document's PFR tags which are not currently in the browser's PFR cache 805, shown in FIG. 22, and, once it receives them, it displays the current document using all its intended fonts.

If the user de-selects GetIntendedFonts, step 806 clears GetIntendedFonts and InstallIntendedFonts and terminates any current processing of GetAndDisplayPfrs or Installpfrs. InstallIntendedFonts is set when GetIntendedFonts is set because InstallIntendedFonts should never be set without GetIntendedFonts, although GetIntendedFonts can be set without InstallIntendedFonts.

If the user changes the browser's viewing preferences by selecting InstallIntendedFonts, step 808 sets the variable InstallIntendedFonts as well as GetIntendedFonts, and calls a function InstallPfrs. InstallPfrs causes the current document's PFR's font descriptions to be converted into a font language and format which can be used by the client computer's operating system and then installs these converted fonts 656A into the operating system's font manager 658A so they can be rendered more quickly by making calls to the operating system.

If the user de-selects InstallIntendedFonts, step 810 clears InstallIntendedFonts, and terminate any processing of the InstallPfrs function.

If the user changes the browser's viewing preferences by selecting ShowImages, step 812 sets the variable ShowImages, and calls GetAndDisplayImages, a function which will request transmission of all of the bitmapped image files associated with the current HTML file and cause them to be displayed on the browser's screen at the location in the text of their corresponding IMG tags.

If the user de-selects ShowImages, step 814 clears ShowImages, terminates any current processing of GetAndDisplayImages, and calls DisplayNewScreen for the current values of CurrentDocsUrl and ScreenStart to display the screen without images.

Finally, if the user selects to exit the browser, step 816 calls CspClose, calls a function to un-install from the client's operating system all PFRs which have been loaded for the current HTML file, closes all of browser data structures, and exits the browser program.

The listing of browser's responses contained in FIG. 33 is only partial. Web browsers normally include many other functions. With the present invention such other function should include the ability to set the StyleTable's logical font types for all HTML text types, and the ability to selectively ignore any STYLES and LFONT tags in an HTML document so that the file could be viewed in the browser's standard format defined by its StyleTable.

FIG. 34 shows the AccessNewDoc function 818. This function is called with the URL of the HTML file to be displayed in DocsUrl. In step 820 it calls a function GetUrlFile for DocsUrl.

FIG. 35 shows that the GetUrlFile function 850 includes two steps 852 and 854. If the URL identifies a file on the browser's own machine, step 852 reads the file into a specified buffer and returns from GetUrlFile. If the URL addresses a file not on the client, step 854 sends an HTTP request for the file over the net, places the file, once received, into the specified buffer, and returns from GetUrlFile.

Once the call to GetUrlFile returns with the current HTML file, step 822 tests to see if DocUrl has an anchor name added to its URL text. If so, step 822 searches for the anchor name in the HTML file and sets ScreenStart to the start of the line on which it occurs. This is done because links tags often add an anchor name after their URL specifications. Such an anchor tag identifies a given location in an HTML document to which a link will jump, enabling a link to not only jump to a different document, but also to a desired location within that document.

Next step 824 tests to see of the current HTML file contains any STYLE tags. If so, it causes steps 826 and 828 to be performed. Step 826 makes, for the current HTML file, a custom copy, DocsStyleTable, of the browser's normal StyleTable. Step 828 causes any attributes value, such as logical font name, associated with a text type in a STYLES tag in the HTML file to replace the corresponding attribute value previously contained for that text type in DocsStyleTable.

Next step 830 calls DisplayNewScreen for the current HTML file and ScreenStart, that is, unless the file has a PFRWAIT tag. PFRWAIT is a non-standard HTML tag which can be placed in HTML texts designed to be used with FIG. 22's embodiment of the invention to indicate that the browser should wait until it has received the file's PFRs before rendering its screen. Such a tag might be placed in an HTML file in which the PFR fonts are essential for readability or are considered important for first impression, or if the PFRs can be loaded very rapidly.

Unless a document contains a PFRWAIT tag, step 830 causes the browser to render it without waiting for PFRs to be received, even if the user has selected GetIntendedFonts. This is because with slow communication links it can take seconds to load an HTML file's associated PFRs, and the system can normally render a HTML screen using installed fonts in a small fraction of a second. In other embodiments of the invention the PFR tags could include a statement of their PFR's file size, enabling a browser to make a determination of whether or not to make a temporary display of the document without PFR fonts based on how long such a display is likely to take, given the speed of its communication link.

Step 832 tests to see if the current HTML file has any PFR tags, and if so it causes steps 834–840 to be performed. Step 834 creates a list, CurrentDocsPfrs, of all the PFRs listed in the HTML file's PFR tags. Then, if the new CurrentDocsPfrs list is not the same as the former CurrentDocsPfr list, step 836 un-installs from the operating system of browsers client any fonts identified on a list called CurrentinstalledPfrFonts. This removes from the operating system's font manager any fonts which have been previously installed by the InstallPfrs function described below with regard to FIG. 38. This is done because in FIG. 22's embodiment of the invention, PFR fonts are installed separately for each document.

If GetIntendedFonts is set, step 838 call the GetAndDisplayPfrs function shown in FIG. 37. This will cause all of the current HTML file's PFRs which are not currently in the browser's PFR cache to be retrieved over the net and the file to be re-displayed with all its PFR fonts.

Once step 838 is complete, step 840 tests if InstallIntendedFonts is set, and if so it calls the InstallPfrs function shown in FIG. 38. This will cause all of the fonts contained in the current HTML file's PFRs to be installed in the operating system of the browser's computer, enabling them to be rendered more quickly.

After step 832 responds to whether or not the HTML file has PFR tags, step 842 tests if ShowImages is set and, if so, it calls the GetAndDisplayImages function.

GetAndDisplayImages is a function which seeks to get all images in the current HTML file, giving priority at any one time to getting the images files identified by URLs in IMG tags currently on the browser's screen. As each such on-screen image file is received it calls DisplayNewScreen to display the screen with the new image. Once the call to GetAndDisplayImages returns, the operation of AccessNewDoc is complete, and the function returns to whoever called it.

It can be seen from FIG. 34 that AccessNewDoc is designed to display a new HTML document as rapidly as possible despite communications delays. Unless the document contains a PFRWAIT tag, it displays the document without waiting for any PFRs or images. Then if the document has PFR tags and if GetIntendedFonts is set, it gets the PFRs the system does not already have cached, which normally takes several seconds over a modem, and displays the document with them. Then if InstallIntendedFonts is set it translates the fonts in the document's PFRs into installable fonts and installs them, which normally takes several more seconds. Only after that, if ShowImages is set, does it take the much longer time normally required to load the bitmapped images associated with many web pages. It is preferred that AccessNewDoc be designed as a process that can be aborted at any time if the user input received by the browser's main function selects to jump to another document. This would allow a user to rapidly read and jump to links contained in documents without having to wait for all of the processes in AccessNewDoc to be completed.

FIG. 36 illustrates the GetAndDisplayPfrs function 850 which gets all the current HTML file's PFRs which are not currently cached by the browser and then displays the document using all its PFRs. Its loop 852 performs steps 854–864 for each PFR listed in current HTML file's PFR tags. Step 854 tests to see if the PFR is in the browser's PfrCacheTable. If so, step 854 sets the LastUsedTime of the PFR's entry in that table. If not, step 856 causes steps 858–864 to be performed.

Step 858 sends an HTTP message over the internet to the server computer identified in the PFR's URL, requesting the PFR file identified in that URL. Once the requested PFR file has been receive back over the net, step 860 tests to see if the PfrCache has enough space for the new PFR. If not, step 860 seeks to make room for the new PFR by deleting one or more PFRs listed in PfrCacheTable which are not used in the current HTML file, and which have the oldest LastUsedTime. Then step 862 loads the new PFR into the PfrCache, and step 864 makes an entry for it in the PfrCacheTable having the current time as its LastUsedTime.

Once the loop 852 has ensured that all of the current document's PFR files have been loaded into the browser's PfrCache, step 866 calls DisplayNewScreen, to display the document with all its PFRs.

FIG. 37 illustrates the DisplayNewScreen function 870, whose function is to display the current HTML file, starting at the current position pointed to by ScreenStart.

Its first step, step 872 tests to see if both there are no CurrentInstalledPfrFonts and that the CurrentDocsPfrs are in the browser's PfrCache. If this is true, the current documents PFRs have been loaded into the browser's PFR cache, but have not been installed in the operating system of the browser's computer, and, thus, the Character Shape Player will be used to render the PFR fonts. If this is true step 872 causes steps 874–880 to be performed.

Step 874 calls CspOpenAlt1, described above with regard to MakePfrsForFiles, to open the CSP for all of the current HTML file's PFRs, so dynamic fonts based on those PFRs can be used by the CSP. Step 876 calls CspInitBitmapCache so the CSP's will cache the bitmapped shapes it produces, decreasing the frequency with which it will have to calculate the bitmaps of character-font shapes it is asked for often. Step 878 calls CspSetOutputSpecs specifying bitmapped output, so subsequent calls to CspDoChar will produced bitmapped output. Finally, step 880 determines the browser's outputMatrix and outputBBox from the location, scale, and rotation of the image being created relative to HTML document being displayed.

Step 882 is a loop which is repeated for each successive text position, from ScreenStart until the end of the HTML file or the end of the browser screen, which ever is reached first. This loop is comprised of steps 884–914 which create the bitmapped representation of the current screen.

If a variable PreNonCharFontName has a name on it, step 884 loads that name into CurrentFontName and clears PreNonCharFontName. If the current text being processed by the loop 882 is a NONCHAR tag, step 886 copies the CurrentFontName into PreNonCharFontName, sets CurrentFontName to the logical font name contained in the NONCHAR tag, and places the tag's charCode in a buffer with simulates that character being the next displayable character in the HTML text. These steps are similar to steps 682–691 of MakePfrsForFiles described above, in that they enable a NONCHAR tag's temporary change of font to take place and its charCode to be processed as if it were part of normal HTML displayable text without permanently changing CurrentFontName.

If the current text is a format tag, step 888 looks up in DocsStyleTable to find the logical font name associated with the text type indicated by the format tag, and makes that font name the CurrentFontName.

If the current text is an opening LFONT tag, step 890 saves the CurrentFontName in PreLFontFontName, and sets CurrentFontName to the LFONT tag's logical font name. Similarly if the current text is an </LFONT>, step 892 load the font name in PreLFontFontName into CurrentFontName. These steps enable the loop 882 to handle temporary changes in logical font name which opening LFONT tags cause without losing the logical font name associated with the current HTML text type.

If the current text is an IMG, or image, tag, step 894 causes steps 896 and 898 to be performed. Step 896 tests to see if ShowImages is set and if the browser currently has the file named by the URL specification in image tag. If so, step 896 renders the image at the IMG, or image, tag's corresponding text location on the browser's screen. If not, step 898 causes the ALT text, if any, contained in the image tag to be displayed instead.

If the current text is a displayable charCode, step 900 causes steps 902–914 to be performed.

If all of the current HTML files' corresponding PFR fonts have all been installed, the entire HTML document can be rendered by calls to the operating system's font manager. In this case, step 902 calls the operating system's font interpreter to render the image of the charCode in the CurrentFontName, to output it, and to update the browser's document and device coordinates appropriately. Of course, as is well known in the art of computer text display, most operating systems allow entire strings to be rendered with one call, and, in actuality, the code of DisplayNewScreen takes advantage of such calls.

If the current document's PFR fonts have not been installed in the operating system, step 904 causes steps 906–914 to be performed.

If a call to the operating system's font manager indicates its font interpreter can render the current charCode in the CurrentFontName, step 906 calls the operating system's font interpreter to render the charCode's image, to output it to the screen, and to update document and device coordinates.

If the operating system cannot render the charCode in the CurrentFontName, step 908 causes steps 910–914 to be performed. Step 910 calls CspCreateDynamicFont for the CurrentFontName to create a dynamic font for that logical font. Then step 912 calls CspSetFont for the dynamic font fontCode returned by CspCreateDynamicFont, and step 914 calls CspDoChar for the current charCode and current device coordinates and waits for a callback to SetBitMap to actually output the characters bitmap on the screen and updates the browser's document and device coordinates accordingly.

As is shown in FIG. 30, the CSP includes functions CspDoString and CspDoStringWidth which enable the CSP to render entire strings at a time. In the actual embodiment of the invention if DisplayNewScreen detects a string of characters which cannot be rendered by the operating system it seeks to render all or an appropriate substring of them with CspDoString in order to speed screen rendering.

Once the loop 882 has been completed for the entire screen, DisplayNewScreen advances to step 916, which call CspClose to close the CSP, and then the DisplayNewScreen function is complete and it returns to the function that called it. At this point, if DisplayNewScreen had been called to render the first screen of the HTML file benefits.html shown in FIG. 27, the browser screen would have the appearance shown in FIG. 28.

FIG. 38 illustrates the InstallPfrs function 920. This function installs all of the fonts contained in the current HTML file's PFRs in the operating systems font manager so their characters can be rendered by normal calls to the operating system. This process involves converting the PFR's font descriptions into a form which the operating system can use, such as, for example TrueType fonts on Windows and Macintosh computers, and then providing pointers to those fonts in the operating system's font manager.

The first step of the InstallPfrs function, step 922 un-installs from the operating system any fonts listed in CurrentInstalledPfrFonts. Since InstallPfrs is normally used only when an HTML file is first loaded or when the user first selects InstallIntendedFonts, chances are the currently installed fonts at this time relate to another HTML file and should be removed.

Next step 924 clears the CurrentInstalledPfrFonts list and the DynamicFontCodeList. Then step 926 calls CspOpenAlt1 for all of the current document's PFRs, as listed in CurrentDocsPfrs. Since InstallIntendedFonts can only be selected if GetIntendedFonts is also selected, CurrentDocsPfrs should be up to date and all of its PFRs should be loaded into the PFR cache.

Next step 928 performs loop comprised of step 930 for each physical font corresponding to a STYLE, FONT, or NONCHAR tag in the current HTML file which is not yet listed in CurrentInstalledPfrFonts. If the physical font is not yet installed in the operating system, step 930 performs steps 932 and 934. Step 932 adds the physical font's name to the CurrentInstalledPfrFonts list, and step 934 calls CspCreateDynamicFont for a corresponding logical font and saves the returned fontCode in DynamicFontCodeList.

Once the loop 928 is completed, the DynamicFontCodeList contains a fontCode for each physical font in the current HTML file's PFRs. Step 936 then calls TTInit with a pointer to the WriteData function to be used to actually install the TrueType fonts created by calls to TTSetFont, and with a 0 in a parameter bPcl to indicate TTSetFont is to create TrueType fonts for installation in the operating system, rather than downloadable PCL/eTTo fonts for installation in a printer.

Next step 938 performs a step 942 for each fontCode in DynamicFontCodeList. For each such fontCode step 942 calls TTSetFont for the fontCode. This function generates an installable TrueType font for the fontCode's corresponding physical font. It makes a call-back to the WriteData function specified in step 936. This WriteData function writes the installable TrueType font created by TTSetFont to a buffer and then installs it in the operating system's font manager.

Once step 942 has been called for each physical font in the DynamicFontCodeList, all of the font descriptions contained in all of the current HTML file's PFRs will have been installed in the operating system, and step 944 will call CspClose and the InstallPfrs function will return to the function that called it.

In FIG. 38 the InstallPfrs function creates and installs TrueType fonts. The actual TrueDoc produce which embodies the invention of translating ("reconstituting") and installing PFR fonts has three so-called reconstitution modules: one for converting PFR fonts to TrueType installable fonts, one for converting them to PostScript Type 1 installable fonts, and one for converting them to PCL installable bitmapped fonts. It should be understood that reconstitution modules could be created to produce other types of installable fonts, if desired.

In FIG. 22's embodiment of the invention, the InstallPfrs and DisplayNewScreen functions perform a totally separate reconstitution and installation of the current document's PFRs fonts for each separate HTML document to be viewed. Normally this only takes a couple of seconds and thus is not a problem, particularly since the screen is normally rendered first before this process takes place. In other embodiments, more complicated schemes could be used to prevent the need to repeatedly translate the same font descriptions from PFR to installable format, such a caching of the data structures representing individual physical fonts and individual character shapes in those fonts.

FIG. 39 illustrates the TTSetFont function 950 which is called by step 942 of the InstallPfrs function shown in FIG. 38.

If a PhysicalFontRecord has already be created by a prior call to TTSetFont for the physical font corresponding to the fontCode with which TTSetFont has been called, a complete font has already been prepared for the current physical font and step 952 of TTSetFont causes either step 954 or 956 to be performed. If a prior call to the reconstitution modules initialization function, TTInit, has set the reconstitution module to produce output for insertion into a stream of data to be sent to a printer, step 954 generates a printer command to switch to the named logical font, it calls the WriteData function supplied in the call to TTInit to insert the printer command into a print stream being sent to a printer, and then it returns to the function that called TTSetFont. If TTInit has set the printer to produce TrueType fonts for installation in an operating system, as in step 936 of InstallPfrs, step 956 returns to the function that called TTSetFont without doing anything, since it is assumed the font would already have been created and installed.

If no PhysicalFontRecord currently exists for the physical font for which TTSetFont has been called, steps 958–992 of TTSetFont are performed.

Step 958 creates a PhysicalFontRecord for the current physical font. Step 960 calls CspSetFont to set CSP functions to use the font identified by the current fontCode. Step 962 calls CspGetFontSpecs to get hinting information from the physical font's cooresponding data structure in the PFR. It than compiles this hinting information into data representing corresponding hinting information in the TrueType format, and places that hinting information into the current physical font's PhysicalFontRecord.

Step 964 calls CspSetOutputSpecs to set the CSP to outline mode, so it will respond to CspDoChar by producing a sequence of calls to MoveTo, LineTo, CurveTo, ClosePath, Vstem, and Hstem which describe a character-font shape as a sequence of outlines.

Next step 966 calls CspListChars for the current fontCode. This causes CspListChars to call back a function ListCharFn with a parameter indicating charCode of each character in the fontCode's logical font. Since when TTSetFonts is called to produce installable fonts, it is called with dynamic fonts, of the type describe above with regard to FIG. 31, this means ListCharFn will be called back for each character in fontCode's corresponding physical font which occurs in any of the currently active PFRs.

For each of CspListChars's callbacks to ListCharFn, step 968 causes steps 970–984 to be performed (these steps are not part of TTSetFont, but have been shown as such in FIG. 39 for simplification).

Step 970 creates or clears a CharRecord data structure for the charCode which ListCharFn is called.

Then step 972 calls CspDoChar for the charCode. In response to this call, CspDoChar calls a series of callback functions which perform steps 974–984. (For simplification these steps are shown as part of TTSetFont in FIG. 39).

Step 974 responses to each call to MoveTo, LineTo, or CurveTo made by CspDoChar by recording the points corresponding to those moves, lines, and curves in a point array associated with the current CharRecord, in a manner similar to that in which points are stored in the point array 339 of FIG. 10. Step 976 responds to each call to Vstem or Hstem by recording in CharRecord the hinting information delivered by those calls. Step 978 responds to any call to ClosePath by storing an indication that the last point in CharRecord's point array represents the end of a character-shape contours.

When the call to CspDoChar for a given charCode returns, step 980 uses steps 982 and 984 to create a data structure for a TrueType character-font shape from the information in the current CharRecord. Step 982 copies the character's contours out in a reverse direction because PFR fonts and TrueType fonts describe their inner and outer contours in the opposite directions. As this process is performed, the cubic Bezier curves contained in the CharRecord are approximated with quadratic Bezier curves, since TrueType uses only quadratic Bezier curves. Usually two or more quadratic Bezier curve segments are needed to accurately approximate the PFR's cubic Bezier curves. Next step 984 compiles and translates the hinting information in the CharRecord into TrueType format.

Once all this has been accomplished for the charCode with which ListCharFn was called in step 968, the creation of the TrueType data structure for that charCode is complete. Once steps 968-984 have been completed for each charCode with which CspListChars calls ListCharFn, all the data for a complete TrueType font for all the characters in the active PFRs' current dynamic font will have been created. At this point, if the reconstitution module has been set to create downloadable printer fonts, step 988 generates a command to switch the printer to the current fontCode's logical font and puts the TrueType data for the font into PCL/eTTo format. If the module has been set to create TrueType fonts to be installed in a PC's operating system, step 990 puts the TrueType data for the font into the form for an installable TrueType font. Once this has been done step 992 calls the WriteData function with which TTInit was called. If the module has been set for creating downloadable fonts, the WriteData function will append the control and font information created in step 988 into a print stream being sent to a printer. Otherwise, it will install the TrueType font created in step 990 into the font manager of the computer's operating system.

Once this has been done, TTSetFont is complete it returns to the function that called it.

FIG. 22's embodiment of the invention show features of the present invention such as sending PFRs separately from electronic documents over the net, accessing such PFRs by URL or other network pointers, merging PFRs created from separate documents into one document, creating PFRs on top of fixed base PFRs, creating dynamic fonts from more than one PFR, and reconstituting PFR fonts and installing them into an operating system. In FIG. 22's embodiment, these and others features of the invention are shown in specific types of Web servers and clients. It should be understood that many of these features could be used with the World Wide Web in a different manner, or could be used with other types of network applications, such as on-line services.

For example, in an on-line server application, the global PFR, or even higher level PFRs relating to specific forums could be sent to a user by CD ROM and more local PFRs could be sent over the net only when they are not on the CD ROM or when they could be transmitted faster than the access time of the CD ROM. Dynamic merging of PFR fonts could be performed between PFRs contained on the CD ROM by themselves or in conjunction with PFRs received over the net. This would enable an on-line service to use the CD ROM for the vast majority of its font, but also give it the freedom to include fonts in documents which are not included in its CD ROM.

It should be understood that the foregoing description and drawings are given merely to explain and illustrate and that the invention is not limited thereto except insofar as the interpretation of the appended claims are so limited. Those skilled in the art who have the disclosure before them will be able to make modifications and variations therein without departing from the scope of the invention.

For example, it should be understood that in some embodiments of the invention which create portable documents, the document building program has the ability to insert new font descriptions into the portable font resource for all the characters in any font which has any one or more characters placed in the portable document. It can do this by calling CsrDoChar for each character in the character set whenever a call to CsrSetFontSpecs calls GetFontInfo and GetFontId, indicating that the font with which CsrSetFontSpecs is being called is a new physical font. This enables one receiving the portable document to edit the document in all fonts contained in it.

It should also be understood that the invention has uses in many different types of applications.

For example, the invention is very useful with printer controllers and printer drivers, to ensure that a fonted document can be properly printed by a given printer. Where a printer's controller or the computer directly driving it has a page builder and character shape player of the general type described above, the printer is capable of printing any set of fonts sent to it as part of one of the invention's portable documents. Where all the printers on a network have this capability, one could send a portable document to any such printer and be assured that it would be printed correctly with all the desired font shapes.

The invention is of great use with presentation software. Presentation software which includes a page builder and character shape player, can faithfully reproduce the fonts in any presentation which is created as a portable document with an embedded portable font resource. This lets any such presentation be used on any computer having such presentation software, without concern for which fonts are, or are not, present in the computer's associated font resource.

The invention is also of great use in networked applications such as e-mail, groupware, computer bulletin boards, on-line services, and the so-called information superhighway. By using systems, such as are shown in FIG. 3, it allows media containing fonted text and portable font resources to be sent over the network and accurately rendered by any receiving computers containing a page builder and character shape player without concern for what fonts that computer has in its font resources. This is particularly important in applications where fonted text is being received from, and then viewed by, thousands, or millions, of different computers, each with different possible combinations of font resources.

In interactive networked applications, the portable document can be generated interactively. That is, as each successive line or screen is transmitted any new font descriptions required for its characters could be sent with it.

The invention is of great used in electronic publishing, such as the publishing of CDROMs, because it assures that any desired fonts used in electronically published documents can be accurately portrayed on virtually any computer without having to worry whether or not its font resources contain each font contained in the published information.

In networked, electronic publishing, and other applications, the actual code for the page builder and character shape player can be sent with the portable document to ensure that each computer receiving the transmission will be able to play it.

The invention is useful in applications for creating and editing font sets. For example, in some embodiments the character shape player is used as part of applications to convert pre-defined font descriptions into new font descriptions which are derived only from the shape information in the pre-defined font descriptions. These new font descriptions can then be installed into a computers font resources. In such applications, software similar to the character shape player is designed to be installed as one of the computer's font interpreters.

The invention is also of great use in multimedia applications. It allows fonted text in such multimedia to be compactly represented by alphanumeric symbols, and to be quickly and accurately reproduced by any computer. In such applications, and in draw and desktop publishing applications, the invention can be modified to handle color, 3-d, transparency, and other graphic effects.

As those skilled in the computer arts will understand, many of the functions described above as being performed in software could be performed in hardware. Similarly, the particular division of functionality into specific functions and modules described above is highly arbitrary and the invention is not limited to such divisions. For example, in some embodiments of the invention the document builder and character shape player can be constructed as a single software module, instead of two. In others, the document builder will not be a separate software module, but rather will be part of a larger host application, such as a word processor, desk top publisher, or presentation program. In others, the character shape recorder and player can be part of one larger module, designed for use in application which both create, view, and edit portable documents.

It should be understood that in other embodiments of the invention's character shape recorder the rules used for extracting new font descriptions from the shape defined in predefined font descriptions could be different. For example, in some a given portion of an outline segment in the character shape array between points which have been marked as description-independent points, such as corners, tangents, inflections, or X or Y extreme values could be approximated with multiple curves, instead of a single curve, if the fit reached by only a single curve was less accurate than desired. On others, for example, different standard starting points or contour directions could be used for new font descriptions, or different types of descriptions could be used for representing curved outline segments.

The embodiment of the invention described in detail above is capable of receiving pre-defined font descriptions written in PostScript, TrueType, and Speedo languages. It should be understood that in other embodiments of the invention, the document builder or character shape recorder could be designed to receive pre-defined font descriptions written in other font description languages, such as Intellifont, or new font description languages which might be developed in the future.

For example, the Intellifont language describes curves as circular arcs. This could be accommodated by having the document builder's ExecChar function convert each circular arc outline segment it receives from an Intellifont font interpreter into a corresponding Bezier curve. It could be accommodated by modifying the character shape recorder itself to have a CsrArcTo function to receive such an arc and to convert it into a Bezier curve. If, in the future, other font description languages which define outline segments in other ways are developed, the character shape recorder or its associated host software can be changed to accommodate such new descriptive techniques.

In the embodiment of the page builder described above, the page builder tests to see if its computer's font interpreter and font resources can render a given font, and if so, it causes the font to be rendered by the font interpreter. In other embodiments, the page builder renders all characters in the portable document using the character shape player.

In the embodiments of the invention described above, fonted texts have been converted into a single portable document comprised of corresponding output text and a portable font resource. In some embodiments, however, the output text and the portable font resource could be placed in separate files, or perhaps be stored in separate memory locations.

As these examples show, the invention has many possible embodiments, and its scope is not limited to the detailed description provided above, but rather is best defined by the claims that follow.

What we claim is:

1. A computerized method comprising the steps of:
   receiving a plurality of characters and an identification for each such character of an associated pre-defined font;
   accessing, for each combination of a character and pre-defined font so received, a pre-defined font description which describes a sequence of outline segments which define each of the one or more outlines of the shape of the character in its associated pre-defined font using a given font description language;
   generating a new font description from the pre-defined font description of the shape for each received character-font combination, which new font description describes the shape of the combination as a sequence of outline segments according to a new font description language, wherein said step of generating new font descriptions for a given character-font combination includes the steps of:
      modeling the given character-font shape defined by the given pre-defined font description associated with that shape, said modeling including the steps of:
         identifying description-independent segmentation points in the one or more outlines represented by the outline segments of the given pre-defined font description, the location of which description-independent points is a function of each such outline's shape, independently of the sequence or segmentation of the outline segments included in the pre-defined font description;
         approximating the shape of the outline defined by the pre-defined font description between adjacent description-independent points with new segments bounded at those adjacent description-independent points; and
      generating a given one of said new font descriptions in which the sequence of outline segments includes said new segments; and
   installing said new font descriptions created by said generating step into the operating system of a computer;
   calling said operating system to have said computer use said installed new font descriptions to render the character-font shapes the new font descriptions represent.

2. A computerized method as in claim 1 wherein:
   said step of generating new font descriptions is performed on a first computer system; and
   said steps of installing said new font descriptions into the operating system and calling the operating system to render character-font shapes represented by the new font descriptions are performed on a second computer system.

3. A computerized method as in claim 1 wherein:
   said step of receiving a plurality of characters and identifications of associated predefined fonts receives a body of text containing said characters and identifications;
   said step of generating new font descriptions generates a text-specific set of font descriptions associated with said text in which the particular character-font shapes represented is a function of the fonts and the particular characters in each font identified in said text; and
   said step of calling the operating system to render character-font shapes is used to render an image of a portion of said body of text.

4. A computerized method as in claim 3:
   further including the step of transferring said text and said text-specific set of font descriptions from a first computer system to a second computer system; and
   wherein said steps of installing said new font descriptions into the operating system and calling the operating system to render character-font shapes is performed by said second computer systems.

5. A computerized method as in claim 4:
   further including the step, performed on said second computer system, of converting said new font description transferred to it from said first computer system, into a font description language used by the operating system of said second computer system; and
   wherein said step of installing said new font descriptions installs said converted versions of said new font descriptions into the operating system of said second computer system.

6. A computer system comprising:
   a screen upon which said computer system can render images;
   an operating system to which calls can be made to render the image of a character-font shape defined by a font description which is written in a language compatible with, and which has been installed in, said operating system;
   means for receiving a text including a sequence of characters and an identification for each such character of an associated font;
   means for receiving a set of outline font descriptions associated with said text, which describe the shape of character-font combinations identified in said text as a sequence of outline segments;
   means for converting said received font descriptions into a font description language compatible with said operating system;

means for installing said converted font descriptions into said operating system; and means for generating an image of said text on said screen by calling said operating system to render images of character-font shapes defined by said converted font descriptions which have been installed in said operating system.

7. A computer system as in claim 6:

further including means for opening and closing a file on which said text and said outline font descriptions have been recorded;

wherein said means for receiving a text and said means for receiving a set of outline font descriptions, respectively, include means for receiving said text and said font descriptions from said file after said file has been opened by said file opening means;

wherein said means for converting said received font descriptions and said means for installing them include, respectively, means for converting and installing said font descriptions after said file has been opened by said file opening means; and further including means for un-installing said converted font descriptions associated with said text from said operating system after said file has been closed by said means for closing.

8. A computer system as in claim 6 further including means for generating an image of said text on said screen by rendering images of character-font shapes defined by said received font descriptions before they have been converted and installed in said operating system, so said text can be viewed before said conversion and installation is complete.

9. A computer system as in claim 6 wherein:

said means for receiving a set of font descriptions includes means for receiving a plurality of font resources associated with said text, each of which includes a description of one or more physical fonts and font descriptions of one or more character-font shapes associated with such described physical fonts;

said means for converting said received font descriptions includes means for creating, for a physical font described in a plurality of said font resources, an installable outline font which includes:

a converted description of the physical font derived from a physical font description contained in one of the received font resources; and converted font descriptions derived from font descriptions associated with the physical font in different ones of the received font resources; and said means for installing installs said installable fonts in said operating system.

10. A computer system comprising:

means for rendering images of fonted documents whose font descriptions are in a given font description language;

means for receiving a text including a sequence of characters and an identification for each such character of an associated font;

means for receiving a set of outline font descriptions associated with said text in which:

the character-font shapes represented in the set is a function of the fonts and the particular characters in each font identified in said text; and each font description describes the shape of a character-font combination as a sequence of outline segments;

means for converting said received set of font descriptions into a corresponding set of font descriptions for the same character-font shapes written in the font description language compatible with the means for rendering images; and means for causing said means for rendering images to render an image of said received text.

11. A computerized method comprising the steps of:

responding to the receipt over a computer network of a first message indicating that a given text is to be sent to a recipient network address associated with the first message by sending the given text over the network addressed to the first message's associated recipient address; and responding to the receipt over a computer network of a second message indicating that a given set of font descriptions is to be sent to a recipient network address associated with the second message by sending the given set of font descriptions over the network addressed to the second message's associated recipient address; and wherein:

the given text includes a plurality of characters and an identification for each such character of an associated font the font descriptions of the given set of font descriptions each define the shape of a given character in a given font; and the set of character-font shapes represented by the given set of font descriptions is a function of both the fonts identified in the given text and the particular characters for which each such font is identified in said text.

12. A computerized method as in claim 11 further including the steps of:

receiving said text;

accessing, for each individual combination of a character and font identified in said text, a pre-defined font description which describes a sequence of outline segments defining each outline of the corresponding character-font shape;

generating from each accessed pre-defined font description a new font description which describes a character-font shape as a sequence of outline segments, said generating including:

modeling the character-font shape defined by the accessed pre-defined font description, said modeling including the steps of:

identifying description-independent segmentation points in the one or more outlines represented by the outline segments of the pre-defined font description, the location of which description-independent points is a function of each such outline's shape, independently of the sequence and segmentation of the outline segments included in the pre-defined font description;

approximating the shape of the outline defined by the pre-defined font description between adjacent description-independent points with new segments bounded at those adjacent description-independent points; and making said new segments part of said new font description's sequence of outline segments; and including said new font description in the given set of font descriptions sent over the network.

13. A computerized method as in claim 11 wherein:

said step of responding to the receipt of a first message includes responding to each of a plurality of such first messages, each indicating that a different text is to be sent to a recipient network address associated with the individual first message, by sending the first message's indicated text over the network addressed to the first message's associated recipient address; and said step of responding to the receipt of a second message includes responding to each of a plurality of such second messages, each indicating that a set of font descriptions associated with a different text is to be sent to a recipient network address associated with the individual second message, by sending the second message's indicated sets of font descriptions over the network addressed to the second message's associated recipient address.

14. A computerized method as in claim 13 wherein:

the individual texts which are sent over said network in response to said first messages each include the name of a set of font descriptions; and the individual second messages each include the name of a set of font descriptions.

15. A computerized method as in claim 14 wherein:

the sets of font descriptions associated with texts are font resources, where each font resource is a group of one or more font descriptions;

some texts have multiple font resources associated with them; and some font resources are associated with multiple texts; and each text includes the name of each of the text's associated font resources.

16. A computerized method as in claim 13 wherein the texts are HTML text files.

17. A computerized method as in claim 16 wherein said HTML texts each contain one or more tags containing URL specifications identifying the name of files containing the set of font descriptions associated with the HTML text.

18. A computerized method to be performed on a computer system comprising the steps of:

sending a text-request message over a computer network requesting that a given text be sent to said computer system over the network, wherein the requested text includes a plurality of characters and an identification for each such character of an associated predefined font receiving said requested text over the network;

sending a font-request message over the network requesting that a font resource containing a set of font descriptions be sent to said computer system over the network, wherein:

the requested font resource includes one or more font descriptions;

the font descriptions each define the shape of a given character in a given font; and the set of character-font shapes represented by the requested font resource is a function of the fonts and the particular characters in each font identified in said requested text; and receiving said requested font resource over the network;

using said received font resource to render an image of a portion of said received text.

19. A computerized method as in claim 18 further including the step of rendering an image of the received text without character-font shapes derived from the requested font resource, before receiving the requested font resource.

20. A computerized method as in claim 18 further including the steps of determining whether or not to send said font-request message as a function of the state of a variable; and rendering an image of said received text without character-font shapes derived from the requested font resource, when said determining step determines not to send said font-request message.

21. A computerized method as in claim 20 further including the step of setting said variable in response to input from a user of said computer system.

22. A computerized method as in claim 18 wherein:

the requested text includes the name of a font resource; and said step of sending a font-request message includes reading the font resource name from the received text and using the name in the font-request message to identify the font resource requested.

23. A computerized method as in claim 18 wherein:

the step of sending a font-request message sends one or more font-request messages to request that a plurality of font resources associated with the requested text be sent to the computer system over the network;

each of the requested font resources includes a description of one or more physical fonts and one or more font descriptions of character-font shapes associated with each such described physical font;

the step of receiving the requested font resource receives said plurality of requested font resources; and the step of using the received font resource to render an image uses the plurality of requested font resources to render the image by finding, for each given character-font shape to be rendered as part of the image, a font description of the given shape from one of the received font resources and using the font description found to render the characterfont shape as part of said image.

24. A computerized method as in claim 23 wherein:

the set of character-font shapes represented by a first of said requested font resources is a function of the fonts and the particular characters in each font identified in a body of text which is not identical with the requested text; and the set of character-font shapes represented by a second of said requested font resources is a function of the fonts and the particular characters in each font which are identified in the requested text but not contained in said first requested font resource.

25. A computerized method as in claim 23 wherein said step of sending a font-request message sends a separate font-request message over the network for each of said plurality of font resources associated with said given text.

26. A computerized method as in claim 23:

wherein the steps of the method are repeated for different texts;

further including the step of storing on said computer system requested font resources which have been requested and received in conjunction with a first text after a second text has been requested by a text-request message; and wherein said step of sending a font-request message for font resources associated with said second text includes determining whether or not to send a font-request message for a font resource associated with the second text as a function of whether or not said font resource is currently already stored on said computer system.

27. A computerized method as in claim 23 wherein said given text includes the names of associated font resources.

28. A computerized method as in claim 18:

further including the step of installing the character font descriptions contained in the requested font resources into the operating system of the computer system so the shapes described by such font descriptions can be rendered by making calls to said operating system; and wherein the step of using the requested font resources to render an image of a portion of the received text includes making such calls to said operating system.

29. A computerized method as in claim 28 further including the step of converting font descriptions contained in said requested font resources into a font description language which is compatible with said operating system before installing those font descriptions in the operating system.

30. A computerized method as in claim 18 wherein:

the text-request and font-request messages conform to the HTTP protocol;

the requested text is an HTML text containing a URL specification of one or more font resources and a specification of one or more fonts are to be used when rendering an image of one or more portions of said HTML text; and the step of sending a font-request message includes including a URL corresponding to one of said URL specifications contained in the requested HTML text in the HTTP font-request message sent over the network.

31. A computerized method as in claim 30 wherein the requested HTML text contains a tag which contain the the URL specification.

32. A computerized method as in claim 30 wherein:

the requested HTML text contains a tag which specifies that a given HTML text type is to have an associated font; and the step of using the requested font resource to render an image includes causing portions of the HTML text having the given text type to be rendered in the font specified in said tag.

33. A computerized method as in claim 30 wherein:

the requested HTML text contains a tag which specifies that adjacent HTML text is to have a given associated font; and the step of using the requested font resources to render an image includes causing HTML text adjacent to said tag to be rendered in the font specified in said tag.

34. A computer system comprising:

means for receiving a body of text containing a plurality of characters and an identification for each such character of an associated font;

means for receiving an old set of one or more font resources each of which contains font descriptions of less than all characters in one or more fonts; and means for creating a new set of one or more font resources for the body of text in which the particular character-font shapes represented are a function of the fonts and the particular characters in each font identified in said text, said means including means for deriving, from said old set of font resources, font descriptions of character-font combinations identified in said text and for placing said derived font descriptions in said new set of font resouces.

35. A computer system as in claim 34 wherein:

said means for receiving an old set of font resources includes means for receiving individual font resources which include font descriptions from different fonts; and said means for creating a new set of font resources includes means for creating individual resources which include font descriptions from different fonts.

36. A computer system as in claim 34:

wherein said old and new sets of font resources both contain outline font descriptions written in a first font description language, each of which font descriptions describes a sequence of outline segments which define each of the one or more outlines of the shape of a character in an associated font;

further including means for receiving outline font descriptions which are written in a second font description language, each of which also describes a sequence of outline segments which define each of the one or more outlines of the shape of a character in an associated font; and wherein said means for creating said new set of one or more font descriptions further includes:

means for translating font descriptions written in said second font description language which describe the shape of character-font combinations identified in said text into corresponding new font descriptions written in said first font description language, and means for placing said translated new font descriptions in said new set of font resources.

37. A computer system as in claim 36 wherein said means for translating includes:

means for modeling the given character-font shape described by a given font description written in said second font description language including:

means for identifying description-independent segmentation points in the one or more outlines represented by the outline segments of the given font description, the location of which description-independent points is a function of each such outline's shape, independently of the sequence and segmentation of the outline segments included in the font descriptions written in said second language;

means for approximating the shape of the outline defined by the given font description between adjacent description-independent points with new segments bounded at those adjacent description-independent points; and means for including said new segments in a sequence of outline segments which said translated new font description uses to define said character-font shape in said first language.

38. A computer system as in claim 34 wherein:

said means for receiving an old set of font resources includes means for receiving a plurality of old font resources each of which includes a description of one or more physical fonts and font descriptions of less than all the characters associated with each such physical font;

said means for deriving and placing font descriptions includes means for deriving, from multiple font resources of the old set, font descriptions of character-font combinations of a given font identified in said text and for placing those derived font descriptions in the new set of font resources.

39. A computer system as in claim 34 wherein said means for creating a new set of font resources creates a plurality of new font resources.

40. A computer system as in claim 34 wherein said means for creating a new set of font resources includes means for excluding from said new set of font resources font descriptions which are contained in a base set of one or more font resources.

41. A computer system comprising:

means for receiving an indication of a given character-font combination, that is, of a given character in a given font, for which a shape description is desired;

means for finding which of a plurality of font resources, each of which includes font descriptions of a different set of characters in said given font, contains a font description of said given character-font combination; and means for using the font description of said given character-font combination found to provides a description of the corresponding character-font shape.

42. A computer system as in claim 41 wherein the means for accessing font resources includes means for accessing font resources, each of which includes a description of multiple physical fonts and font descriptions of one or more character-font shape associated with each such physical font.

43. A computerized system as in claim 42 wherein said means for accessing font resources includes means for accessing a plurality of font resources, each including descriptions of, and font descriptions for, one or more of the same physical fonts.

44. A computer system as in claim 41:

further including means for receiving a text containing a plurality of characters and an identification for each such character of an associated font; and wherein:

said means for receiving an indication of a given character-font combination for which a shape description is desired includes means for receiving such an indication for each of a given plurality of characters-font combinations identified in said text; and said means for using the a found font description includes means for rendering the shape of each of said given plurality of character-font combinations in an image of a portion of said text.

45. A computer system comprising:

means for receiving different portions of a body of text, each of which contains a plurality of characters and has a font associated with each such character;

means for associating a different plurality of font resources which each such text portion, wherein each font resource includes font descriptions of one or more character-font combinations in each of one or more fonts;

means for accessing the plurality of font resources associated with a given text portion to obtain font descriptions of character-font combinations associated with the given text portion, said means including means for accessing the font description of different character-font combinations from the same font from different ones of the font resources associated with the given text portion; and means for using the font descriptions obtained for a given text portion to render an image of that text portion.

46. A computer system as in claim 45:

wherein said means for receiving different text portions includes means for receiving said text portions over a computer network; and further including means for receiving over the network font resources associated with a such text portion received over the network.

47. A computer system as in claim 46 further including:

means for storing font resources which have been received over the network in a cache in conjunction with the rendering of one text portion when rendering subsequent text portions; and means for determining if a given font resource in the set of font resources associated with a text portion to be rendered is currently stored in said cache, and, when not, for transmitting a message for causing the given font resource to be transmitted to said computer system over said network.

48. A computer system as in claim 46 wherein:

said individual text portions received by said computer system each contain an identification of the set of font resources to be associated with it; and said means for associating different pluralities of font resources with different text portions includes means for reading said identification of a set of font resources from said received text portions.

49. A computer system comprising:

means for receiving a plurality of font resources, each of which includes one or more physical fonts and font descriptions of the shape of a variable number of characters in each such physical font; and means for creating a new font resource, including means for combining in said new font resource font descriptions of different characters of a given physical font derived from different ones of said received font resources.

50. A computer system as in claim 49:

further including an operating system having a font manager in which a font resource having font descriptions corresponding to a single physical font and having a pre-defined format can be installed, said operating system having functions which can be called to render the shape of a font description in an installed font; and wherein said means for creating a new font resource creates such an installed font.

51. A computer system as in claim 49 wherein said means for creating a new font resource includes means for creating a new font resource which includes font descriptions from different physical fonts.

* * * * *